US006694112B2

United States Patent
Sasaki et al.

(10) Patent No.: US 6,694,112 B2
(45) Date of Patent: Feb. 17, 2004

(54) DEVELOPING DEVICE USING A DEVELOPING LIQUID INCLUDING A ROTATABLE AGITATOR IN A DEVELOPING LIQUID RESERVOIR AND IMAGE FORMING APPARATUS INCLUDING THE SAME

(75) Inventors: Tsutomu Sasaki, Kanagawa (JP); Osamu Satoh, Kanagawa (JP); Masahiko Itaya, Tokyo (JP); Tsuneo Kurotori, Tokyo (JP); Hiroki Kubozono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 09/892,656

(22) Filed: Jun. 28, 2001

(65) Prior Publication Data

US 2002/0021429 A1 Feb. 21, 2002

(30) Foreign Application Priority Data

| Jun. 28, 2000 | (JP) | 2000-193803 |
| Jul. 3, 2000 | (JP) | 2000-200756 |
| Jul. 3, 2000 | (JP) | 2000-200767 |
| Jul. 3, 2000 | (JP) | 2000-200778 |
| Mar. 19, 2001 | (JP) | 2001-077513 |

(51) Int. Cl.⁷ ............................................. G03G 15/10
(52) U.S. Cl. ....................... 399/57; 399/238; 399/239
(58) Field of Search ........................ 399/57, 237, 238, 399/239

(56) References Cited

U.S. PATENT DOCUMENTS 3,392,708 A * 7/1968 Hunstiger .................. 399/238

3,876,116 A * 4/1975 Kushima et al. ............. 399/57
4,640,605 A    2/1987 Ariyama et al. ............ 399/225
4,720,731 A    1/1988 Suzuki et al. .............. 399/239

(List continued on next page.)

FOREIGN PATENT DOCUMENTS

| JP | 56-83755 | * | 7/1981 |
| JP | 58-194070 | * | 11/1983 |
| JP | 01-38773 | * | 2/1989 |
| JP | 04-80780 | * | 3/1992 |

Primary Examiner—Fred L Braun
(74) Attorney, Agent, or Firm—Oblon, Spivak, McClelland, Maier & Neustadt, P.C.

(57) ABSTRACT

A developing device for developing a latent image formed on an image carrier with a developing liquid includes a liquid storing section for storing the liquid including a developing substance and a carrier liquid. A developer carrier deposits the liquid fed from the liquid storing section thereon. A float type liquid level sensor senses a liquid level in the liquid storing section. The liquid level sensor includes a magnetic force generating member, a magnetic force sensing device, and floats movable up and down in accordance with the liquid level in the liquid storing section. A distance between the magnetic force generating member and the magnetic force sensing device varies in accordance with the movement of the floats, allowing the liquid level to be determined based on the output of the magnetic force sensing device. An image forming apparatus may include the developing device.

97 Claims, 29 Drawing Sheets

U.S. PATENT DOCUMENTS

| | | |
|---|---|---|
| 4,800,839 A | 1/1989 | Ariyama et al. ............... 399/57 |
| 4,801,965 A | 1/1989 | Mochizuki et al. ............ 399/29 |
| 4,833,500 A | 5/1989 | Mochizuki et al. ..... 399/240 X |
| 5,021,834 A | 6/1991 | Tsuruoka et al. ............ 399/249 |
| 5,155,534 A | 10/1992 | Kurotori et al. ............. 399/237 |
| RE34,437 E | 11/1993 | Ariyama et al. ............. 399/225 |
| 5,642,188 A | 6/1997 | Mochizuki et al. ......... 399/237 |
| 5,652,080 A | 7/1997 | Yoshino et al. ......... 399/240 X |
| 5,666,616 A | 9/1997 | Yoshino et al. ............. 399/240 |
| 5,708,938 A | 1/1998 | Takeuchi et al. ............. 399/250 |
| 5,809,388 A | 9/1998 | Inada et al. |
| 5,826,148 A * | 10/1998 | Iino et al. ................... 399/240 |
| 5,864,737 A | 1/1999 | Obu et al. |
| 5,923,930 A | 7/1999 | Tsukamoto et al. ......... 399/237 |
| 5,937,247 A | 8/1999 | Takeuchi et al. ............. 399/237 |
| 5,987,281 A | 11/1999 | Kurotori et al. ............. 399/237 |
| 5,987,282 A | 11/1999 | Tsukamoto et al. |
| 5,999,779 A | 12/1999 | Takeuchi .................... 399/239 |
| 6,038,421 A | 3/2000 | Yoshino et al. ............. 399/239 |
| 6,061,540 A | 5/2000 | Takeda ....................... 399/237 |
| 6,108,508 A | 8/2000 | Takeuchi et al. ............. 399/238 |
| 6,115,576 A | 9/2000 | Nakano et al. ............. 399/302 |
| 6,131,001 A | 10/2000 | Tsukamoto et al. ........... 399/57 |
| 6,134,394 A | 10/2000 | Tsukamoto et al. ........... 399/30 |
| 6,148,169 A | 11/2000 | Tsukamoto ................. 399/328 |
| 6,154,624 A | 11/2000 | Sasaki et al. ............... 399/250 |
| 6,236,825 B1 | 5/2001 | Takeuchi .................... 399/237 |
| 6,249,655 B1 * | 6/2001 | Baek et al. ............. 399/237 X |

\* cited by examiner

Fig. 3
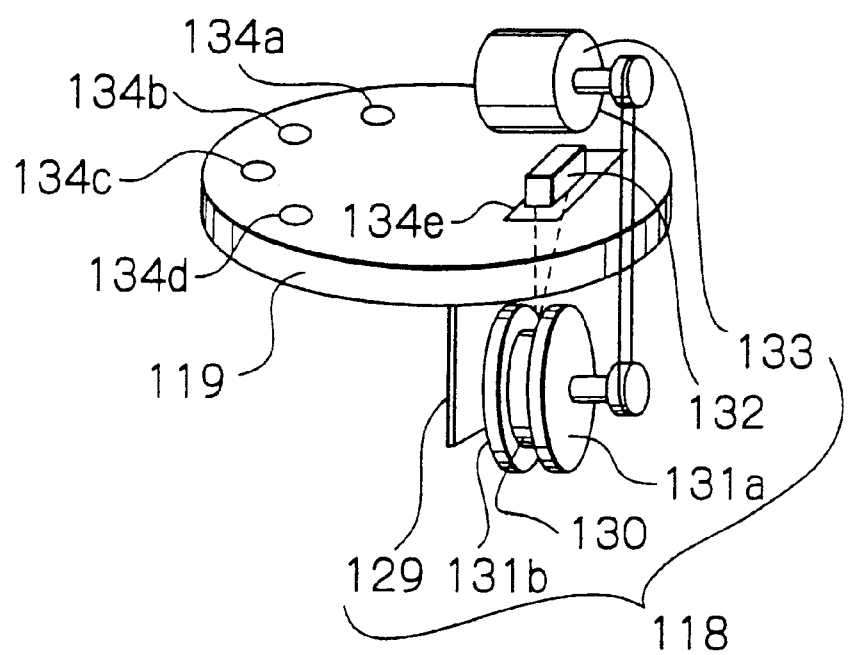
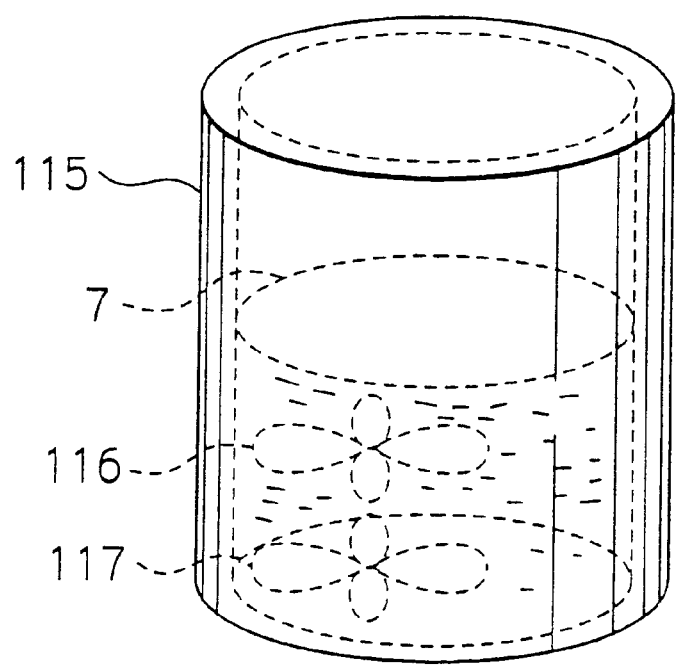

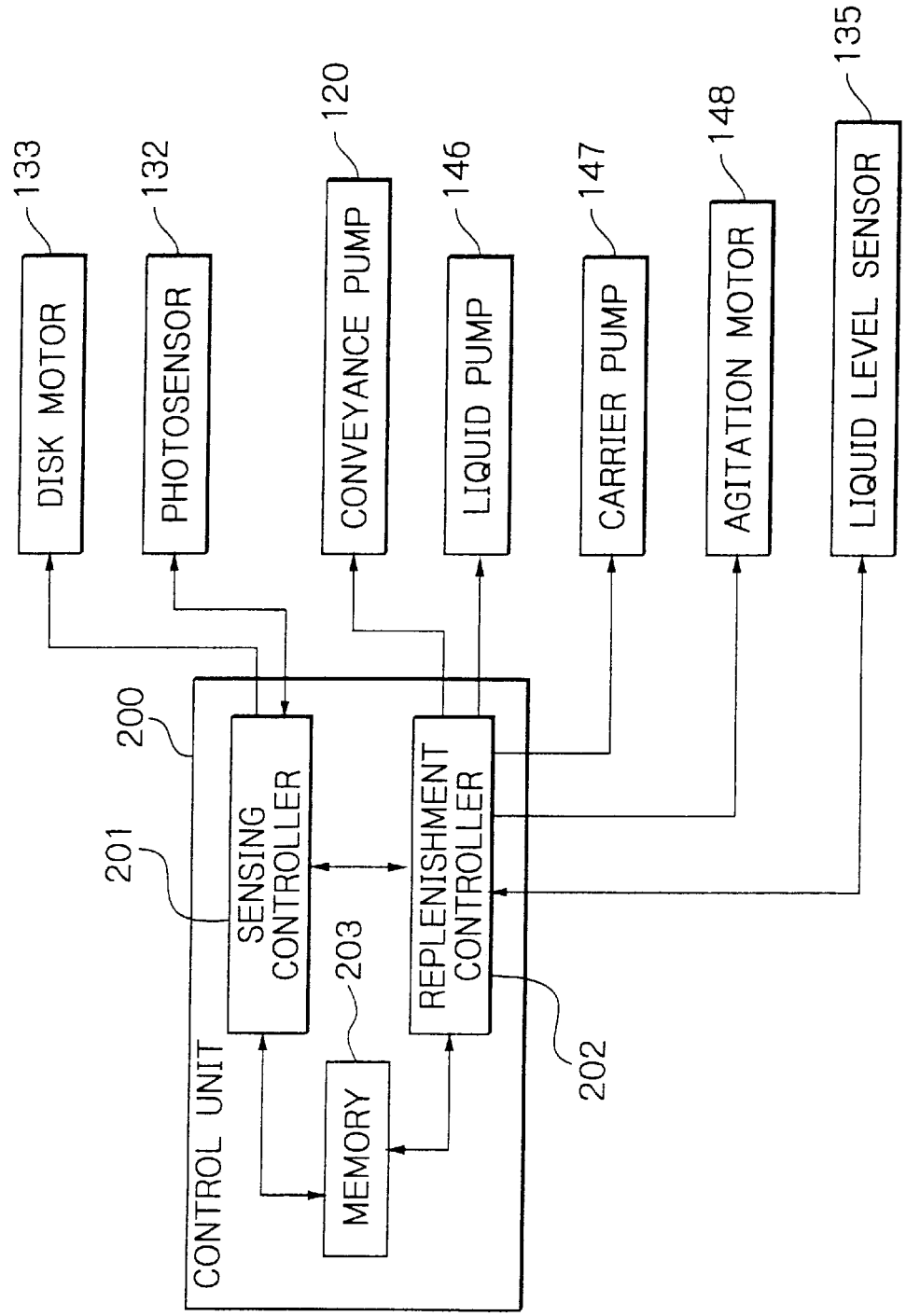

DEVELOPING DEVICE USING A DEVELOPING LIQUID INCLUDING A ROTATABLE AGITATOR IN A DEVELOPING LIQUID RESERVOIR AND IMAGE FORMING APPARATUS INCLUDING THE SAME

BACKGROUND OF THE INVENTION

1. Field of the Invention

The present invention relates to a developing device for developing a latent image formed on an image carrier with a developing liquid consisting of developing substance and a carrier liquid, and a copier, facsimile apparatus, printer or similar image forming apparatus including the same. More particularly, the present invention relates to a developing device including a reservoir storing the developing liquid and an agitator rotatable in the reservoir for agitating the developing liquid, and an image forming apparatus including the same.

2. Description of the Background Art

A developing device of the type using a developing liquid, which consists of toner or similar developing substance and a carrier liquid, is conventional. This type of developing device includes a cylindrical reservoir storing the developing liquid and a developing roller or similar developer carrier. The developer carrier conveys the developing liquid deposited thereon to a developing position where a photoconductive drum or similar image carrier is located. The developing liquid is transferred from the developer carrier to a latent image formed on the image carrier at the developing position, thereby developing the latent image. This kind of configuration is taught in, e.g., Japanese Patent Laid-Open Publication No. 11-352783.

The developing liquid customarily stored in the reservoir is thixotropic, i.e., it has relatively high viscosity and contains the developing substance by a content of 5% to 40%. The viscosity of the thixotropic liquid decreases little by little when subjected to a shearing force, but increases little by little when freed from the shearing force. An agitator implemented as a paddle is disposed in the reservoir and rotatable for agitating the developing liquid. The paddle in rotation causes the developing liquid to swirl and lower its viscosity little by little. At the same time, the toner or similar developing substance (simply toner hereinafter) is evenly dispersed in the entire developing liquid, providing the liquid with a uniform toner content.

A float type liquid level sensor is sometimes disposed in the reservoir for sensing a liquid level in the reservoir, so that preselected control is executed in accordance with the sensed liquid level. Typical of this type of liquid level sensor includes a magnet or similar magnetic force generating means, Hall elements, magnetic switches or similar magnetic force sensing device, and a float movable up and down in accordance with the liquid level. One of the magnetic force generating member and magnetic force sensing device is affixed to the float and movable up and down together with the float while the other of them is affixed to the reservoir. A distance between the magnetic force generating member and the magnetic force sensing device varies due to the up-and-down movement of the float. This allows the magnetic force sensing device to sense a liquid level in the reservoir.

The problem with the conventional float type liquid level sensor is that the float is sometimes positioned at a level different from the actual liquid level in the reservoir. For example, while the top of the float is usually positioned above the liquid level, the developing liquid deposits on the float due to the waves and eddies of the liquid. When only the liquid evaporates or drops along the side of the float, the toner is left on the top of the float. The toner sequentially accumulates on the top of the float due to repeated deposition, evaporation and drop, causing the float to sink due to the weight of the toner. Consequently, the float is positioned at a level different from the actual liquid level. Particularly, the toner easily accumulates on the top of the float when the developing liquid is thixotropic.

Further, the developing liquid in the reservoir usually flows due to agitation during operation, making the liquid level inconstant. More specifically, the liquid surface noticeably waves or sequentially rises outward from the center of agitation. When the actual level at the position of the float differs from the actual liquid level (still state), the float is positioned at a level different from the actual liquid level. As a result, the magnetic generating member or the magnetic force sensing device connected to the float is, of course, located at an unexpected level, producing a difference between the actual liquid level and the sensed liquid level.

Moreover, an eddy appears at the center of the developing liquid in the cylindrical reservoir. The eddy lowers the liquid level at the center while raising it at the periphery. In addition, friction acting between the developing liquid and the wall of the reservoir generates a force that obstructs the swirl of the liquid and thereby causes the liquid surface to wave. This also results in the difference between the actual liquid level and the sensed liquid level.

A toner content sensor, for example, is often disposed in the reservoir for sensing the toner content of the developing liquid. In this case, the paddle or agitator is located at a position offset from the center of the reservoir, so that the paddle does not contact the toner content sensor. The paddle should therefore be short enough for layout reasons and cannot sufficiently agitate the developing liquid in the reservoir. Furthermore, the paddle cannot sufficiently agitate the developing liquid in the up-and-down direction although it can agitate it in the horizontal direction.

In the developing device, the developing liquid is left on the developer carrier after development and on the image carrier after image transfer. Such residual liquids should preferably be collected by respective cleaners and returned to the reservoir to be reused. The collected liquids, however, often have toner contents different from the original content before development and therefore cause the toner content of the developing liquid stored in the reservoir to vary.

To solve the above problem, an arrangement may be made such that a carrier liquid, toner or similar developing substance, developing liquid or similar control agent is replenished to the reservoir in accordance with a toner content sensed by a toner content sensor, as proposed in the past. With this configuration, even when the collected liquids are returned to the reservoir and vary the toner content of the developing liquid in the reservoir, the control agent allows the liquid to restore its original toner content.

The thixotropic developing liquid is capable of forming an image in a smaller amount than a developing liquid whose standard toner content is lower than 5%. However, it is difficult to stabilize the toner content of the thixotropic developing liquid stored in the reservoir for the following reason.

It is a common practice with the developing device to add a control agent whose toner content is higher than the standard toner content to the developing liquid, which is diluted by the collected liquids. So long as a traditional developing liquid whose standard toner content is 1% or below is used, a thixotropic developing liquid having a toner content of about 10% can rapidly restore the standard toner content when added as a control agent. This is because a developing liquid whose toner content is far higher than the standard toner content can be added as a control agent and can therefore restore the standard toner content when added in a small amount. On the other hand, even when the developing liquid is thixotropic and has a toner content of 5% to 40%, a control agent whose toner content is higher than the standard content must be added when the developing liquid is diluted. However, the control agent cannot exhibit the properties of a liquid unless the toner content thereof is limited. It follows that the control agent must be replenished in a far greater amount than the traditional low toner content, low viscosity developing liquid. However, the amount of control agent that can be replenished to the reservoir is limited. Even if the control agent is replenished to the upper limit, then it often fails to effectively increase the toner content of the developing liquid in the reservoir. This makes it difficult to stabilize the toner content of the developer in the reservoir.

SUMMARY OF THE INVENTION

It is therefore a first object of the present invention to provide a developing device capable of reducing a difference between an actual liquid level in a reservoir and a liquid level sensed by a float type liquid level sensor, and an image forming apparatus including the same.

It is a second object of the present invention to provide a developing device capable of reducing an error in a sensed liquid level ascribable to the waving of a developing liquid in a reservoir, and an image forming apparatus including the same.

It is a third object of the present invention to provide a developing device capable of causing substantially the entire developing liquid in a reservoir to swirl and reduce its viscosity in contact with an agitator even when a content sensor and other members are arranged within the reservoir, and an image forming apparatus including the same.

It is a fourth object of the present invention to provide a developing device capable of sufficiently agitating a developing liquid in a reservoir in both of horizontal and up-and-down directions, and an image forming apparatus including the same.

It is a fifth object of the present invention to provide a developing device capable of stabilizing the toner content of a developing liquid in a reservoir more than conventional, and an image forming apparatus including the same.

A developing device for developing a latent image formed on an image carrier with a developing liquid of the present invention includes a liquid storing section for storing the liquid consisting of a developing substance and a carrier liquid. A developer carrier deposits the liquid fed from the liquid storing section thereon. A float type liquid level sensor senses a liquid level in the liquid storing section. The liquid level sensor includes a magnetic force generating member for generating a magnetic force, a magnetic force sensing device for sensing the magnetic force, and floats movable up and down in accordance with the liquid level in the liquid storing section. A distance between the magnetic force generating member and the magnetic force sensing device varies in accordance with the movement of the floats, allowing the liquid level to be determined on the basis of the output of the magnetic force sensing device.

An image forming apparatus including the above developing device is also disclosed.

BRIEF DESCRIPTION OF THE DRAWINGS

The above and other objects, features and advantages of the present invention will become more apparent from the following detailed description taken with the accompanying drawings in which:

FIG. 3 is an exploded isometric view showing a liquid adjusting section included in the developing unit;

FIG. 7 is a block diagram schematically showing electric circuitry included in the illustrative embodiment;

DESCRIPTION OF THE PREFERRED EMBODIMENTS

Preferred embodiments of the image forming apparatus in accordance with the present invention will be described hereinafter.

First Embodiment

Figure 1:
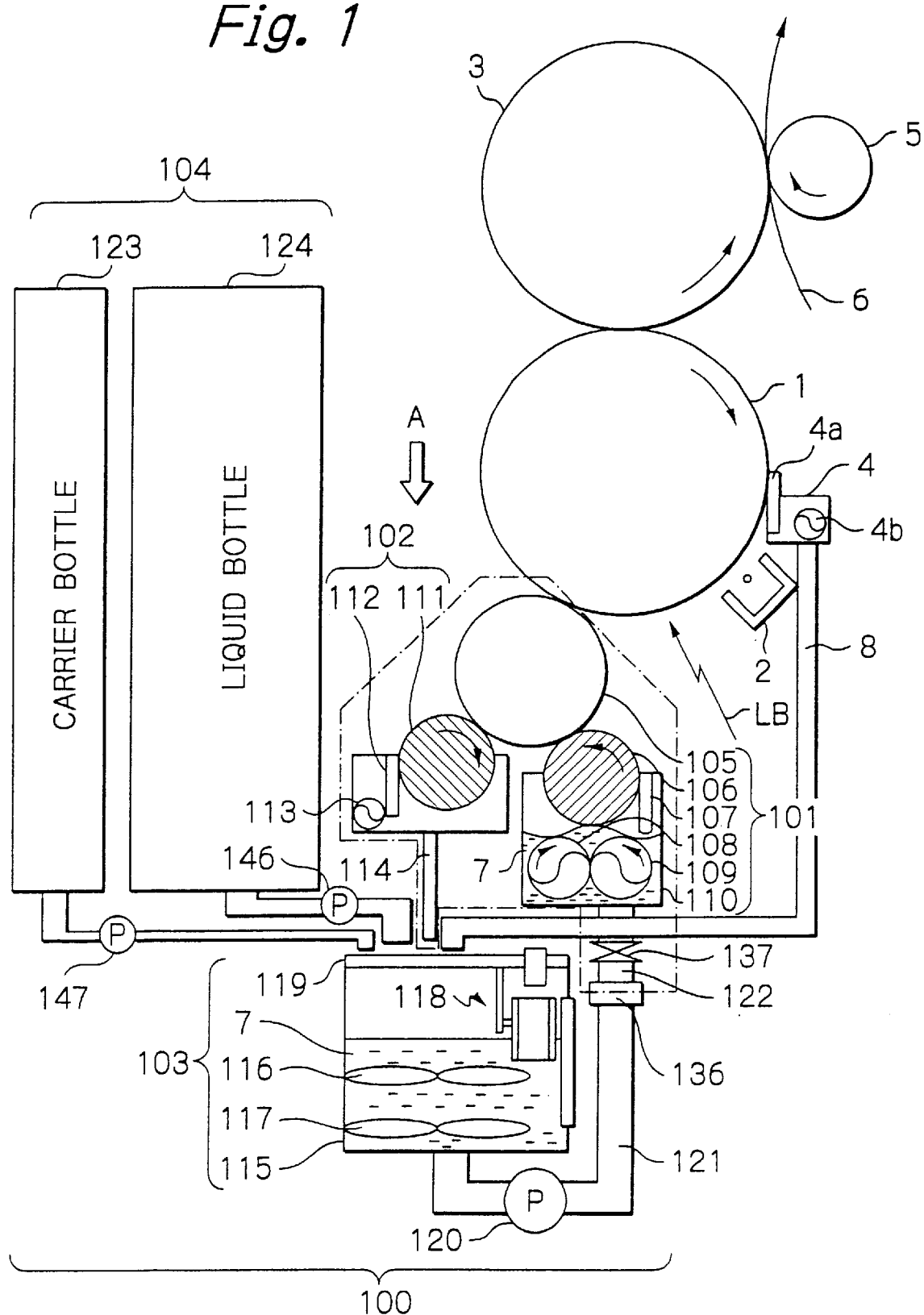
FIG. 1 is a view showing a first embodiment of an image forming apparatus in accordance with the present invention.

Referring to FIG. 1 of the drawings, an image forming apparatus embodying the present invention is shown and implemented as an electrophotographic printer by way of example. This embodiment is directed mainly toward the first object stated earlier. As shown, the printer includes a photoconductive drum (drum hereinafter) 1, which is a specific form of an image carrier. Arranged around the drum 1 are a charger 2, a developing unit or developing device 100, an intermediate image transfer drum (intermediate drum hereinafter) 3, and a drum cleaner 4 for cleaning the drum 1. A backup roller 5 is positioned at the right-hand side of the intermediate drum 3, as viewed in FIG. 1, and held in contact with the drum 3 to thereby form a nip having a preselected width.

A motor or similar drive means causes the drum 1 to rotate at a preselected speed in a direction indicated by an arrow in FIG. 1 (clockwise). The charger 2 uniformly charges the surface of the drum 1. An optical writing unit, not shown, scans the charged surface of the drum 1 with a laser beam LB in accordance with image data, thereby forming a latent image on the drum 1. The developing unit 100 develops the latent image with a developing liquid. The developed image is brought to the position where the drum 1 contacts the intermediate drum 3 in accordance with the rotation of the drum 1.

Drive means, not shown, causes the intermediate drum 3 to rotate at the same peripheral speed as the drum in a direction indicated by an arrow in FIG. 1 (counterclockwise). The developed image is transferred from the drum 1 to the intermediate drum 3 (primary transfer). The developed image is then conveyed to the nip between the intermediate drum 3 and the backup roller 5.

A sheet feeder, not shown, feeds a paper sheet or similar recording medium 6 to the nip at such a timing that the paper sheet 6 meets the developed image carried on the intermediate drum 3. At the nip, the developed image is transferred from the intermediate drum 3 to the paper sheet 6 (secondary transfer). Subsequently, a fixing unit, not shown, fixes the developed image on the paper sheet 6 with, e.g., heat. The paper sheet 6 with the fixed image is driven out of the printer.

After the primary transfer, some developing liquid is left on the drum 1 without being transferred to the intermediate drum 3. The drum cleaner 4 mechanically scrapes off such a developing liquid with a blade 4a. A screw 4b also included in the drum cleaner 4 conveys the developing liquid removed by the blade 4a to a collection pipe 8. The developing liquid drops in the collection pipe 8 to a second reservoir, which will be described later, due to gravity.

An intermediate drum cleaner, not shown, removes the developing liquid left on the intermediate drum 3 after the secondary transfer without being transferred to the paper sheet 6.

A discharge lamp, not shown, discharges part of the drum 1 moved away from the position where the drum 1 and intermediate drum 3 contact each other, thereby preparing the drum 1 for the next image formation.

The developing unit 100 is generally made up of a developing section 101, a collecting section or collecting means 102, a liquid adjusting section 103, and a replenishing section or content adjusting means 104. The developing section 101 includes a developing roller 105, a coating roller 106, a metering blade 107, a first screw 108, a second screw 109, and a first reservoir 110. A developing liquid (simply liquid hereinafter) 7, which is a toner and carrier liquid mixture, is stored in the first reservoir 110 in an amount of about 100 cc to 150 cc. It is to be noted that toner is representative of a developing substance. The liquid 7 has viscosity controlled to 100 mPa·s to 10,000 mPa·s and toner content controlled to 5% to 40%. More specifically, in the illustrative embodiment, the liquid 7 has viscosity of about 300 mPa·s and toner content of 15%.

The coating roller 106 is positioned in the first reservoir 110 above the liquid 7 such that the roller 106 does not contact the surface of the liquid 7 in a stand-by state. The first and second screws 108 and 109 are also positioned in the first reservoir 110 in parallel to each other. On the start of printing operation, drive means, not shown, causes the two screws 108 and 109 to rotate in opposite directions to each other. As a result, the surface of the liquid 7 above the screws 108 and 109 rises and contacts the coating roller 106. Drive means, not shown, causes the coating roller 106 to rotate counterclockwise as viewed in FIG. 1. While the coating roller 106 conveys the liquid 7 deposited thereon, the metering blade 107 regulates the thickness of the liquid 7 to thereby form a thin liquid layer. Part of the thin liquid layer is applied to the developing roller 105, which is rotating in contact with the coating roller 106, at a rate of about 30 cc for a minute. The developing roller 105 then conveys the liquid 7 to a developing position where the roller 105 contacts the drum 1, thereby developing the latent image. The liquid 7 left on the developing roller 105 after the development is brought to a position where the roller 105 faces the collecting section 102 in accordance with the rotation of the roller 105.

The collecting section 102 includes a collecting roller 111, a blade 112, a screw 113, and a pipe 114. The collecting roller 111 rotates in contact with part of the surface of the developing roller 105 moved away from the developing position and thereby collects the liquid 7 left on the roller 105. The blade 112 mechanically scrapes off the liquid 7 collected by the collecting roller 111. The screw 113 conveys the liquid 7 removed by the blade 112 to the pipe 114, which terminates at the previously mentioned second reservoir.

The liquid adjusting section 103 includes a second reservoir 115, paddles or agitators 116 and 117, a content signal outputting device 118, a pump 120, and a pipe 121. The second reservoir 115 also stores the liquid 7 and has its open top closed by a lid 119. The content signal outputting device 118 constitutes toner content sensing means responsive to a toner content in combination with a control unit not shown.

A motor, not shown, causes the paddles 116 and 117 to rotate in the second reservoir 115 so as to rotate, or agitate, the liquid 7 in substantially the horizontal direction. The toner content sensing means mentioned above senses the toner content of the liquid 7 being so agitated.

The pipe 121 is connected to the bottom of the second reservoir 115 at one end and connected to a drain pipe 122 belonging to the first reservoir 110 at the other end. The pump 120 is positioned at the intermediate portion of the pipe 121. The pump 120 delivers the liquid 7 from the second reservoir 115 to the first reservoir 110. When the amount of the liquid 7 delivered from the reservoir 115 to the reservoir 110 is excessive, the liquid level in the reservoir 115 rises. As a result, excessive part of the liquid 7 overflows the reservoir 110 and returns to the reservoir 115 via an overflow pipe not shown.

The replenishing section 104 includes a carrier bottle 123 storing a carrier liquid and a liquid bottle 124 storing a developing liquid. A carrier pump 147 delivers the carrier liquid from the carrier bottle 123 to the second reservoir 115. A liquid pump 146 delivers the developing liquid from the liquid bottle 124 to the second reservoir 115. The control unit or control means, not shown, controls the operation of the replenishing section 104. The developing liquid in the liquid bottle 124 has a toner content controlled to 15%, which is desirable for development. This toner content is used as a standard toner content in the illustrative embodiment.

Specifically, the control unit controls the liquid pump 146 and carrier pump 147 in accordance with a toner content signal output from the content signal outputting device 118. The pumps 146 and 147 replenish an adequate amount of developing liquid and an adequate amount of carrier liquid, respectively, to the second reservoir 115, thereby controlling the toner content of the liquid 7 in the reservoir 115. Therefore, even when the mixture of the liquid 7 collected from the developing roller 105 and the liquid 7 collected from the drum 1 has a toner content different from the original toner content of the fresh liquid 7, the mixture can be returned to the second reservoir 115 and reused.

In the developing unit 100, the developing section 101 and collecting section 102 are constructed into a single cartridge, as indicated by a dash-and-dot line in FIG. 1. The cartridge is easily removable from the other part of the developing unit 100 and from the printer body at the time of repair or maintenance. A coupling 136 connects the drain pipe 122 of the cartridge to the pipe 121 of the liquid adjusting section 103.

A desirable procedure for dismounting the above cartridge from the printer body will be described hereinafter. First, the pump 120 of the liquid adjusting section 103 is driven in the reverse direction in order to return the liquid 7 in the first reservoir 110 to the second reservoir 115. Subsequently, after a drain valve 137 included in the drain pipe 122 has been closed, the coupling 136 is manipulated to separate the drain pipe 122 and pipe 121. The drain valve 137 closed before the separation of the drain pipe 122 and 121 prevents the liquid 7 left in the first reservoir 110 and drain pipe 122 from wastefully leaking. The pump 120 included in the pipe 121 successfully prevents the liquid 7 in the second reservoir 115 from leaking when the pipe 121 and drain pipe 122 are separated. To help the pump 120 obviate such leakage, the coupling 136 may be provided with a valve function, if desired.

Figure 2:
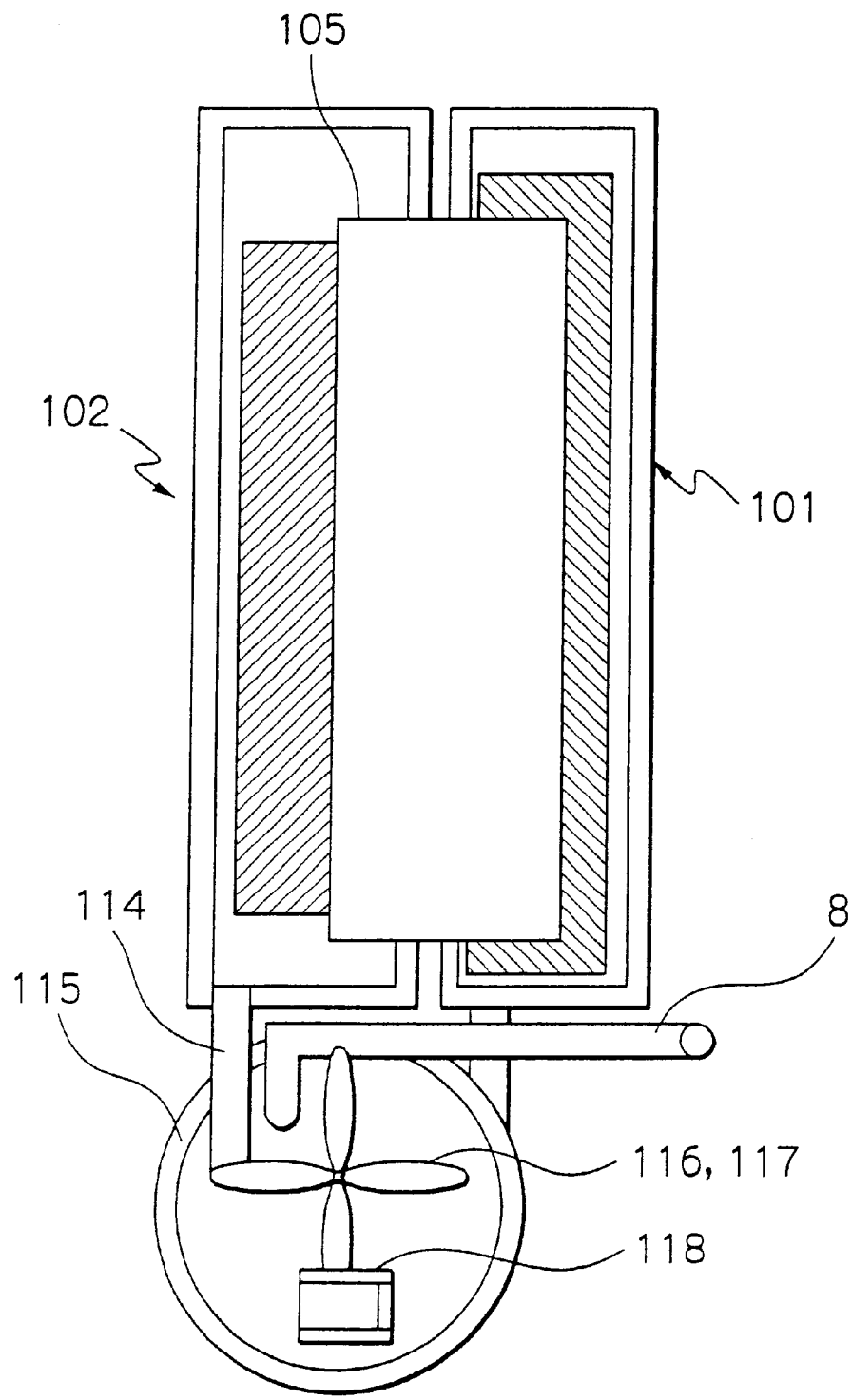
FIG. 2 is a plan view showing a developing unit included in the first embodiment.

As shown in FIGS. 2 and 3, the content signal outputting device 118 includes a support plate 129 protruding from the underside of the lid 119 and a photosensor 132 positioned above the lid 119. The device 118 additionally includes a disk unit rotatably mounted on the support plate 129 and a disk motor 133 for causing the disk unit to rotate.

As shown in FIG. 3, the lid 119 is formed with four circular holes 134a, 134b, 134c and 134d and a rectangular hole 134e. The pipe 8 of the drum cleaner 4, the pipe 114 of the collecting section 102, the pipe extending from the liquid bottle 124 and the pipe extending from the carrier bottle 123 are respectively guided into the second reservoir 115 via the circular holes 134a through 134d. The above pipes each have an end positioned above the liquid level in the second reservoir 115 and cause the associated liquid to drop to the liquid level. This prevents the liquids from staying in the pipes and stopping them up.

The disk unit is made up of a pair of outer disks 131a and 131b and an inner disk 130 sandwiched between the outer disks 131a and 131b. The inner disk 130 is smaller in diameter than the outer disks 131a and 131b and rotatable about an axis offset from the axis of rotation of the outer disks 131a and 131b. The circumferential surface of the inner disk 130 is polished.

When the disk unit rotates with part of its circumference immersed in the liquid 7, the liquid 7 fills a circumferential groove formed between the inner disk 130 and the outer disks 131a and 131b. The width of the groove sequentially varies in the circumferential direction because the inner disk 130 is eccentric with respect to the axis of the outer disks 131a and 131b. A metering blade, not shown, contacts the circumference of the outer disks 131a and 131b. The liquid 7 therefore forms a film varying in width in the circumferential direction in part of the above groove moved away from the metering blade.

The photosensor 132 has a light emitting element and a light-sensitive element although not shown specifically. The light emitting element emits light toward the liquid film formed in the groove via a hole 134e formed in the lid 119. The polished surface of the inner disk 130, i.e., the bottom of the groove reflects the light incident thereto via the liquid film. The reflected light is incident to the light-sensitive element via the liquid film and hole 134e. The light-sensitive element sends a signal representative of the quantity of incident light to the control unit.

The quantity of light transmitted through the liquid film depends on the toner content of the liquid 7. However, the problem with the thixotropic liquid 7 whose toner content is high is that it causes the quantity of transmission to noticeably vary with respect to toner content. Specifically, if the liquid film has constant thickness, it transmits light or does not transmit it when the toner content slightly varies. In light of this, the content signal outputting device 118 provides the liquid film formed in the annular groove with a slope in thickness, so that the liquid film transmits the light with various widths. This allows the liquid film to surely transmit the light before the disk unit completes one rotation.

The output of the light-sensitive element continuously varies in accordance with the rotation angle of the disk unit, i.e., the thickness of the liquid film. The integrated output value for a single rotation of the disk unit corresponds to the total quantity of light incident to the light-sensitive element and is correlated to the toner content of the liquid 7. The control unit integrates the varying output of the light-sensitive element while the disk unit makes one rotation, and calculates a toner content on the basis of the result of integration.

With the above-described toner content sensing means, it is possible to determine the toner content of the liquid 7 despite that the liquid 7 is thixotropic.

The reflection type photosensor 132 may be replaced with a transmission type photosensor, if desired. The transmission type photosensor includes one of a light emitting element and a light-sensitive element disposed in the inner disk 130, which is, in this case, formed of glass, resin or similar transparent material. The other of the light emitting element and light-sensitive element is positioned outside of the disk unit. Light issuing from the light emitting element is transmitted through the liquid film only once and incident to the light-sensitive element.

Figure 4A:
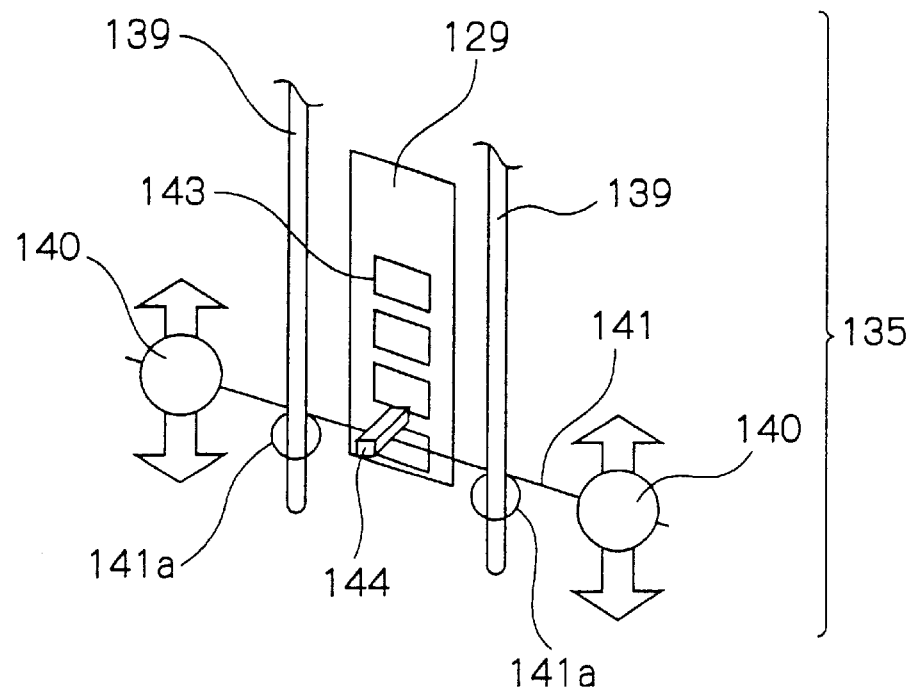
FIG. 4A is an isometric view showing a float type liquid level sensor included in the liquid adjusting section.

Arrangements unique to the illustrative embodiment will be described hereinafter. FIG. 4A shows a float type liquid level sensor 135 included in the liquid adjusting section 103. As shown, the liquid level sensor 135 includes two spherical floats 140, two guide rods 139 guiding the floats 140 in the up-and-down direction, a ring pin 141, four Hall elements or magnetic force sensing means 143, and a magnetic force generating member 144. The ring pin 141 has a pair of ring portions 141a. The guide rods 139 are studded on the underside of the lid 119, FIG. 1, and respectively passed through the ring portions 141a.

The floats 140 floating in the liquid 7, FIG. 1, are supported by opposite ends of the ring pin 141 and movable up and down in accordance with the liquid level. The guide rods 139 prevent the floats 140 from being entrained by the liquid 7 in the direction in which the liquid 7 swirls. The magnetic force generating member 144 is affixed to the intermediate portion of the ring pin 141.

The support plate 129, FIG. 3, also affixed to the underside of the lid 119, FIG. 1, is positioned between the two guide rods 139 and faces the magnetic force generating member 144. The four Hall elements 143 are arranged on the support plate 129 one above the other. The top Hall element 143 to the bottom Hall element 143 are respectively responsive to an upper-limit liquid level (level C), a standard liquid level (level B), a lower-limit liquid level (level A), and an emergency-stop liquid level. When the liquid level in the second reservoir 115 falls below the lower limit, the disk unit is entirely positioned above the liquid 7. When the liquid level rises above the upper limit, the disk unit is entirely immersed in the liquid 7. In any case, the liquid 7 fails to form a film on the disk unit and prevents toner content from being sensed.

A voltage of, e.g., 5 V is applied to each Hall element 143. When the Hall element 143 senses a magnetic force of S pole or N pole, it sends its output of 0 V to a replenishment controller, which will be described later. Specifically, when the floats 140 rise or fall in accordance with the liquid level, one of the Hall elements 143 positioned at the same level as the floats 140 senses the magnetic force of the magnetic force generating member 144.

The Hall elements 143 are not affixed to the floats 140, but affixed to the support plate 129. It follows that wires, not shown, for feeding power and interchanging signals can be connected to the Hall elements 143 without being extended through the liquid 7. This prevents such wires from coiling round the floats 140, ring pin 141 and guide rods 139 despite the up-and-down movement of the floats 140.

The floats 140 should preferably be formed of polystyrene, polyethylene, polypropylene or similar foam resin whose specific gravity is smaller than the specific gravity of the liquid 7. In the illustrative embodiment, use is made of polystyrene having specific gravity of 0.02 $g/cm^3$ to 0.6 $g/cm^3$. As for configuration, the floats 140 should preferably have as small a surface area as possible so as to be desirably floatable. As the area of each float 140 at the side counter to the flow of the liquid 7 increases, the float 140 more vibrates and causes turbulence to occur in the liquid 7. Further, as the area of each float 140 increases, resistance to floating increases in the liquid 7 and thereby degrades the response of the float 140.

In the liquid level sensor 135 shown in FIG. 4A, the toner contained in the liquid 7 and deposited on the spherical floats 140 drops on and along the spherical surfaces of the floats 140 together with the liquid carrier. The toner then reaches the liquid level in the second reservoir 115 and joins the liquid 7. The toner therefore accumulates on the floats 140 little. This reduces the sinking of the floats 140 ascribable to the toner deposited thereon and thereby reduces a difference between the actual liquid level in the reservoir 115 and the liquid level sensed by the sensor 135. Further, the spherical floats 140 are subjected to less resistance ascribable to the flow of the liquid 7 than rectangular floats and therefore move little in the up and down direction.

Figure 5A:
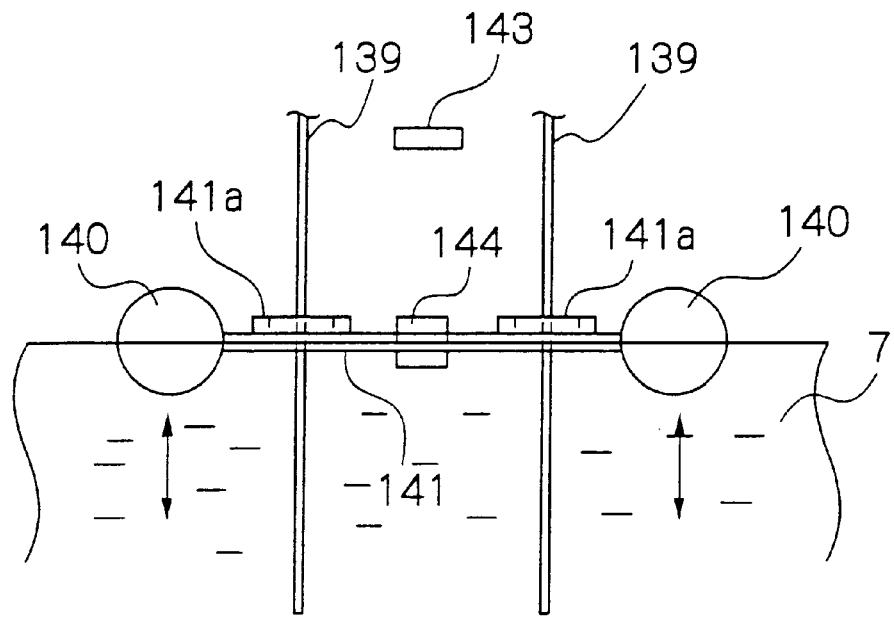
FIGS. 5A and 5B are views demonstrating the operation of the liquid level sensor.
Figure 5B:
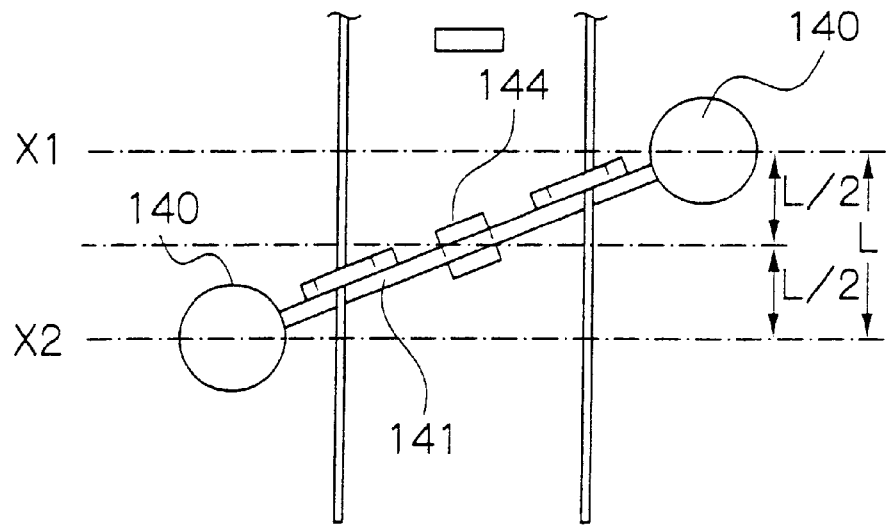

Moreover, the liquid level sensor 135 allows a minimum of change to occur in the level of the magnetic force generating member 144 due to the waving of the liquid level and thereby reduces the difference between the actual liquid level and the sensed liquid level. This will be described specifically with reference to FIGS. 5A and 5B. Assume that the liquid 7 in a still condition shown in FIG. 5A is agitated to wave. Then, as shown in FIG. 5B, the floats 140 each float at a particular liquid level, causing the ring pin 141 to incline. As a result, the magnetic force generating member 144 is positioned at a level substantially intermediate between the above liquid levels.

In FIG. 5B, assume that a liquid level x1 where the right float 140 is positioned is the original liquid level in the still condition. Then, the left float 140 is floating at a level lower than the original level x1 by a distance L. Should only one float be used, the magnetic force generating member 144 would also sink by the distance L. In the illustrative embodiment, the magnetic force generating member 144 sinks only by one-half of the distance L, i.e., L/2.

Conversely, assume that the liquid level x2 where the left float 140 is positioned is the original liquid level. Then, the right float 140 rises above the original liquid level x2 by the distance L. However, the magnetic force generating member 144 rises only by a distance of L/2.

Further, assume that one float 140 falls below an original liquid level while the other float 140 rises above the original liquid level. Then, the magnetic force generating member 144 can float at a level close to the original liquid level.

As stated above, the liquid level sensor 135 causes the level of the magnetic force generating member 144 and that of the magnetic force sensing means to vary little despite waving. This successfully reduces the difference between the actual liquid level in the reservoir and the liquid level sensed by the sensor 135.

The ring pin 141 inclines when the two floats 140 each float at a particular liquid level, as stated earlier. The maximum inclination of the ring pin 141 can be delicately set only if the distance between the two ring portions 141a and the clearance between the inner wall of each ring portion 141a and the associated guide rod 139 are adjusted.

In the illustrative embodiment, the kind of the liquid 7 that the user of the printer is expected to use is specified. Specifically, an operation manual attached to the printer may include a message specifying the kind of the liquid 7, e.g., "Use a liquid A available from a company B." The floats 140 are formed of foam resin smaller in specific gravity than the liquid 7 of the specified kind. Therefore, so long as the user uses the specific liquid 7, the floats 140 do not sink in the liquid 7 at all.

The output signals of the Hall elements 143 are sent to the replenishment controller to be described later. The replenishment controller determines whether or not at least one of the Hall elements 143 is outputting a sense signal. If the result of this decision is negative, then the replenishment controller displays an error message on, e.g., a display not shown. If the answer of the above decision is positive, the replenishment controller determines whether or not the second Hall element 143 from the bottom responsive to the lower limit is outputting a sense signal. If the second Hall element 143 is outputting a sense signal, then the replenishment controller determines that the liquid 7 has decreased to the lower-limit liquid level or below.

In the illustrative embodiment, the Hall elements 143 are so arranged as to obviate a dead space as to sensing. The liquid level sensor 135 is configured to sense the variation of the liquid level over 20 mm.

Figure 4B:
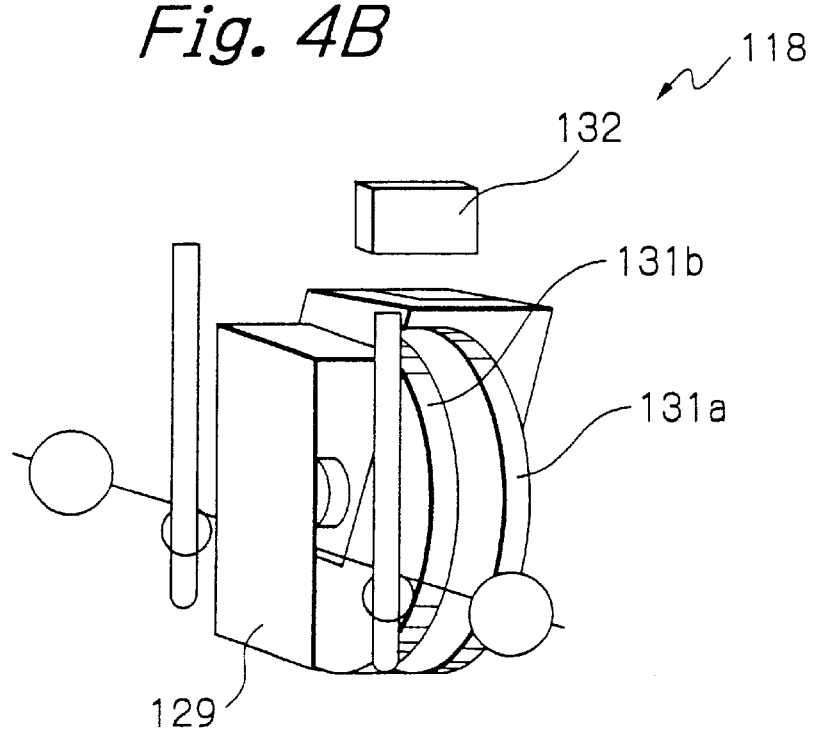
FIG. 4B is an isometric view showing the liquid level sensor together with a content signal outputting device.

As shown in FIG. 4B, the liquid level sensor 135 is constructed into a unit together with the content signal outputting device 118. Such a unit can be arranged in the second reservoir 115 in a compact configuration.

Figure 6A:
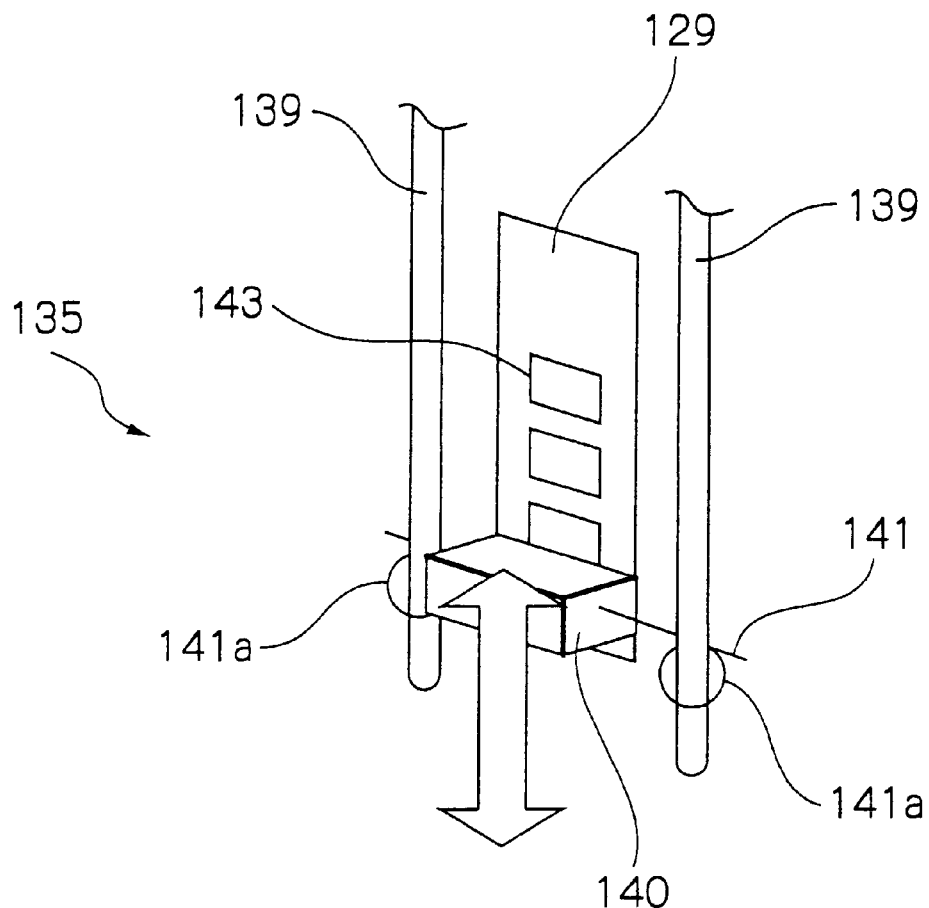
FIGS. 6A and 6B are isometric views showing a modification of the liquid level sensor.
Figure 6B:
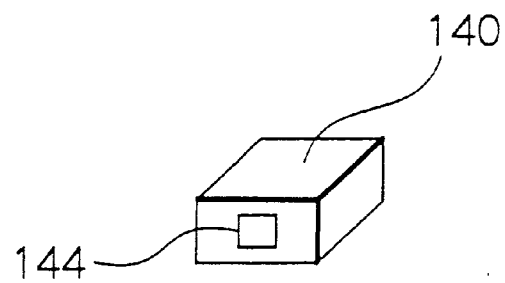

FIGS. 6A and 6B show a comparative configuration of the liquid level sensor 135. As shown, the sensor 135 includes a single float 140 implemented as a square block. In this configuration, toner is likely to accumulate on the top of the float 140 and causes the float 140 to float at a level lower than the expected level due to the weight of the toner. Further, the float 140 cannot cause the ring pin 141 to incline, as shown in FIG. 5B, failing to reduce the variation of the level of the magnetic force generating member 144 ascribable to waving.

FIG. 7 shows essential part of electric circuitry arranged in the printer. As shown, a control unit or control means 200 includes a sensing controller 201, a replenishment controller 202, and a memory 203. The sensing controller 201 and replenishment controller 202 are interconnected to interchange data with each other and are connected to the memory 203. Further, the sensing controller 201 is connected to the disk motor 133 assigned to the disk unit and photosensor 132. The replenishment controller 202 is connected to the conveyance pump 120, liquid pump 146, carrier pump 147 and liquid level sensor 135 as well as to an agitation motor 148 assigned to the paddles 116 and 117.

Figure 8:
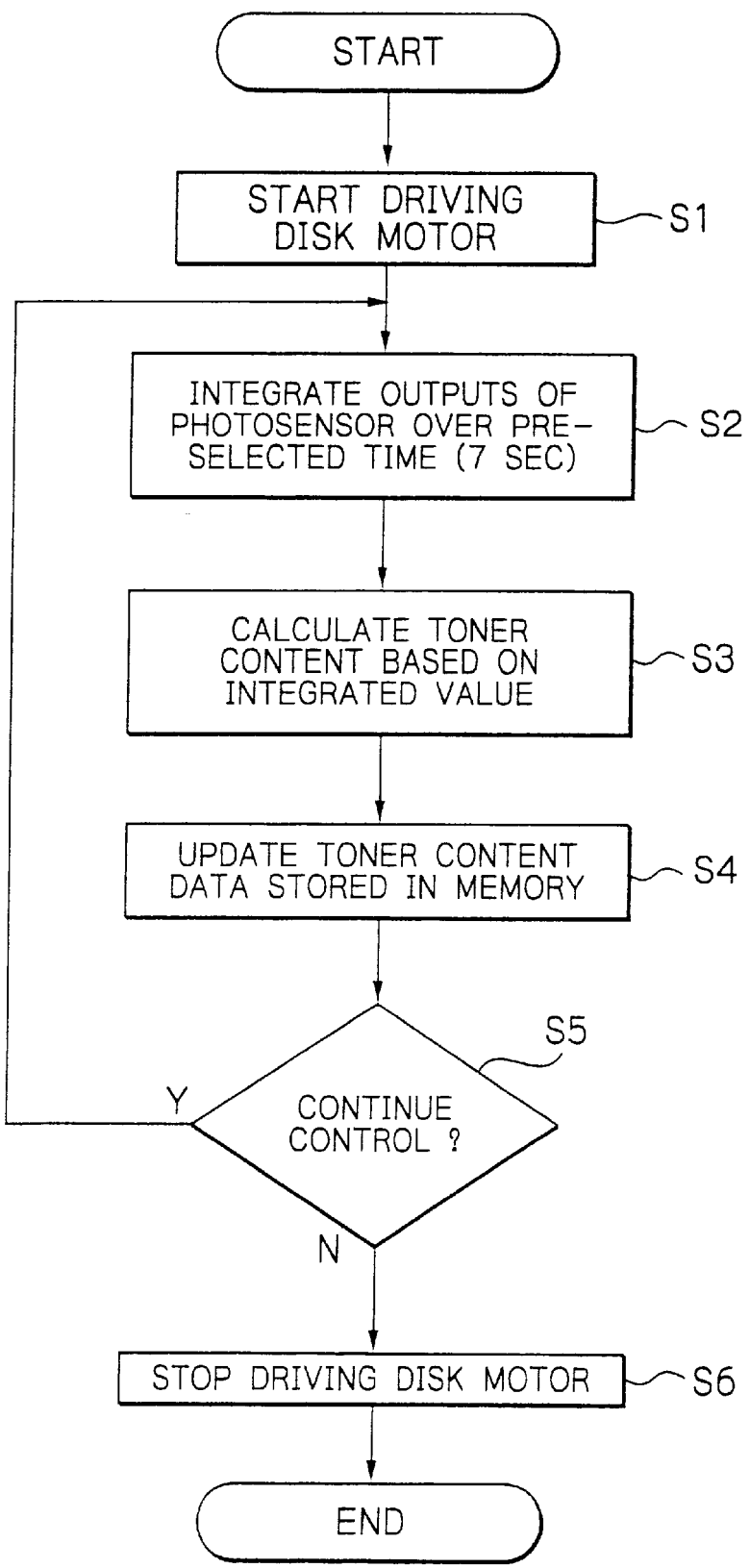
FIG. 8 is a flowchart demonstrating a specific operation of a sensing controller included in the circuitry of FIG. 7.

Reference will be made to FIG. 8 for describing a specific procedure to be executed by the sensing controller 201. The sensing controller 201 executes the procedure to be described at a preselected period. As shown, the sensing controller 201 starts driving the disk motor 133 to thereby rotate the disk unit included in the content signal outputting device (step S1). As a result, the liquid 7 in the second reservoir 115 forms a film on the disk unit, as stated earlier.

Subsequently, the sensing controller 201 integrates the continuous output of the light-sensitive element of the photosensor 132 over a preselected period of time (step S2). The preselected period of time is one necessary for the disk unit to complete one rotation and is selected to be about 7 seconds in the illustrative embodiment. On completing the step S2, the sensing controller 201 calculates the toner content of the liquid in the second reservoir 115 on the basis of the result of integration (step S3). For this purpose, the sensing controller 201 may scan a database, which lists correspondence between integrated values and toner contents, in order to find a toner content matching with the result of integration. Alternatively, the sensing controller 201 may substitute the result of integration for an algorithm representative of a relation between the integrated value and the toner content.

After the step S3, the sensing controller 201 updates toner content data stored in the memory 203 with the calculated toner content (S4) and then determines whether or not to continue the control procedure (step S5). If the procedure should be continued because, e.g., development is under way (Y, step S5), then the sensing controller 201 returns to the step S2. If the answer of the step S5 is negative (N), then the sensing controller 201 stops driving the disk motor 133 (step S6) and ends the procedure.

The procedure described above repeats integration until the sensing controller 201 confirms the stop of the disk motor 133 in the step S6. As a result, the toner content data stored in the memory 203 is repeatedly updated. While the step S2 consumes about 7 seconds, the other processing completes almost instantaneously. Therefore, a single toner content calculating time (steps S2 through S5) required is only a little over 7 seconds.

Figure 9:
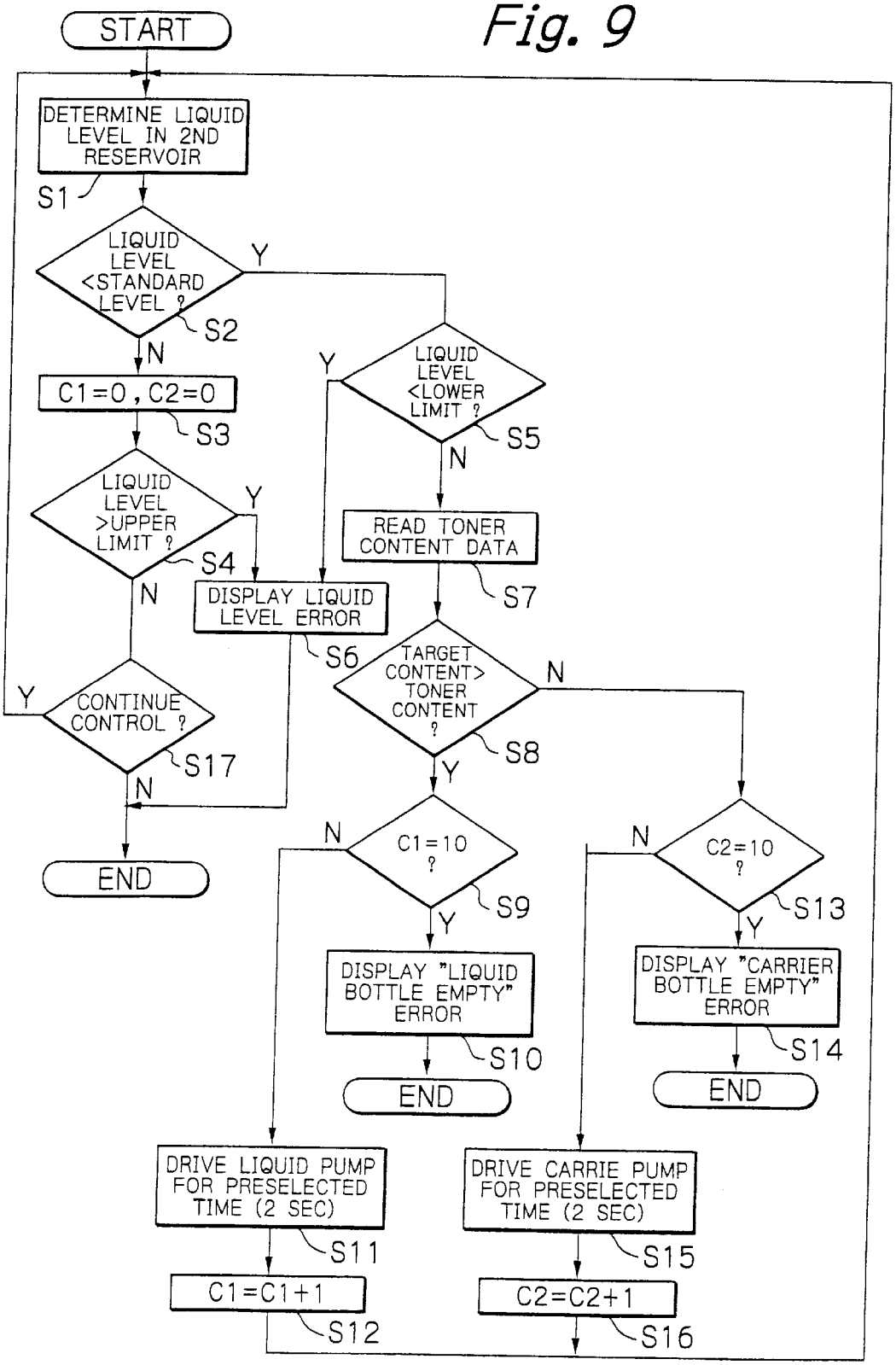
FIG. 9 is a flowchart demonstrating a specific operation of a replenishment controller also included in the circuitry of FIG. 7.

FIG. 9 shows a specific procedure to be executed by the replenishment controller 202. Briefly, the replenishment controller 202 replenishes either one of the carrier liquid and developing liquid to the second reservoir 115 in accordance with the level of the liquid 7 in the reservoir 115 and the toner content data stored in the memory 203. As a result, the toner content of the liquid 7 is controlled to the standard toner content mentioned earlier.

The procedure of FIG. 9 will be outlined first. The replenishment controller 202 determines the liquid level in the second reservoir 115 (step S1) and then determines whether or not the liquid level is lower than the standard liquid level (level B) (step S2). If the answer of the step S2 is Y, then the replenishment controller 202 replenishes the carrier liquid or the developing liquid to the reservoir 115 over the preselected period of time (step S11 or S14) and again executes the step S1. If the actual liquid level is higher than the standard liquid level (N step S2), then the replenishment controller 202 ends the procedure without any replenishment. In this manner, when the replenishment controller 202 started the procedure at a preselected period determines that the actual liquid level is lower than standard level, it replenishes the carrier liquid or the developing liquid until the former rises to the latter.

If the actual liquid level is coincident with the standard liquid level, then the step S1 is followed by steps S2, S3, S4 and S17. In the step S17, the replenishment controller 202 determines whether or not to continue the procedure. If the procedure should be continued because, e.g., development is under way (Y, step S17), then the controller 202 returns to the step S1. If the answer of the step S17 is N, the controller 202 ends the procedure.

So long as the printer is free from errors, the replenishment controller 202 executing the above procedure maintains the actual liquid level around the standard level because the actual level varies between the standard level and a level slightly below the standard level. However, there is a fear that the actual liquid level falls below the lower limit (level A) or rises above the upper limit (level C) due to, e.g., the failure of any one of the pumps and liquid level sensor 135 or the consumption of the carrier liquid or the developing liquid to be replenished. To solve this problem, the replenishment controller 202 determines whether or not the actual liquid level is abnormal (step S4 or S5). If the liquid level is abnormal (Y, step S4 or S5), then the controller 202 displays a liquid level error on the display and ends the procedure.

Further, the replenishment controller 202 determines whether or not the control agent has been used up, i.e., whether or not the liquid bottle 124 or the carrier bottle 123 has run out of the developing liquid or the carrier liquid. If the control agent has been used up, then the replenishment controller 202 displays a bottle error message, e.g., "Liquid bottle is empty." or "Carrier bottle is empty." on the display and ends the procedure. More specifically, the controller 202 drives the liquid pump 146 or the carrier pump 147 over a preselected period of time to thereby replenish the developing liquid or the carrier liquid as a control agent (step S11 or S15). If the liquid level does not rise despite repeated replenishment, then the controller 202 determines that the liquid bottle 124 or the carrier bottle 123 is empty. In the illustrative embodiment, the controller 202 drives the liquid pump 146 or the carrier pump 147 for 2 seconds each time and again determines the liquid level (step S1). If the liquid level determined in the step S1 is short of the standard level (level B), then the controller 202 again drives the liquid pump 146 or the carrier pump 147.

Every time the controller 202 drives the liquid pump 146 or the carrier pump 147, it increments the drive count C1 of the pump 146 or the drive count C2 of the pump 147 by 1 (one) (step S12 or S16). The controller 202 then determines whether or not the drive count C1 or C2 has reached "10" (step S9 or S13). If the answer of the step S9 or S13 is Y, then the controller 202 displays the bottle error message (step S10 or S14). When the liquid level reaches the standard level (level B), the controller 202 resets the drive count C1 or C2 to zero (step S3) and then ends the procedure.

The controller 202 determines which of the developing liquid and carrier liquid should be replenished by referencing data stored in the memory 203. Specifically, the controller 202 reads the previously mentioned toner content data and a target toner content stored in the memory 203 (step S7) and compares them (step S7). If the toner content data is smaller than the target toner content (N, step S8), then the controller 202 replenishes the developing liquid. If the toner content data is greater than or equal to the target toner content (N, step S8), then the controller 202 replenishes the carrier liquid. In the illustrative embodiment, the target toner content is selected to be 18%. Therefore, the controller 202 replenishes the carrier liquid if the toner content reaches 18%. While a toner content desirable for development, like the toner content of the liquid in the liquid bottle 124, is 15%, development density does not vary if the above toner content is 15±3%, i.e., lies in a range of from 12% to 18%.

The toner content of the developing liquid stored in the liquid bottle 124 is 15%, which is the standard toner content. Therefore, when the toner content of the liquid 7 in the second reservoir 115 is above 15%, but below 18%, the replenishment of the liquid from the liquid bottle 124 dilutes the liquid 7 in the reservoir 115. This, however, successfully reduces the fall of toner content ascribable to replenishment in the range of from 15% to 18% and thereby reduces short development density, compared to the case wherein the target density is selected to be 15%. The developing liquid to be replenished from the liquid bottle 124 may be provided with a toner content higher than 15%, if desired.

The pump drive effected in the step S11 or S15 consumes 2 seconds, as stated above. However, the other processing completes almost instantaneously, so that the steps S1 through S12 or the steps S1 through 16 consumes only a little over 2 seconds. On the other hand, the toner content data is not updated over a little over 7 seconds, which is a single toner content calculating time. It follows that when the controller 202 repeatedly controls the toner content, the same toner content data is read out of the memory 203 and used at least three times.

As stated above, the replenishment controller 202 can execute the expected control based on the toner content data stored in the memory 203 without waiting until the sensing controller 201 calculates a toner content.

In the illustrative embodiment, the replenishment controller 202 uses the drive count C1 or C2 for determining whether or not the liquid bottle 124 or the carrier bottle 123 is empty. Alternatively, the bottles 123 and 124 each may be provided with sensing means responsive to the amount of residual liquid and sending its output to the controller 202. The sensing controller 201 and replenishment controller 202 may be implemented as, e.g., a single CPU (Central Processing Unit), so that control over toner content sensing and control over toner content adjustment can be executed in parallel.

When the actual liquid level reaches the emergency-stop liquid level, it is likely that the paddle 116 bodily appears above the liquid surface and scatters the liquid 7. In this case, the replenishment controller 202 stops the operation of the entire printer, although not shown in FIG. 9.

Figure 10:
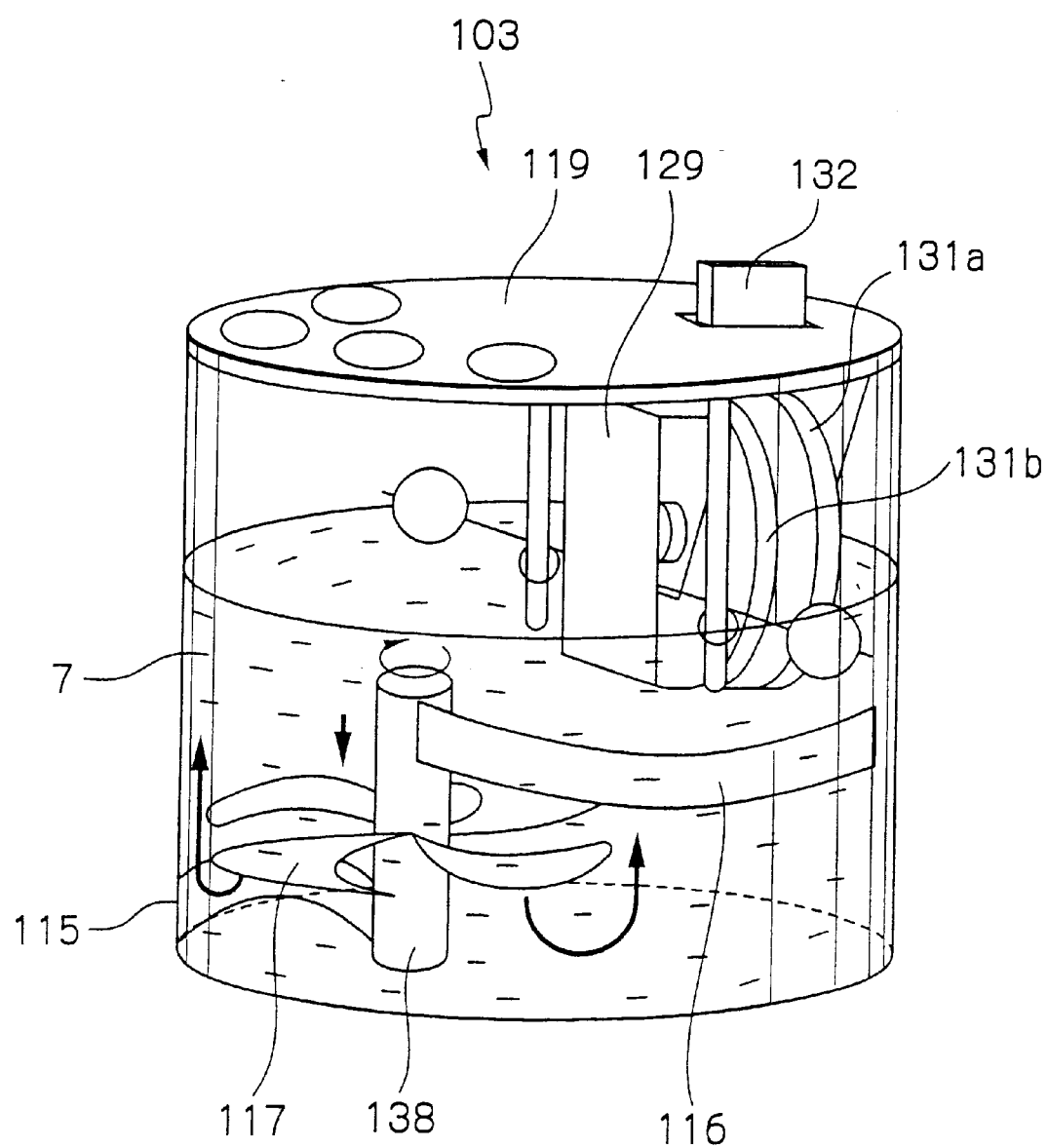
FIG. 10 is an isometric view showing the liquid adjusting section with a second reservoir being closed by a lid.

FIG. 10 shows the liquid adjusting section 103 with the lid 119 closing the second reservoir 115. As shown, the second reservoir 115 including the liquid level sensor 135 has a cross-section that is not circular, but is generally oblong. It should be noted that the term "generally oblong" does not refer to a geometrical oblong, but refers to the combination of two halves of a circle and a square or a rectangle intervening between them. Such a configuration resembles, e.g., a track and field stadium.

A shaft 138 is journalled to a water-proof bearing, not shown, mounted on the bottom of the reservoir 115 at a position offset from the center (center of gravity) of the bottom to the left, as viewed in FIG. 10. The paddle 116 is formed of a flexible material and affixed to the shaft 138. The paddle 117 is formed of a non-flexible material and affixed to the shaft 138 below the paddle 116. The flexible paddle 116 has a length preselected such that the paddle 116 contacts the inner periphery of the reservoir 115 at any angular position. When the shaft 138 is rotated, the paddle 116 rotates in the same direction as the shaft 138 while deforming to slide on the inner circumference of the reservoir 115.

Figure 11:
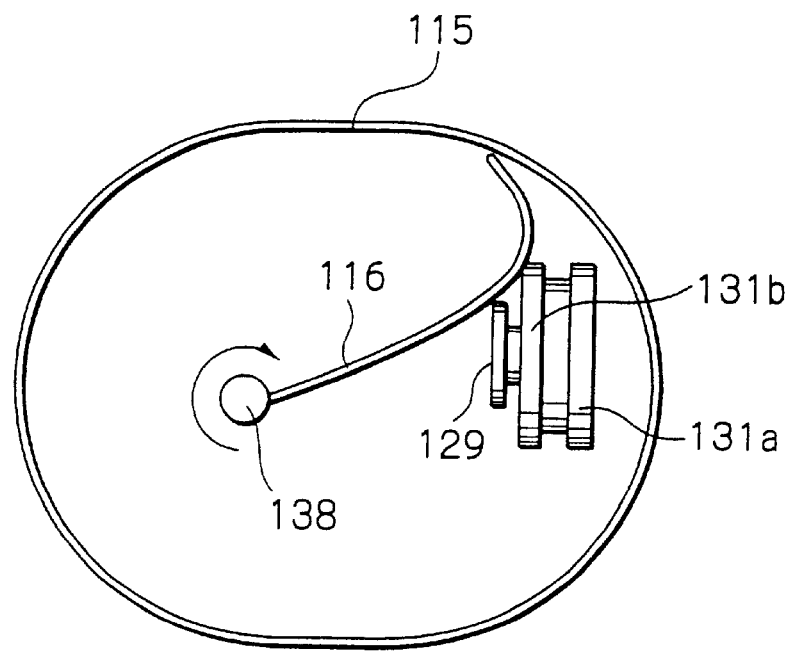
FIGS. 11 through 13 are plan views showing a flexible paddle included in the illustrative embodiment in consecutive stages.
Figure 12:
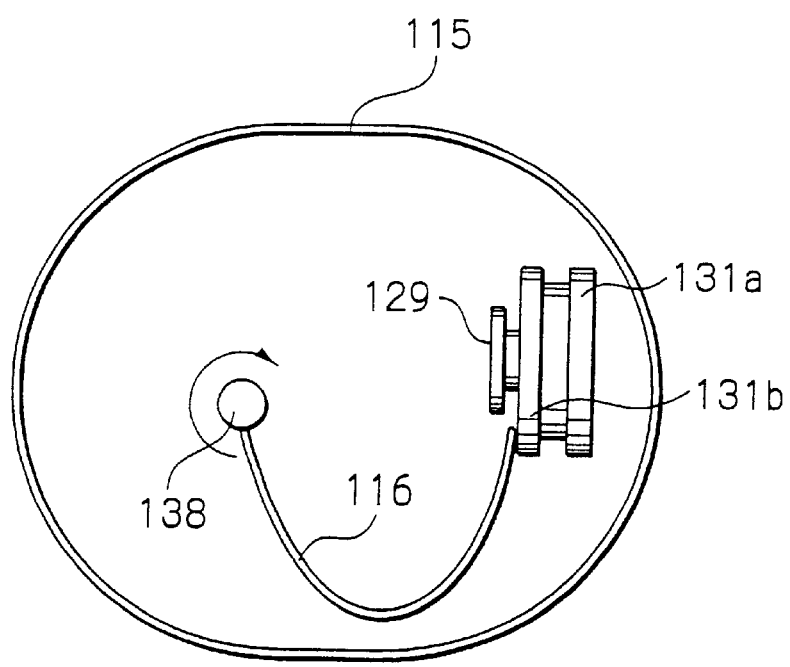
Figure 13:
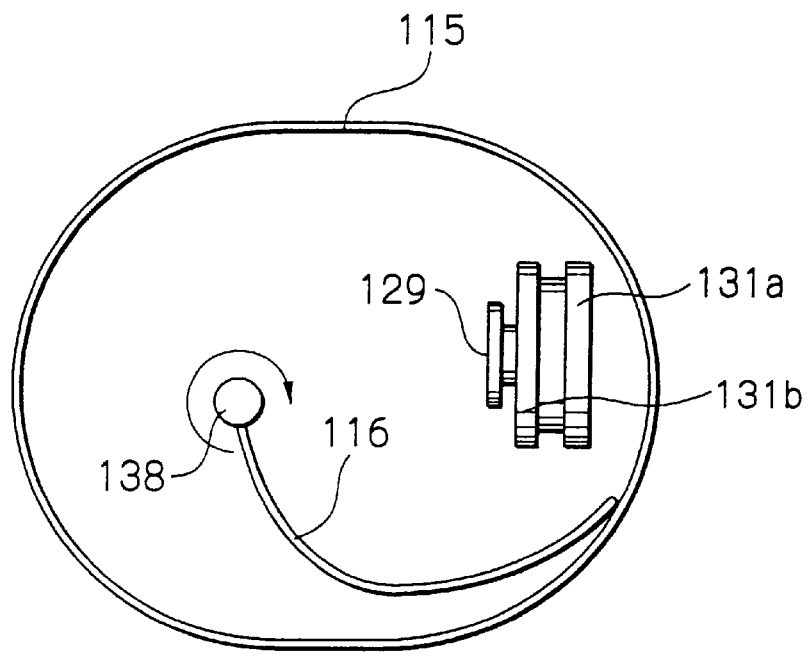

The support plate 129 and outer disks 131a and 131b are located on the locus of the flexible paddle 116. As shown in FIG. 11, when the paddle 116 in rotation contacts the above members, it further deforms in the direction opposite to the direction of rotation and slides on the members. Subsequently, as shown in FIG. 12, the paddle 116 reaches a position where it can be released from the members. Thereafter, as shown in FIG. 13, the paddle 116 again contacts the inner periphery of the reservoir 115. The paddle 116 can therefore reduce the viscosity of the entire liquid 7 in contact therewith over the entire locus of rotation despite the presence of the support plate 129 and outer disks 131a and 131b. More specifically, despite that the liquid 7 is thixotropic and therefore difficult to convect, the paddle 116 causes the liquid 7 to desirably swirl at the level of the paddle 116 and thereby desirably agitates it in the horizontal direction.

As shown in FIG. 10, the non-flexible paddle 117 is implemented by four blades arranged in the form of a propeller. Each blade extends radially outward from the shaft 138 while being twisted. When the paddle 117 rotates to cause the liquid 7 to swirl, the liquid 7 flows downward, as viewed in FIG. 10, to the bottom of the reservoir 115 along the axis of the shaft 138. The liquid 7 then flows upward away from the bottom of the reservoir 115. The locus of rotation of the paddle 117 does not extend over the entire sectional area of the reservoir 115 at the height of the paddle 117. However, part of the liquid 7 reduced in viscosity on the locus of rotation and rebounded from the bottom of the reservoir 115 can efficiently migrate to the zone outside of the locus. This allows a minimum of difference in viscosity to occur between the liquid 7 present on the locus of rotation and the liquid 7 present in the above zone, thereby insuring efficient agitation.

The downward flow of the liquid 7 along the axis of the shaft 138 shown in FIG. 10 is more preferable than an upward flow. The downward flow causes the liquid surface to wave less than the upward flow. Moreover, the downward flow exerts a strong shearing force on the liquid 7 because of the rebound from the bottom of the reservoir 115 to thereby reduce viscosity more than the upward flow.

In the illustrative embodiment, the non-flexible paddle 117 exerts a greater agitating force than the flexible paddle 116 and therefore reduces the viscosity of the liquid 17 at is level earlier than the flexible paddle 116. The liquid 7 reduced in viscosity rebounds from the bottom of the reservoir 115 and rises to the level of the paddle 116. In this sense, the paddle 117 helps the paddle 116 agitate the liquid 7. Part of the liquid 7 around the center of the locus of rotation of the paddle 116 is pulled downward to the level of the paddle 117 by the axial flow generated by the paddle 117.

In the above configuration, the liquid 7 in the reservoir 115 is positively rotated in the direction of rotation of the shaft 138 and sufficiently agitated in the horizontal direction. In addition, the liquid 7 flows downward around the axis of rotation and then flows upward in the region remote from the axis and is therefore sufficiently agitated in the up-and-down direction as well.

Figure 14:
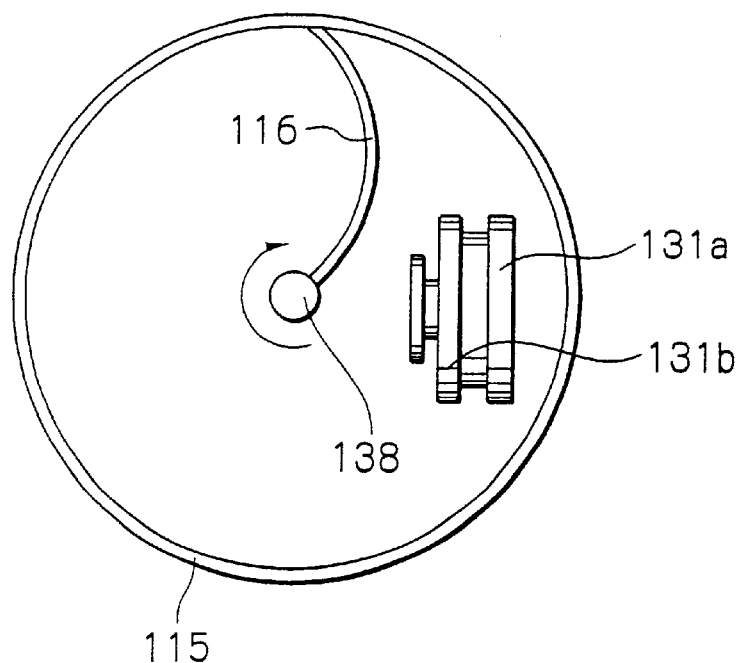
FIG. 14 is a plan view showing a cylindrical, second reservoir together with a paddle.
Figure 15:
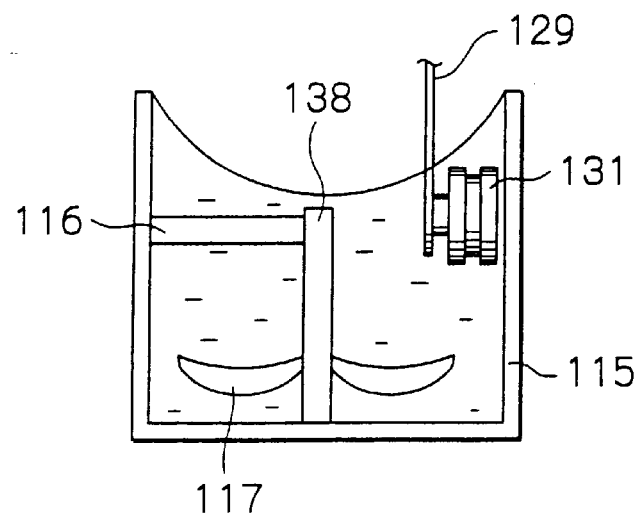
FIG. 15 is a section showing how a developing liquid is agitated in the second reservoir of FIG. 14.

Assume that the flexible paddle 116 simply causes the liquid 7 to flow in contact therewith over the entire sectional area of the reservoir 115. Then, the sophisticated configuration described with reference to FIGS. 10 and 11 is not necessary. Specifically, as shown in FIG. 14, the paddle 116 will achieve the above function only if the reservoir 115 has a circular cross-section and if the paddle 116 rotates at the center of the cross-section. In this simple configuration, however, the non-flexible paddle 117 exerting a greater agitating force than the paddle 116 also rotates at the center of the above cross-section and causes the liquid surface to noticeably wave due to the relatively high-speed rotation and axial flow of the liquid 7, as shown in FIG. 15. Such waving brings about a noticeable difference between the actual liquid level in a still condition and the liquid level sensed by the sensor 135. Further, an eddy around the shaft 138 pulls the floats 140 and causes them to move up and down, aggravating the difference mentioned above.

In light of the above, in the illustrative embodiment, the shaft 138 is located at a position offset from the center of the reservoir 115 and causes the paddles 116 and 117 to rotate thereabout. The paddle 117 causes the liquid 7 to positively swirl at the zone closer to the shaft 138 than the center of the reservoir 115, causing the liquid surface to wave. On the other hand, the liquid 7 at the side opposite to the shaft 138 with respect to the center of the reservoir 115 relatively slowly rotates because of the convection of the liquid 7 caused by the paddle 117 or the rotation of the paddle 116, which exerts a weaker agitating force than the paddle 117. This part of the liquid 7 therefore causes the liquid surface to wave little. The liquid level sensor 135 senses the liquid level at the position where the liquid surface waves little, and is therefore free from critical sensing errors ascribable to waving.

Figure 16:
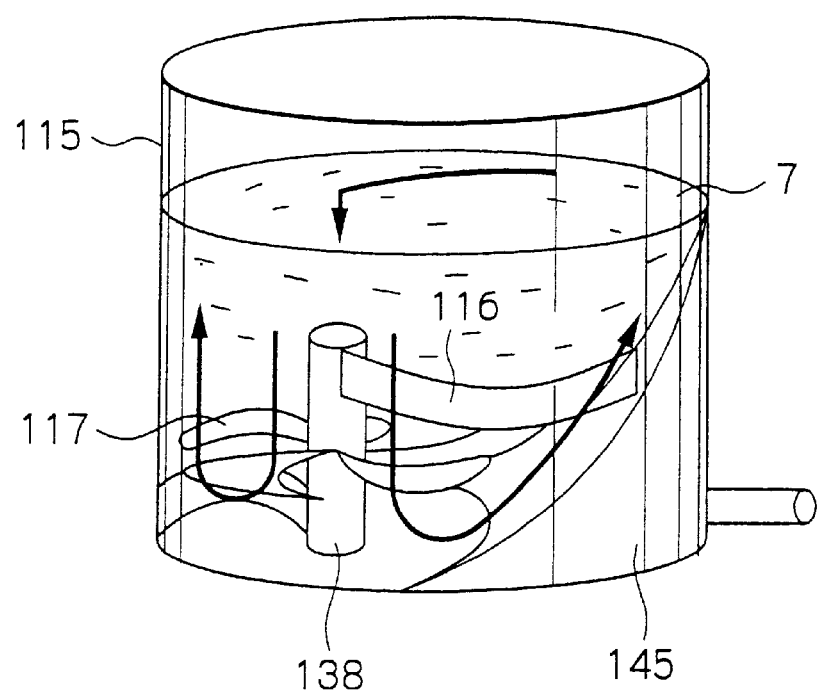
FIG. 16 is an isometric view of a second reservoir provided with a taper at its bottom.

As shown in FIG. 16, the bottom of the reservoir 115 should preferably be formed of a taper 145. The taper 145 is configured such that the liquid rebounded from the bottom of the reservoir 115 and then spread along the bottom flows upward along the taper 145. In this configuration, while the liquid 7 flows downward around the shaft 138, it positively flows upward at the side remote from the shaft 138. The liquid 7 is therefore surely agitated in the up-and-down direction.

Figure 17:
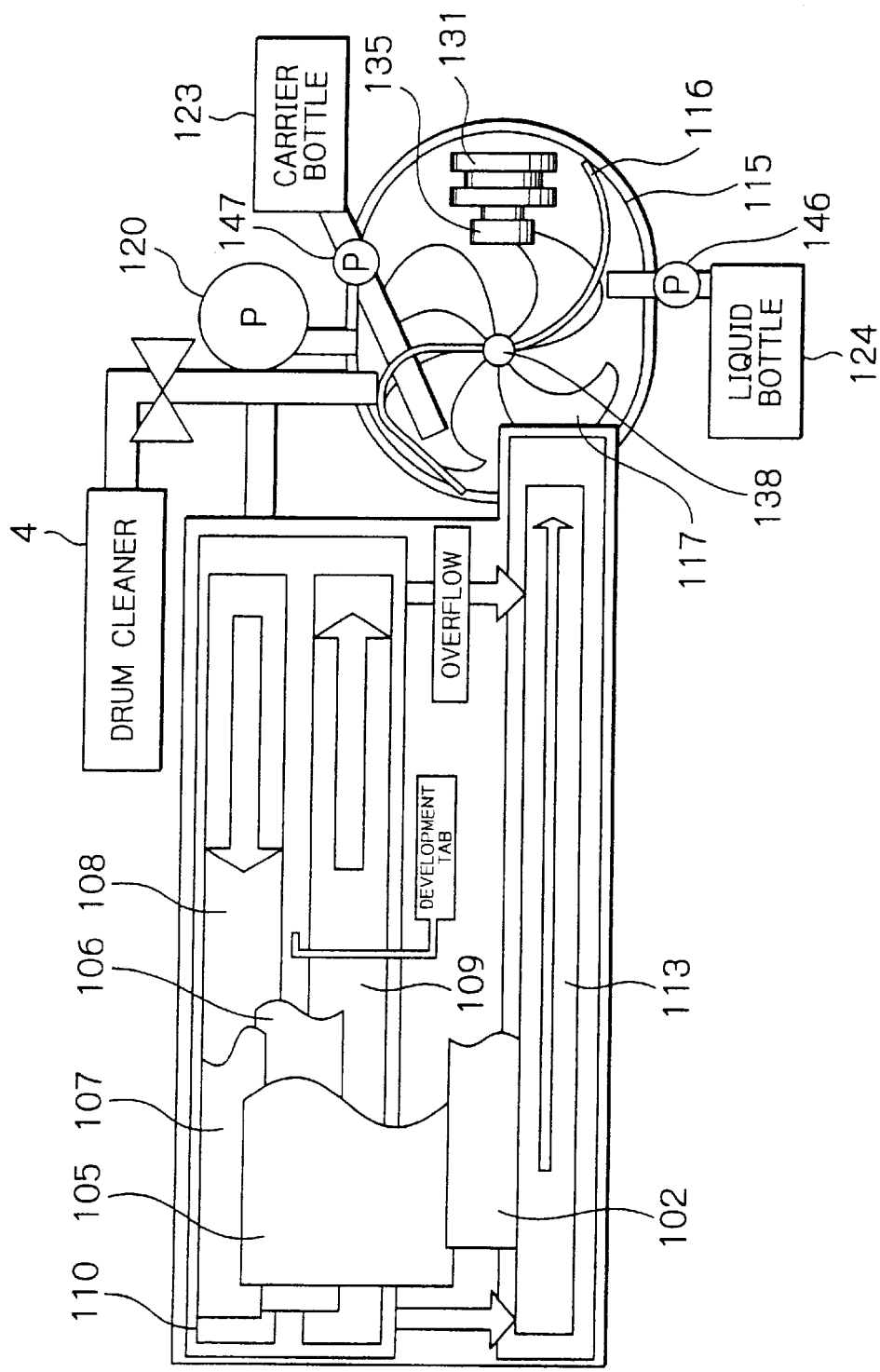
FIG. 17 is a plan view showing the flow of the developing liquid in the developing unit.

In the illustrative embodiment, the toner content sensing means, i.e., the content signal outputting device 118 and control unit determine the toner content of part of the liquid 7 guided by the taper 145 upward. Further, as shown in FIG. 17, the control agent (developing liquid or carrier liquid for replenishment) and liquids collected from the drum 1 and developing roller 105, FIG. 1, drop to the liquid surface at positions closer to the shaft 138 than the center of the reservoir 115, i.e., where the paddle 117 causes the liquid 7 to positively rotate. More specifically, such liquids drop to the liquid surface above the locus of rotation of the paddle 117.

The axial flow generated by the paddle 117 entrains the liquids dropped to the liquid surface toward the bottom of the reservoir 115, so that the liquids are sufficiently agitated in the horizontal and up-and-down directions. Further, on the bottom of the reservoir 115, the liquids are guided by the taper 145 upward while spreading from the shaft 138 side to the opposite side. Subsequently, the liquids are further agitated in the above directions in the liquid 7 existing at the side opposite to the shaft 138 because of the upward flow and the rotation of the paddle 116. The toner content sensing means therefore senses the toner content of the liquid 7 in which the control agent and collected liquids are sufficiently agitated in the horizontal and up-and-down directions.

Figure 18:
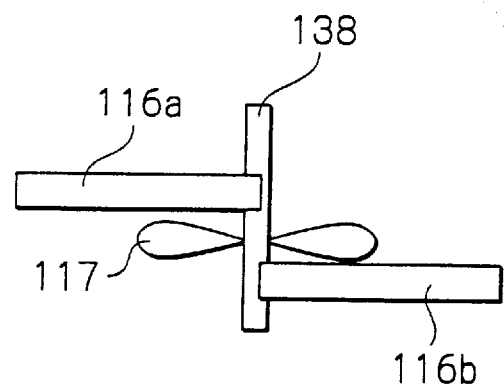
FIG. 18 is a side elevation showing a modification of the flexible paddle shown in FIG. 10.

FIG. 18 shows a modified form of the paddle 116 of FIG. 10. As shown, the paddle 116 is made up of a flexible, upper paddle 116a positioned above the non-flexible paddle 117 and a flexible, lower paddle 116b positioned below the paddle 117. The lower paddle 116b agitates toner precipitated on the bottom of the reservoir 115 due to, e.g., a long time of suspension, thereby further promoting the dispersion of the toner in the liquid 7.

Metal powder is sometimes introduced in the liquid 7 in the first reservoir 110 and/or the second reservoir 115. Such metal powder is derived from friction acting between rollers and blades formed of metal, e.g., collecting roller 111, blade 112, coating roller 106 and metering blade 107 as well as meshing between gears not shown. The liquid 7 containing metal powder is apt to cause a bias to leak at the developing position or the nip for image transfer, deteriorating the developing ability and image transferring ability. Further, the liquid 7 with metal powder is apt to cause discharge to occur from the developing roller 105 to the drum 1; the discharge would damage the surface of the drum 1. In addition, the liquid 7 with metal powder is likely to scratch the disks of the disk unit and to vary the transmittance of the liquid film. These, of course, result in low image quality.

Considering the above situation, it is preferable to dispose removable magnets in the reservoirs 110 and 115 or the pipes for conveying the liquid so as to collect metal powder. Alternatively, a magnet may be located between the position where the coating roller 106 and developing roller 105 contact and the developing position and spaced by a preselected distance from the roller 105. More preferably, this magnet should be implemented as a magnet roller spaced from the developing roller 105 by a gap of 10 $\mu$m to 200 $\mu$m, in which case a blade will be used to scrape off metal powder deposited on the magnet roller. In this case, the magnet roller can magnetically collect metal powder from the liquid 7 immediately before development.

While the illustrative embodiment has concentrated on a printer of the type forming a monochromatic image, it is similarly applicable to any other type of image forming apparatus. For example, there is available an image forming apparatus of the type including a yellow, a magenta, a cyan and a black developing unit arranged around a photoconductive element or similar image carrier. The developing units each develop a latent image formed on the image carrier in a particular color. The resulting toner images of different colors are transferred to an intermediate image transfer body one above the other, completing a full-color image. In another type of image forming apparatus, image carriers each being assigned to a particular color are arranged in addition to such developing units. In this type of apparatus, toner images of different colors are transferred to a paper sheet or similar recording medium one above the other without the intermediary of the intermediate image transfer body. Still another type of image forming apparatus writes a latent image on an image support body by an ionographic method.

As stated above, the illustrative embodiment has various unprecedented advantages, as enumerated below.

(1) The illustrative embodiment causes the floats to sink little due to the deposition of toner or causes the level of the magnetic force generating member or that of the magnetic force sensing means to vary little. This reduces a difference between the actual liquid level in the reservoir and the liquid level sensed by the liquid level sensor.

(2) Wires included in the magnetic force sensing means are preventing from twining round due to the up-and-down movement of the floats.

(3) A plurality of different liquid levels can be sensed on the basis of the up-and-down movement of a single magnetic force generating member.

(4) The floats are preventing from loosing floatability due to damage to the outer walls of the floats.

(5) Toner in the reservoir can have a uniform content. The liquid level sensor is free from critical errors ascribable to the waving of the developing liquid in the reservoir.

(6) The developing liquid can be sufficiently agitated in the horizontal and up-and-down directions without waving ascribable to agitation. This also enhances the uniformity of the toner content.

(7) The rise and waving of the liquid surface are reduced, compared to the case wherein the liquid flows upward to the liquid level and then flows downward.

(8) The liquid is smoothly agitated in the up-and-down direction and can therefore have its toner content more surely uniformed.

(9) Even when the toner content of the liquid after development differs from the toner content before development, the liquid can be reused for development with the toner content adjusted to one before development. Further, the toner content of the liquid can be adjusted while maintaining an adequate liquid level in the reservoir.

(10) The control means can determine whether or not toner is present in the replenishing means without resorting to an exclusive sensor.

(11) The liquid has a toner content as high as 5% to 40% and can therefore form a high density image in a smaller amount than a liquid having a lower toner content. This kind of liquid is low cost than a liquid whose viscosity is 10,000 mPa·s or above. In addition, such a liquid reduces irregularity in image density ascribable to the irregular dispersion of toner, compared to a liquid having viscosity less than 100 mPa·s that is likely to bring about irregular dispersion.

Second Embodiment

This embodiment is directed mainly toward the second and third objects stated earlier. FIGS. 1, 4A, 4B, 6A, 6B and 7 through 18 referenced in relation to the first embodiment and description thereof also apply to the second embodiment. To better understand the second embodiment, reference will be made to a conventional developing unit, shown in FIGS. 19 and 20.

Figure 19:
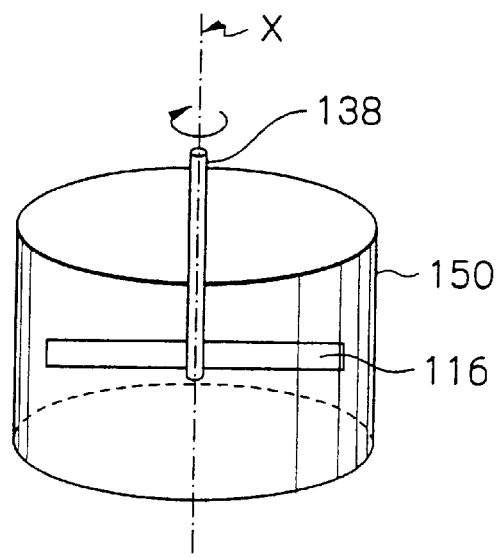
FIG. 19 is a perspective view showing a conventional reservoir.

As shown in FIG. 19, the developing unit includes a hollow cylindrical reservoir 150 storing a thixotropic developing liquid not shown. A shaft 138 is positioned in the reservoir 150 around the axis X of the reservoir 150. Drive means, not shown, causes the shaft 138 to drive. A paddle or agitating member 116 is affixed to the circumferential surface of the shaft 138. The paddle 116 has such a length that it rotates with a radius slightly smaller than the inside diameter of the reservoir 150. When the shaft 138 and therefore the paddle 116 starts rotating, the paddle 116 reduces the viscosity of the liquid directly contacting the paddle 116 on the locus of rotation little by little and causes the liquid to swirl about the axis X. The rotation of the paddle 116 is transferred even to the liquid remote from the paddle 116 soon in the up-and-down direction of the reservoir 150. As a result, the entire liquid in the reservoir 150 swirls about the axis X and decreases in viscosity little by little. At the same time, toner or similar developing substance is evenly dispersed over the entire liquid, providing the liquid with a uniform toner content.

Figure 20:
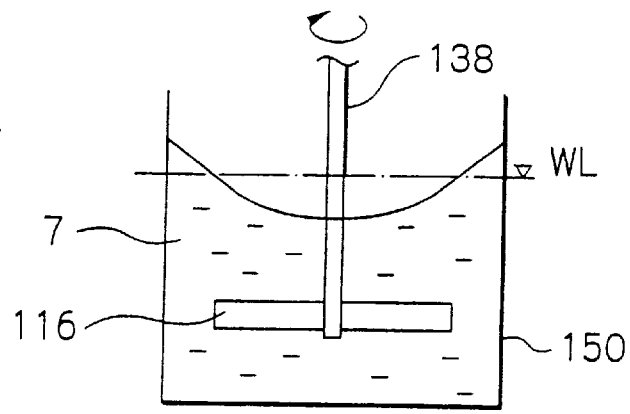
FIG. 20 is a section showing how a developing liquid is agitated in the conventional reservoir.

A liquid level sensor is sometimes disposed in the reservoir 150 for sensing the liquid level of the liquid, as stated earlier. In practice, as shown in FIG. 20, an eddy formed at the center zone lowers the liquid level below the original liquid level WL while the liquid level in the peripheral zone rises above the original level WL. Further, while the liquid level is shown in FIG. 20 as being symmetrical in the right-and-left direction, the liquid surface, in practice, noticeably waves in a complicated configuration. This waving is ascribable to, e.g., friction acting between the liquid and the wall of the reservoir 150 and exerting a force that obstructs the swirl of the liquid. Consequently, the liquid level sensed by the liquid level sensor noticeably differs from the actual liquid level.

Figure 23:
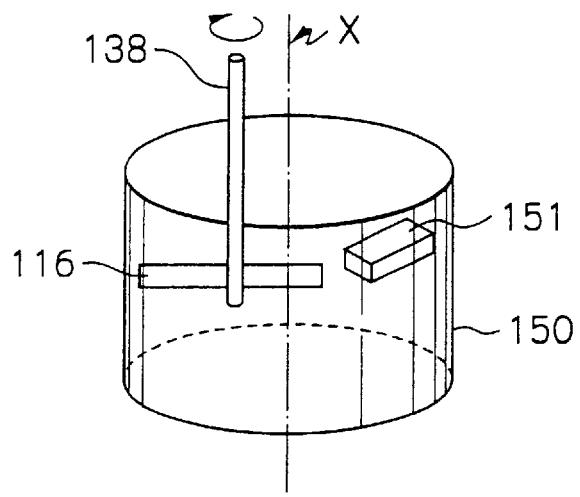
FIG. 23 is an isometric view of a reservoir included in the second embodiment.

On the other hand, a sensor responsive to the toner content of the liquid is sometimes disposed in the reservoir 150. The sensor must be positioned at the same level as the paddle 116 for layout reasons, as the case may be. In such a case, as shown in FIG. 23, the shaft 138 may be located at a position offset from the axis X of the reservoir 150 while the paddle 116 may be reduced in length, so that the paddle 116 does not contact the sensor labeled 151. This, however, prevents the paddle 116 from agitating the entire liquid at the level of the paddle 116 and therefore obstructs efficient agitation.

Figure 21:
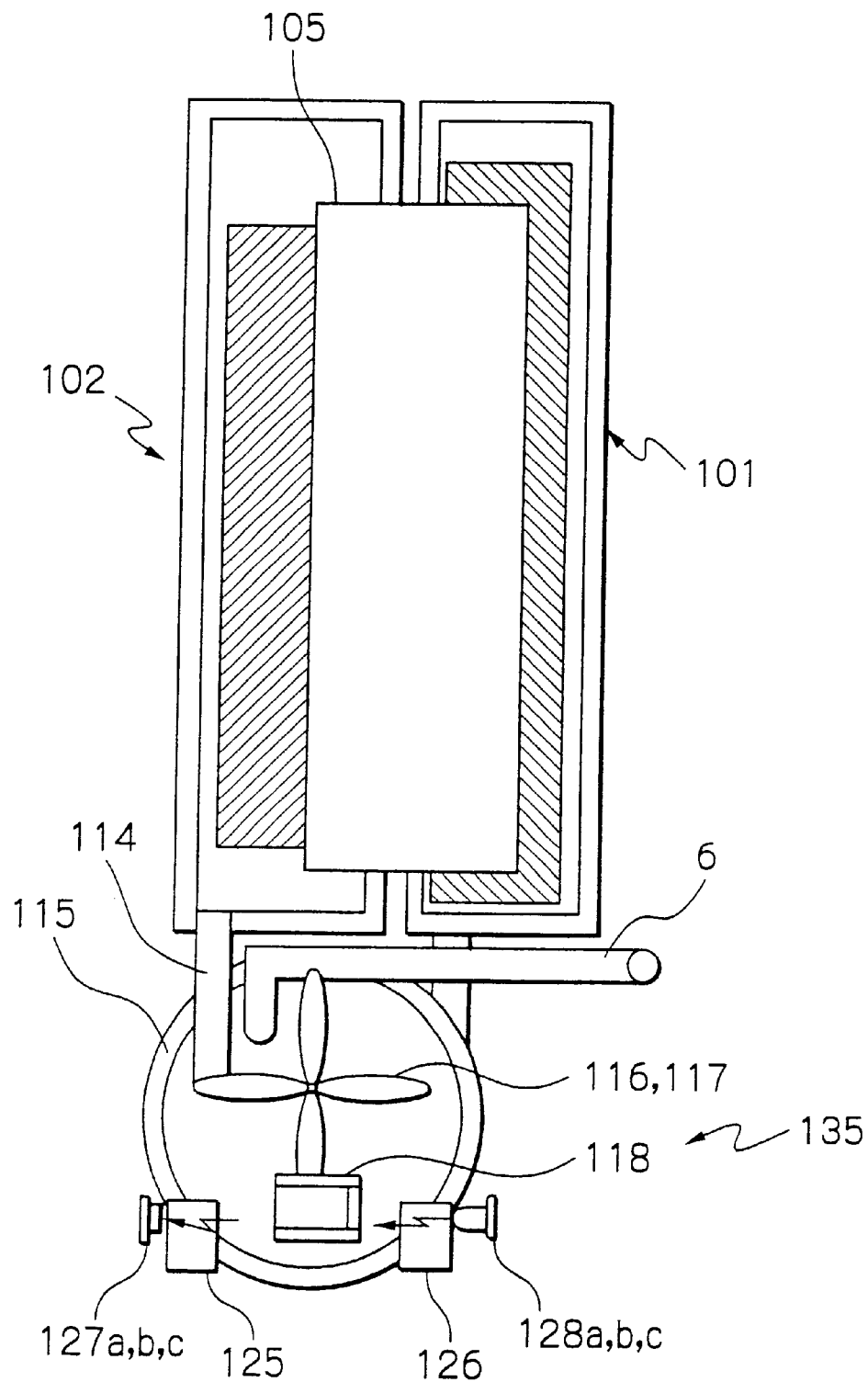
FIG. 21 is a plan view showing a developing unit included in a second embodiment of the present invention.
Figure 22:
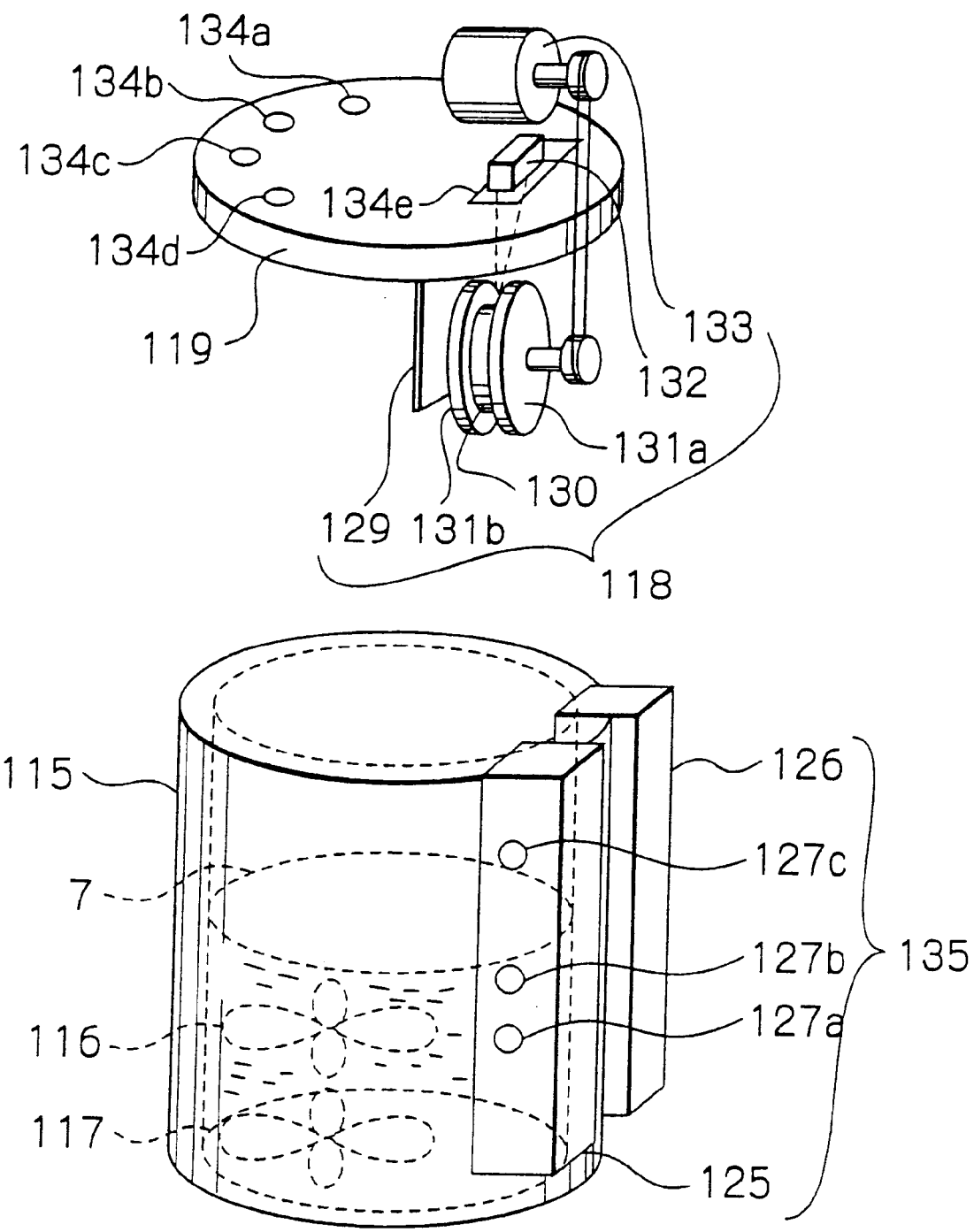
FIG. 22 is an exploded isometric view showing a liquid adjusting section included in the developing unit of FIG. 21.

Hereinafter will be described part of the second embodiment different from the first embodiment. As shown in FIGS. 21 and 22, the illustrative embodiment includes a liquid level sensor 135 constructed to optically sense the liquid level of the developing liquid in the cylindrical, second reservoir 115, which is formed of an opaque material. Specifically, the liquid level sensor 135 includes a pair of glass blocks 125 and 126. The glass block 125 supports three light-sensitive elements 127a through 127c while the glass block 126 supports three light emitting elements 128a through 128c aligning with the light-sensitive elements 127a through 127c, respectively.

More specifically, as shown in FIG. 21, the glass blocks 125 and 126 are spaced from each other by a preselected distance and affixed to the second reservoir 115 in such a manner as to pierce the circumferential wall of the reservoir 115. The light emitting elements 128a through 128c each are mounted on the outer periphery of one glass block 126 at a particular level or height so as to emit light toward the other glass block 125 via the glass block 126 and air inside the reservoir 115. The light-sensitive elements 127a through 127c are mounted on the outer periphery of the glass block 125, and each receives the light issuing from aligned one of the light emitting elements 128a through 128c via the glass block 125. The light emitting elements 128a through 128c and light-sensitive elements 127a through 127c provided in pairs are responsive to the lower-limit liquid level (level A), standard liquid level (level B) and upper-limit liquid level (level C), respectively. Assume that the liquid 7 does not exist on the optical path between any one of the light emitting elements 128a through 128c and associated one of the light-sensitive elements 127a through 127c. Then, light issuing from the light emitting element is smoothly transmitted through the glass block 126, air inside the reservoir 115 and glass block 125 to the light-sensitive element. However, when the liquid 7 exists on the above optical path, it interrupts part of or the entire light and thereby noticeably reduces the quantity of light to reach the light-sensitive element. The light-sensitive elements 127a through 127c each send an analog signal representative of the quantity of incident light to the control unit not shown. The control unit converts the analog signals received from the light-sensitive elements 127a through 127c to digital signals and then determines the quantities of incident light at the levels A, B and C. The control unit then determines the liquid level of the liquid 7 in the reservoir 115.

The combination of each of the light emitting elements 128a through 128c and associated one of the light-sensitive elements 127a through 127c may be implemented by, e.g., a transmission type photoelectric switch. A photoelectric switch includes an LED (Light Emitting Diode) or similar light emitting element and a photodiode or similar light-sensitive element and outputs an ON signal when light is intercepted.

The inner periphery of the reservoir 115, including the walls of the glass blocks 125 and 126, are treated to repel oil for thereby preventing the liquid 7 from depositing thereon. The liquid 7 deposited on the walls of the glass blocks 125 and 126 would effect the quantity of light to be incident to the light-sensitive elements 127a through 127c and would thereby prevent the control unit from accurately determining a liquid level.

As stated above, the illustrative embodiment has various unprecedented advantages, as enumerated below.

(1) The liquid level sensor is free from critical errors ascribable to the waving of the developing liquid in the reservoir.

(2) The developing liquid can be sufficiently agitated in the horizontal and up-and-down directions without waving ascribable to agitation. This enhances the uniformity of the substance content.

(3) The rise and waving of the liquid surface are reduced, compared to the case wherein the liquid flows upward to the liquid level and then flows downward.

(4) The liquid is smoothly agitated in the up-and-down direction and can therefore have its toner content more surely uniformed.

(5) Even when the toner content of the liquid after development differs from the toner content before development, the liquid can be reused for development with the toner content adjusted to one before development. Further, the toner content of the liquid can be adjusted while maintaining an adequate liquid level in the reservoir.

(6) Even when a toner content sensor or similar member is disposed in the reservoir at the same level at the agitating member, the agitating member is capable of causing the entire liquid to swirl in contact with the liquid while reducing its viscosity.

(7) The non-flexible agitating member helps the flexible agitating member agitate the liquid without deforming itself, so that the liquid is more surely agitated.

(8) A driveline for causing the flexible and non-flexible agitating members to rotate is simple, compared to a case wherein such agitating members each are driven by a respective shaft. This successfully reduces the cost of the driveline.

Third Embodiment

This embodiment is directed mainly toward the fourth object stated earlier. FIGS. 1, 4A, 4B, 6A, 6B and 7 through 19, 21 and 22 referenced in relation to the first and second embodiments and description thereof also apply to the third embodiment.

Figure 24:
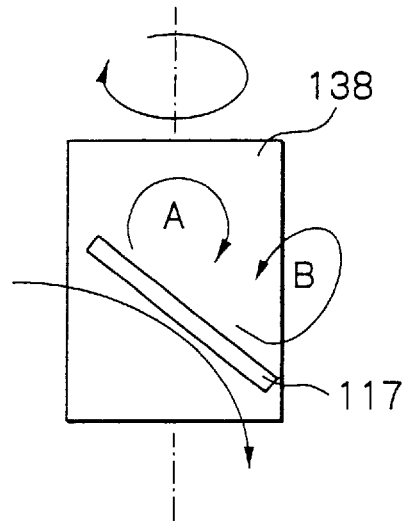
FIG. 24 is a view showing how a developing liquid flows when a single non-flexible paddle is positioned in the axial direction in a third embodiment of the present invention.

As shown in FIG. 24, in the illustrative embodiment, the non-flexible paddle 117 is rotatable with its front face, which contacts the developing liquid, inclined relative to the axis of the shaft 138 (vertical direction as viewed in FIG. 24). With this configuration, the paddle 117 forces the liquid to rotate in the direction of rotation of the paddle 117 while forcing it to flow in the axial direction of the shaft 138 (downward as viewed in FIG. 24). At the same time, the rear face of the paddle 117 moves away from the liquid and thereby generates negative pressure between it and the liquid.

Assume that a single paddle 117 is present in the axial direction of the shaft 138. Then, due to the negative pressure generated by the rear face of the paddle 117, an upper eddy A and a lower eddy B appear at the rear of the paddle 117 in the direction of rotation of the paddle 117. The upper eddy A swirls such that is leaves the front end portion of the paddle 117 and again approaches it at the intermediate portion of the paddle 117. On the other hand, the lower eddy B swirls such that it leaves the rear end portion of the paddle 117 and again approaches it in the intermediate portion of the paddle 117. The eddies A and B obstruct the rotation and axial movement of the liquid at the rear of the paddle 117.

Figure 25:
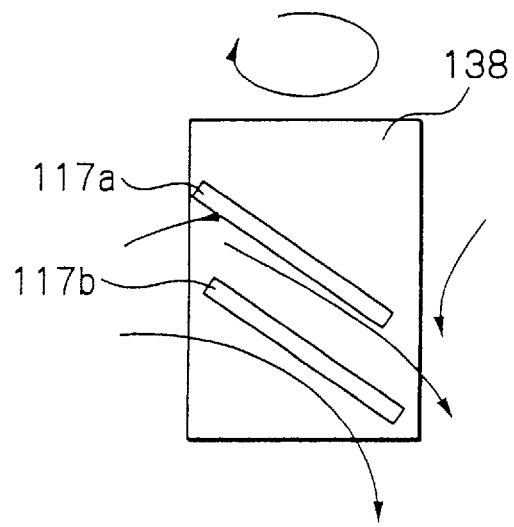
FIG. 25 is a view showing how a developing liquid flows when two non-flexible paddles are positioned one above the other in the third embodiment.

In light of the above, as shown in FIG. 25, a plurality of (two in the illustrative embodiment) paddles 117a and 117b face each other at a preselected distance in the axial direction of the shaft 138. In this configuration, the front face of the upper paddle 117a forces the liquid to flow toward the rear face of the lower paddle 117b, preventing the two eddies A and B, FIG. 24, from appearing at the rear of the lower paddle 117b. The liquid can therefore move in the axial direction of the shaft 138 while swirling in the direction of rotation of the paddles 117a and 117b.

Figure 26:
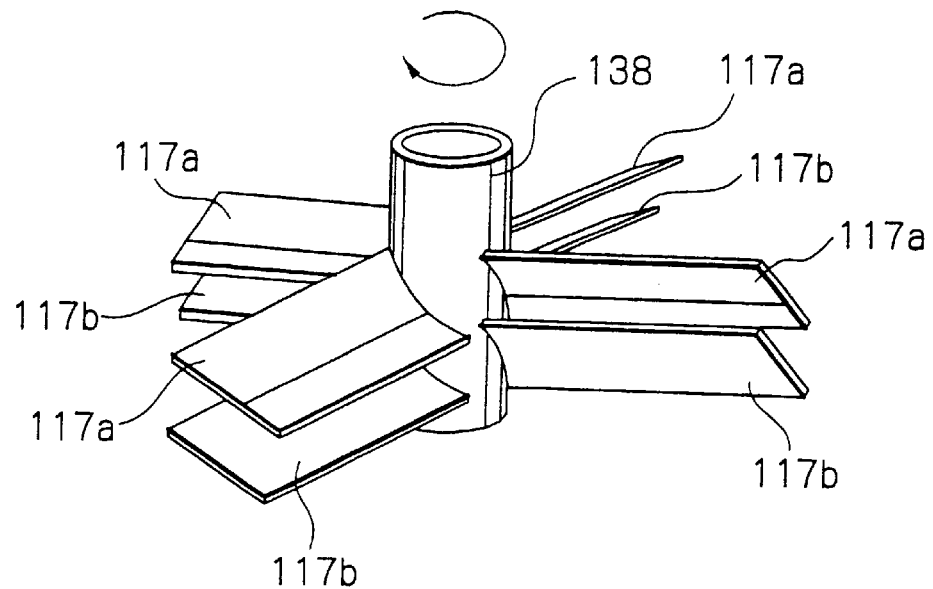
FIG. 26 is an isometric view showing a modification of the non-flexible paddles.
Figure 27:
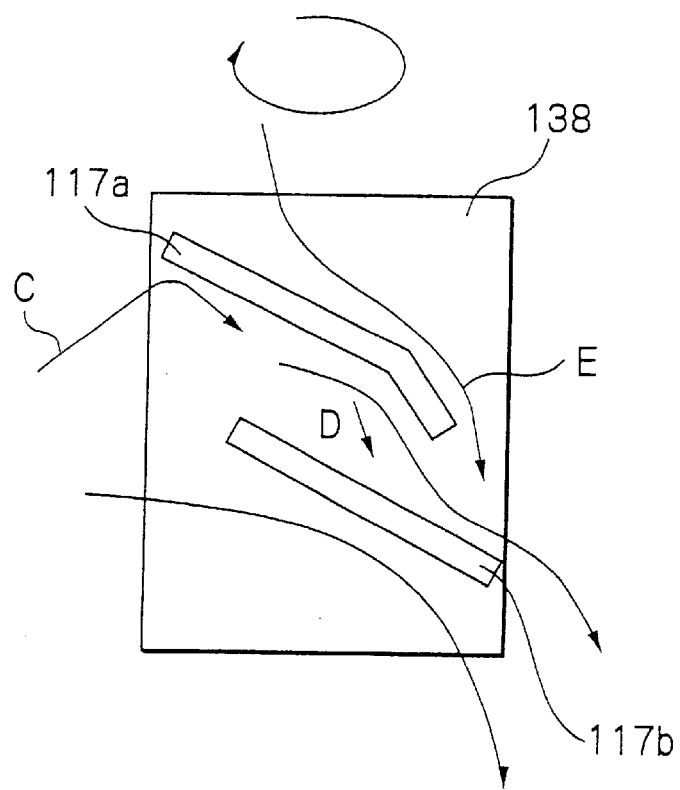
FIG. 27 is a view showing how a developing liquid flows in accordance with the rotation of the paddles of FIG. 26.

FIGS. 26 and 27 show a modification of the paddle 117 of FIG. 25. As shown, a plurality of pairs (four pairs in the illustrative embodiment) of upper and lower paddles 117a and 117b extend radially outward from the shaft 138. The upper and lower paddles 117a and 117b of each pair face each other at a preselected distance while being inclined as in FIG. 25. In the illustrative embodiment, the rear portion of each upper paddle 117a is bent toward the lower paddle 117b, i.e., inclined more than the front portion relative to the axis of the shaft 138. Further, the front end portion and rear end portion of each upper paddle 117a are positioned ahead of the front end portion and rear end portion of the lower paddle 117b in the direction of rotation.

As shown in FIG. 27, the lower paddle 117b forces the liquid to swirl in the direction of rotation of the paddle 117 with its front face while causing it to flow axially downward, as viewed in FIG. 27. The upper paddle 117a forces the liquid to swirl toward the rear face of the lower paddle 117b with its front face, as indicated by an arrow C. The liquid therefore flows downward while swirling without encountering any eddy at the rear of the paddle 117b. At this instant, the bent, rear portion of the upper paddle 117a forces the liquid toward the rear surface of the lower paddle 117b more strongly than the front portion of the paddle 117a. This successfully causes the liquid to more surely move downward while swirling in the direction of rotation of the paddle 117a, thereby more positively obviating the eddies at the rear of the paddle 117b.

Furthermore, the front end portion of the upper paddle 117a is positioned ahead of the front end portion of the lower paddle 117b in the direction of rotation, guiding the liquid to the space between the upper paddle 117a and the lower paddle 117b. This part of the liquid smoothly flows through the above space and then drags the liquid contacting the rear face of the upper paddle 117a, causing it to flow in a direction E. The drag obviates eddies otherwise appearing at the rear of the upper paddle 117a and thereby further enhances the efficient swirl and downward movement of the liquid.

As stated above, the illustrative embodiment has various unprecedented advantages, as enumerated below.

(1) The paddles sufficiently agitate the developing liquid in both of the horizontal and up-and-down directions while preventing the liquid surface from rising or waving, as in the previous embodiments.

(2) The liquid swirls in the direction of rotation of the paddles and moves in the axial direction without encountering any eddy at the rear of the lower paddle. The paddles therefore agitate the liquid more efficiently.

(3) The liquid swirls more surely in the direction of rotation of the paddles at the rear of the lower paddle, while moving in the axial direction of the shaft. This further promotes the agitation of the liquid in the horizontal and up-and-down directions.

(5) The liquid is efficiently agitated in the direction of rotation of the shaft even at the rear of the upper paddle, while moving in the axial direction of the shaft. This also further promotes the agitation of the liquid in two directions.

Fourth Embodiment

Figure 28:
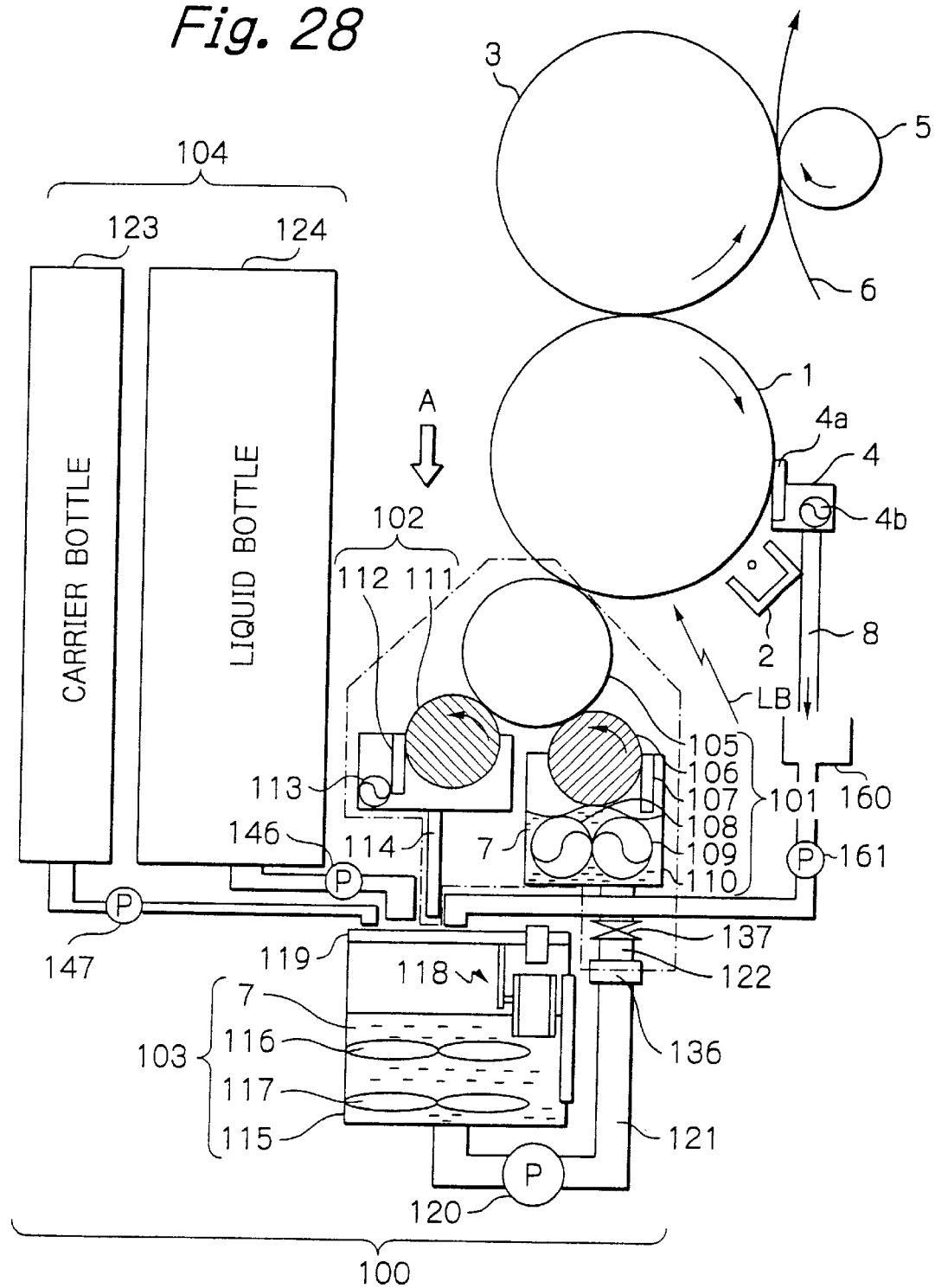
FIG. 28 is a view showing a fourth embodiment of the present invention.

This embodiment is directed mainly toward the fifth object stated earlier. FIGS. 3, 4A, 4B and 7 through 15 referenced in relation to the previous embodiments and description thereof also apply to the fourth embodiment. Further, as shown in FIG. 28, the printer of the fourth embodiment is identical with the printer of FIG. 1 except that a residual liquid reservoir 160 and a collection pump 161 intervene between the drum cleaner 4 and the second reservoir 115. In the figures, identical structural elements are designated by identical reference numerals and will not be described in order to avoid redundancy.

In FIG. 28, part of the toner facing the background or non-image area of the drum 1 does not move toward the drum 1, but gathers toward the surface of the developing roller 105 by electrophoresis. Theoretically, therefore, such toner is not expected to deposit on the background of the drum 1. In practice, however, toner with short charge, for example, is apt to deposit on the background by moving later than the other toner by electrophoresis, bringing about so-called fog or background contamination.

Figure 29:
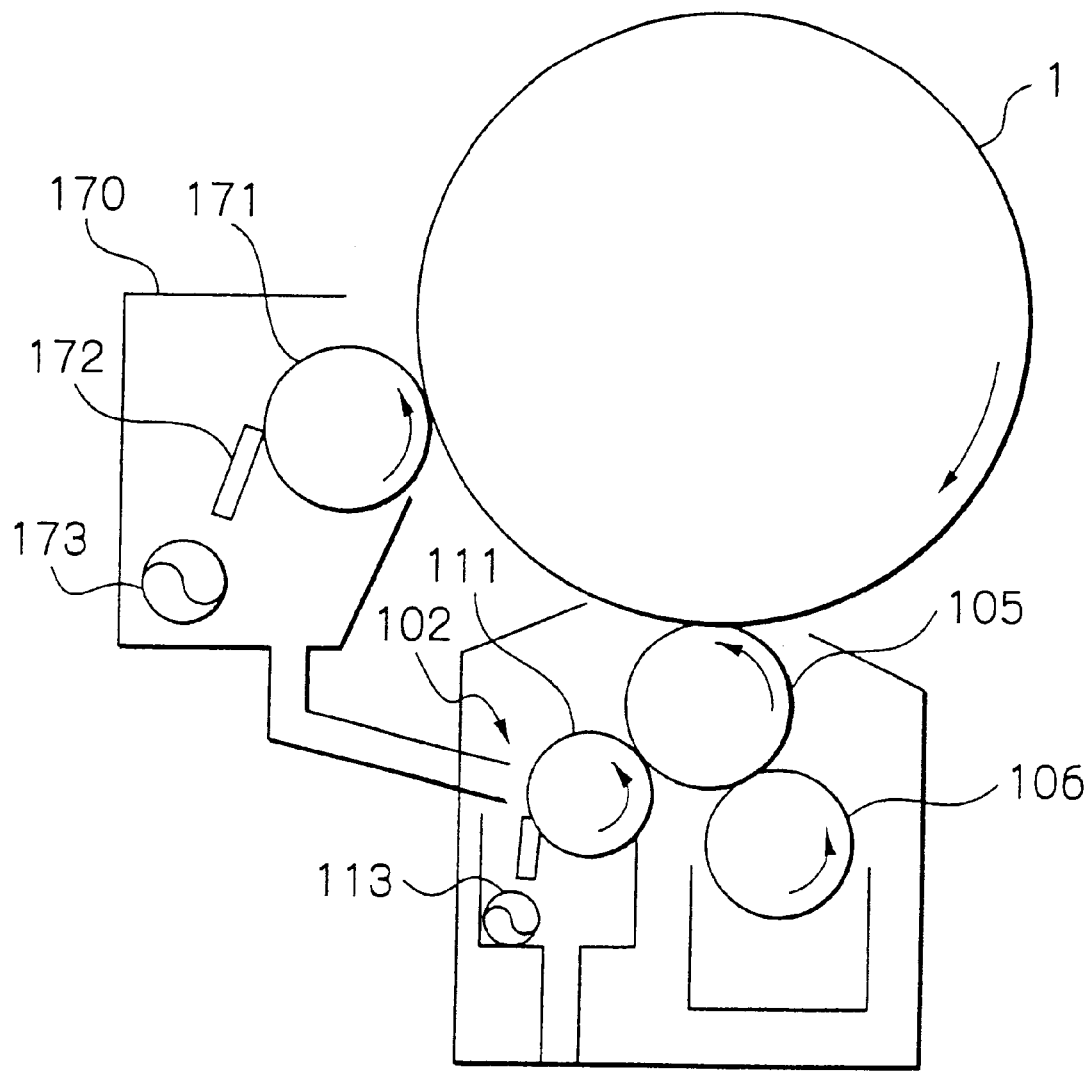
FIG. 29 is a view showing a sweeping unit applicable to the fourth embodiment.

FIG. 29 shows a sweeping unit 170 usable to obviate the above-mentioned fog. As shown, the sweeping unit 170 includes a sweep roller 171, a cleaning blade 172, and a screw 173 for collection. The circumference of the sweep roller 171 is covered with a conductive, elastic material, e.g., conductive urethane rubber. The sweep roller 171 rotates at the same speed as the drum 1 in contact with the drum 1, thereby forming a nip. A power source, not shown, applies a bias of the same polarity as the toner to the sweep roller 171. As a result, an electric field is formed between the drum 1 and the sweep roller 171 due to a potential difference between the drum 1 and the roller 171. More specifically, at the above nip, the sweep roller 171 and the background and latent image of the drum 1 are of the same polarity as the toner; the potential sequentially decreases from the background to the latent image via the sweep roller 171. In this condition, the toner failed to gather on the surface of the developing roller 105 moves toward the sweep roller 171 at the position between the background and the roller 171 by electrophoresis. The sweep roller 171 therefore removes the toner otherwise bringing about fog.

The cleaning blade 172 collects the liquid, which contains the toner, removed by the sweep roller 171. The liquid is then returned to the second reservoir 115 via the collecting section 102.

In the illustrative embodiment, the carrier bottle 123 forming part of the replenishing section 104 stores a carrier liquid, or control agent, for diluting the liquid 7 in the second reservoir 115. The carrier pump 147 delivers the carrier liquid from the carrier bottle 123 to the second reservoir 115 under the control of the control unit not shown. The liquid bottle 124 stores a developing liquid, or another control agent, for thickening the liquid 7 in the second reservoir 115. The liquid pump 146 delivers the adjusting liquid to the second reservoir 115 under the control of the control unit.

While the preferable or standard toner content of the liquid 7 in the illustrative embodiment is also 15 wt %, irregular image density observable by eye does not occur if the toner content is 12 wt % to 18 wt %. Therefore, in the illustrative embodiment, toner contents lying in the range of from 12 wt % to 18 wt % are allowable.

In the illustrative embodiment, the control agent stored in the liquid bottle 124 has a toner content higher than the standard toner content (15 wt %).

The control unit compares the actual toner content represented by the output of the content signal outputting device 118 and a preselected target value. The control unit controls, based on the result of comparison, the drive of the pump 146 or 147 for thereby replenishing an adequate amount of carrier liquid or an adequate amount of adjusting liquid to the second reservoir 115. The liquid 7 in the second reservoir 115 can therefore confine its toner content in the allowable range despite the return of the residual liquid collected from the developing roller 105 and the residual liquid collected from the drum 1. Let the residual liquid collected from the developing roller 105 and the residual liquid collected from the drum 1 be referred to as a residual development liquid and a residual image transfer liquid, respectively.

Arrangements unique to the illustrative embodiment will be described hereinafter. The carrier liquid has a toner content of 0 wt % far different from the standard toner content. The carrier liquid therefore rapidly lowers the toner content of the liquid 7 in the second reservoir 115 when replenished to the reservoir 115.

On the other hand, in a printer in which the liquid 7 is thixotropic, as in the illustrative embodiment, the control agent stored in the liquid bottle 124 is required to have a toner content close to the standard toner content (15 wt %). This is because the control agent cannot exhibit the properties of a liquid unless the toner content thereof is limited. It follows that the control agent must be replenished in a far greater amount than the traditional low toner content, low viscosity developing liquid. However, the amount of control agent that can be replenished to the second reservoir 115 is limited. Even if the control agent is replenished to the upper limit, then it may fail to effectively increase the toner content of the liquid 7 in the reservoir 115. This is likely to cause the toner content of the liquid 7 in the reservoir 115 to sequentially decrease below the lower limit, i.e., 12 wt %.

At the intermediate transfer position where the drum 1 contacts the intermediate drum 3, a toner image is electrostatically transferred from the drum 3 to the intermediate drum 3. As a result, the residual liquid left on the drum 1 after the image transfer contains only a small amount of toner. This liquid therefore lowers the toner content of the liquid 7 when returned to the second reservoir 115. If the toner content of the liquid 7 in the reservoir 115 decreases due to the residual image transfer liquid at a higher rate than it increases due to the replenished agent, then the toner content of the liquid 7 continuously decreases below the lower limit (12 wt %)

To solve the problem discussed above, the illustrative embodiment does not directly return the residual image transfer liquid to the second reservoir 115, but once collects it in the residual liquid reservoir 160. The residual image transfer liquid collected in the reservoir 160 is used as a control agent for diluting the liquid 7 in the second reservoir 115. More specifically, assume that the toner content represented by the output of the content signal outputting means 118 is higher than the target toner content. Then, the drive unit drives the collection pump 161 for delivering the residual image transfer liquid from the residual liquid reservoir 160 to the second reservoir 115. Assume that the delivery of the liquid from the reservoir 160 fails to lower the actual toner content to the target toner content in a preselected period of time or that the liquid level in the reservoir 115 does not rise to the preselected level in the preselected period of time. Then, the control unit determines that the reservoir 160 has run out of the residual image transfer liquid, and drives the carrier pump 147 to replenish the carrier liquid from the carrier bottle 123.

The procedure described above successfully stabilizes the toner content of the liquid 7 in the reservoir 115 and confines it in the allowable range of from 12 wt % to 18 wt %, compared to the conventional procedure that unconditionally returns the residual image transfer liquid.

Figure 30:
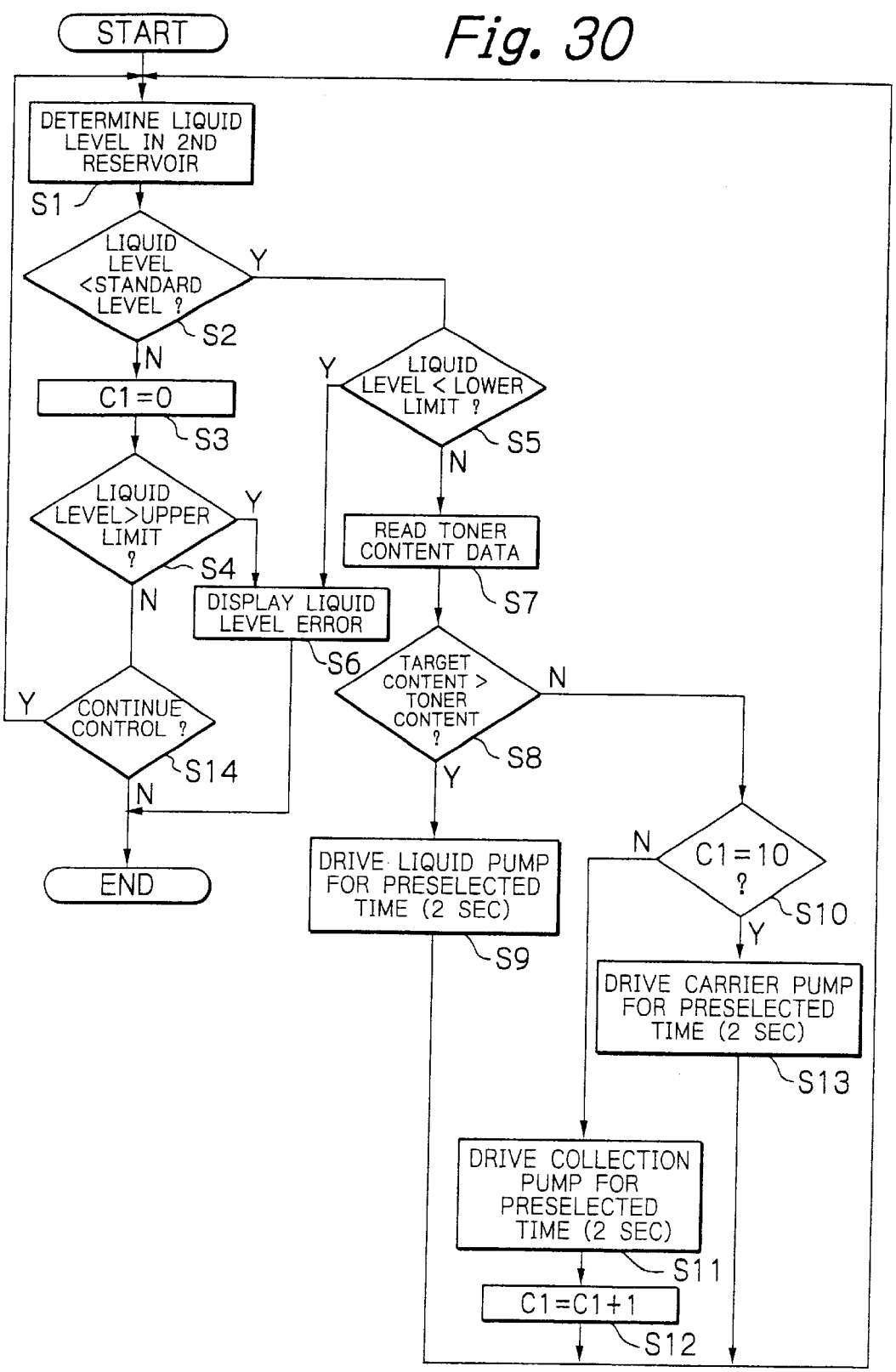
FIG. 30 is a flowchart demonstrating a specific operation of a replenishment controller included in the fourth embodiment.

FIG. 30 demonstrates a specific toner content control procedure to be executed by the replenishment controller (simply controller hereinafter) 202, FIG. 7. As shown, the controller 202 determines the actual liquid level in the second reservoir 115 (step S1). If the actual liquid level is lower than the standard liquid level (Y, step S2), then the controller 202 replenishes one of the residual image transfer liquid, carrier liquid and developing liquid for replenishment to the reservoir 115 for a preselected period of time (step S9, S11 or S13) and again determines the actual liquid level (step S1). If the actual liquid level is higher than or equal to the standard liquid level (N, step S2), then the controller 202 ends the procedure without any replenishment. The controller 202 executes the above control at a preselected period.

More specifically, if the actual toner content is lower than the target toner content (Y, step S8), the controller 202 drives the liquid pump 146 for 2 seconds and then returns to the step S1. The liquid pump 146 delivers a preselected amount of developing liquid to the reservoir 115 to thereby slightly increase the toner content of the liquid 7.

If the actual toner content is higher than the target toner content (N, step S8), then the controller 202 drives the collection pump 161 for 2 seconds and then returns to the step S1. Usually, the collection pump 161 delivers a preselected amount of residual image transfer liquid from the residual liquid reservoir 160 to the second reservoir 115 to thereby lower the toner content of the liquid 7. However, the residual image transfer liquid is not always present in the residual liquid reservoir 160, i.e., it is not always replenished despite the drive of the collection pump 161. The controller 202 therefore increments a drive count or variable C1 by 1 every time it drives the collection pump 161 for 2 seconds (step S12). When the count C1 reaches "10". The controller 202 stops driving the collection pump and starts driving the carrier pump 147 for 2 seconds (step S13). The carrier pump 147 replenishes the carrier liquid to the reservoir 115 to thereby dilute the liquid 7.

By the above procedure, the controller 202 controls the actual toner content of the liquid 7 in the reservoir 115, whether it be lower than or higher than the target content, to the target content. Therefore, although the toner content of the residual image transfer liquid returned to the reservoir 115 may increase or decrease, the toner content of the liquid 7 in the reservoir 115 can be adequately controlled.

Further, the residual image transfer liquid is returned from the residual liquid reservoir 160 to the second reservoir 115 only when the liquid 7 in the reservoir 115 should be diluted. This successfully stabilizes the toner content of the liquid 7 and confines in the allowable range of from 12 wt % to 18 wt %, compared to the conventional procedure that unconditionally returns the residual image transfer liquid.

Moreover, when the amount of residual image transfer liquid in the residual liquid reservoir 160 is short, the carrier liquid is replenished to the second reservoir 115 in place of the residual image transfer liquid, adequately lowering the toner content of the liquid 7.

In the illustrative embodiment, the target toner content used in the step S8 is higher than the standard toner content (15 wt %), but lower than or equal to the upper limit (18 wt %) of the allowable range. It follows that even when the toner content of the liquid 7 in the reservoir 115 increase slightly above the standard toner content, the developing liquid for replenishment is continuously replenished. Subsequently, when the toner content of the liquid 7 further increases, the residual image transfer liquid or the carrier liquid is replenished in place of the above liquid. This allows the toner content to be lowered at a later timing than when the residual image transfer liquid or the carrier liquid is substituted for the developing liquid as soon as the toner content exceeds 15 wt %. Consequently, a sharp decrease in the toner content of the liquid 7 and therefore short image density ascribable to short toner content is obviated.

If the actual liquid level is equal to the standard liquid level, as determined in the step S2, then the controller 202 sequentially executes steps S3, S4 and S14. In the step S14, the controller 202 determines whether or not the control should be executed. If the answer of the step S14 is Y, meaning that the control should be continued because development, for example, is under way, then the controller 202 returns to the step S1; if otherwise, the controller 202 ends the procedure.

So long as the printer is free from errors, the controller 202 executing the above procedure maintains the actual liquid level around the standard level because the actual level varies between the standard level and a level slightly below the standard level. However, there is a fear that the actual liquid level falls below the lower limit or rises above the upper limit due to, e.g., the failure of any one of the pumps and liquid level sensor 135 or the consumption of the carrier liquid or the developing liquid to be replenished. To solve this problem, the controller 202 determines whether or not the actual liquid level is abnormal (step S4 or S5). If the liquid level is abnormal (Y, step S4 or S5), then the controller 202 displays a liquid level error on the display and ends the procedure.

The pump drive effected in the step S9, S11 or S13 consumes 2 seconds, as stated above. However, the other processing completes almost instantaneously, so that the steps S1 through S12 or the steps S1 through S13 consumes only a little over 2 seconds. On the other hand, the toner content data is not updated over a little over 7 seconds, which is a single toner content calculating time. It follows that when the controller 202 repeatedly controls the toner content, the same toner content data is read out of the memory 203 and used at least three times.

As stated above, the controller 202 can execute the expected control based on the toner content data stored in the memory 203 without waiting until the sensing controller 201 calculates a toner content.

Again, when the actual liquid level reaches the emergency-stop liquid level, it is likely that the paddle 116 bodily appears above the liquid surface and scatters the liquid 7. In this case, the replenishment controller 202 stops the operation of the entire printer, although not shown in FIG. 30.

A thixotropic developing liquid having a toner content of 5% to 40% and a viscosity of 100 mPa·s to 10,000 mPa·s decreases its viscosity little by little to lower saturation viscosity when subjected to a shearing force. When the shearing force disappears, the liquid increases its viscosity little by little to hardening saturation density. Toner cannot be sufficiently dispersed in such a liquid unless the control agent is replenished with the viscosity of the liquid being evenly lowered by agitation in the second reservoir 115.

The illustrative embodiment, like the first embodiment, efficiently agitates the liquid 7 in the second reservoir 115, as described with reference to FIG. 10. In addition, the illustrative embodiment desirably collects the liquid from a cleaning blade and thereby further stabilizes the toner content of the liquid 7 in the second reservoir 115, as will be described hereinafter.

Assume that a cleaning blade is used to remove the thixotropic developing liquid, which is dependent on a shearing force, from the developing roller 105 or similar member. Then, the liquid removed by the cleaning blade moves along the surface of the blade due to gravity and then drops from the blade due to gravity. At this instant, when the liquid moves away from the developing roller 105 to a position where the former does not contact the latter, the viscosity of the liquid sharply increases because a shearing force derived from contact with the roller 105 disappears. As the viscosity of the liquid increases, the fluidity of the liquid on the blade decreases. As a result, the carrier of the liquid moves little by little with the toner depositing and cohering on the blade.

The toner cohered on the cleaning blade blocks the flow of the following liquid removed from the developing roller 105 and thereby causes the liquid to overflow via the end of the roller 105. Further, it is likely that the mass of the toner grown on the cleaning blade to a certain weight drops from the blade due to gravity and is then returned to the second reservoir 115, making the toner content of the liquid 7 in the reservoir 115 unstable. Moreover, such masses of toner are apt to reach the developing position without being loosened and adversely effect development.

To solve the above problems, the illustrative embodiment additionally includes a shearing force exerting member for exerting a shearing force on the liquid moving on and along the cleaning blade due to gravity. The shearing force applying member is applicable to any one of the cleaning blade 4a of the drum cleaner 4, the cleaning blade 112 of the collecting section 102, and the cleaning blade 172 of the sweeping unit 170, FIG. 29.

Figure 31:
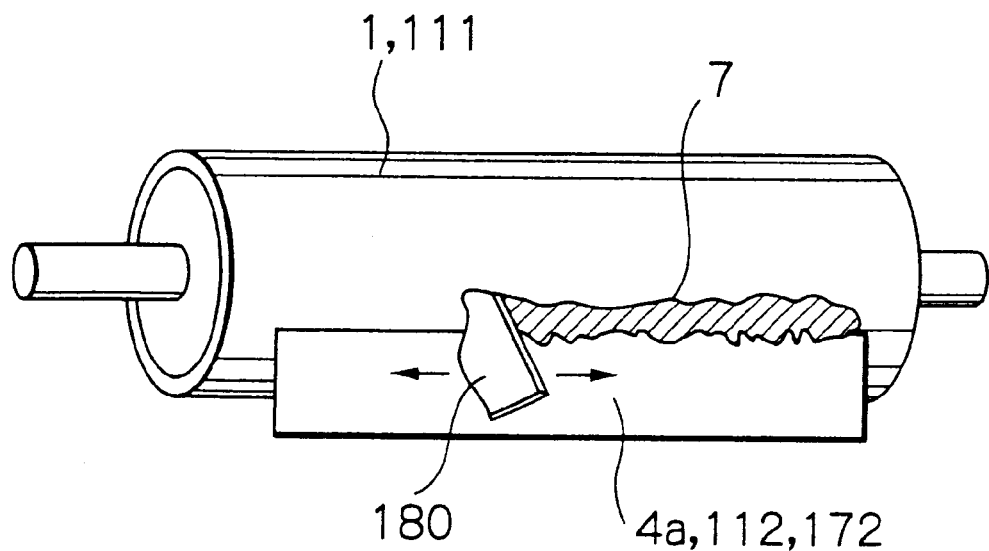
FIG. 31 is a perspective view showing a blade representative of a modification of the fourth embodiment.

FIG. 31 shows a blade 180 that is a specific form of the shearing force exerting member. As shown, the blade 180 has an edge abutting against any one of the cleaning blades 4a, 112 and 172. Drive means, not shown, causes the blade 180 to move back and forth on and along the surface of the cleaning blade in the lengthwise direction of the cleaning blade. The blade 180 moving back and forth exerts a shearing force on the liquid 7 deposited on the cleaning blade, thereby causing the viscosity of the liquid to increase little. This successfully reduces the cohesion of the toner on the cleaning blade and thereby further stabilizes the toner content of the liquid 7 in the second reservoir 115.

Figure 32:
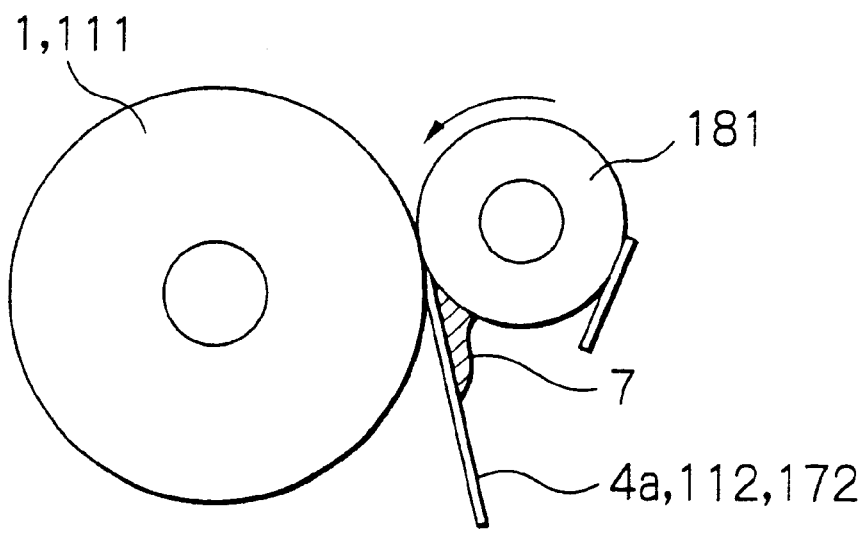
FIG. 32 is a section showing a roller representative of another modification of the fourth embodiment.

FIG. 32 shows a roller 181 that is another specific form of the shearing force exerting member. As shown, the roller 181 rotates while contacting substantially the entire length of the cleaning blade 4a, 112 or 172. The roller 181 is formed of sponge or similar elastic material. The roller 181 rotates while sandwiching the liquid 7 deposited on the cleaning blade between the roller 181 and the cleaning blade, thereby exerting a shearing force on the liquid 7. As a result, the viscosity of the liquid 7 increases little and prevents the toner from cohering on the cleaning blade. This further stabilizes the toner content of the liquid 7 in the second reservoir 115. If desired, the roller 181 may be replaced with a paddle, a brush or a screw rotatable in contact with the cleaning blade over substantially the entire length of the blade.

Fifth Embodiment

Figure 33:
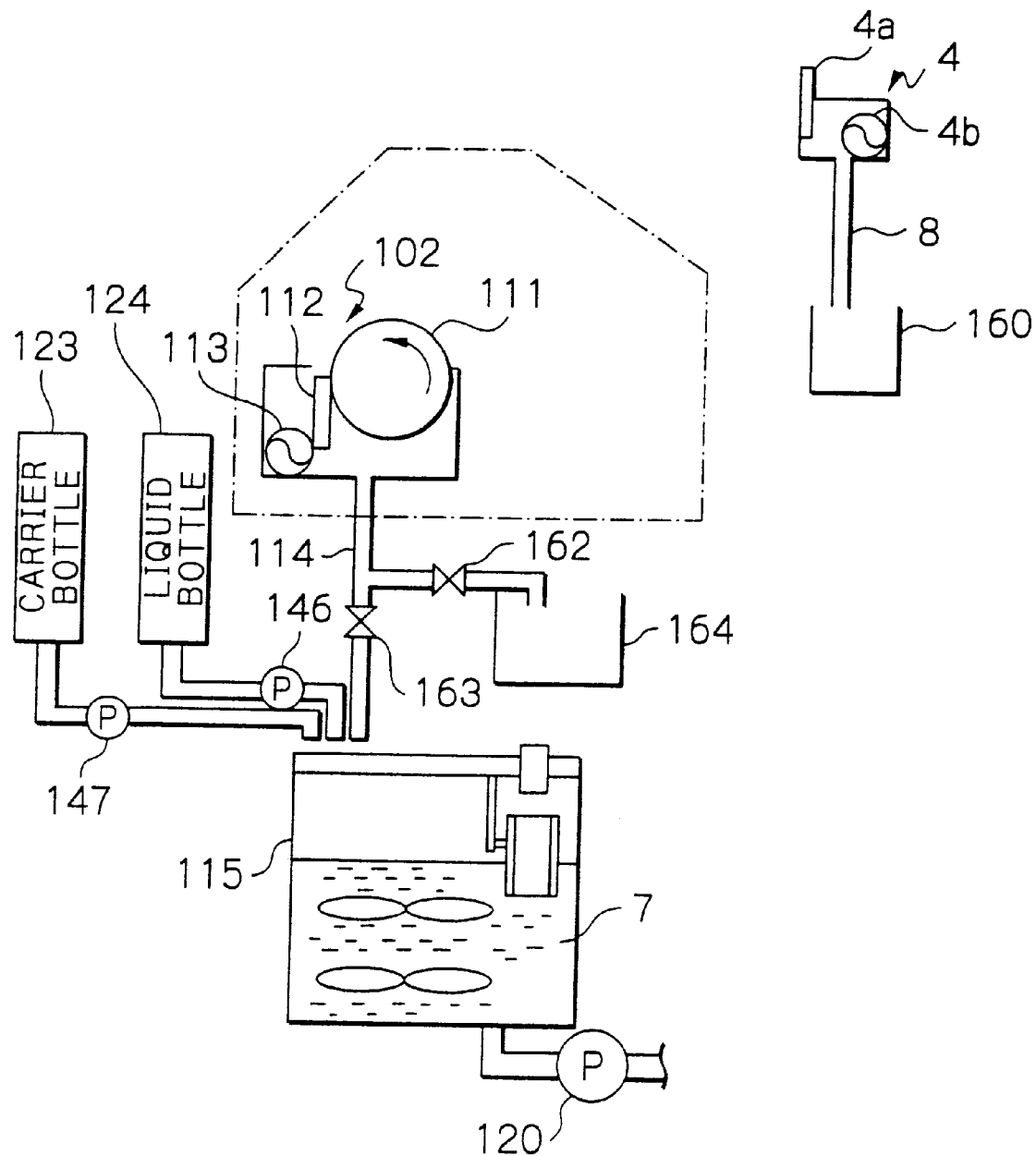
FIG. 33 is a view showing a fifth embodiment of the present invention.

A fifth embodiment of the present invention to be described is directed mainly toward the fifth object stated earlier. This embodiment is essentially similar to the fourth embodiment. In the figures, identical structural elements are designated by identical reference numerals and will not be described specifically in order to avoid redundancy. FIG. 33 shows arrangements for liquid collection unique to the illustrative embodiment.

As shown in FIG. 33, the cleaning blade 4a of the drum cleaner 4f removes the residual image transfer liquid from the drum 1. The screw 4b conveys the removed liquid horizontally until the liquid drops into the residual liquid reservoir 160 via the collection pipe 8 due to gravity. A conventional liquid level sensor, not shown, is positioned in the residual liquid reservoir 160. When the liquid level sensor senses the upper-limit liquid level, a "reservoir full" error appears on, e.g., a display. In the illustrative embodiment, the reservoir 160 is removably mounted to the printer body. When the "reservoir full" error appears on the display, the user of the printer removes the reservoir 160 from the printer body, empties the reservoir 160, and again mounts the reservoir 160 to the printer body. The residual liquid is therefore not reused in the printer, but is collected by a trader concerned.

In the developing unit 100, the cleaning blade 112 scrapes off the residual development liquid deposited on the collecting roller 111. The screw 113 conveys the residual development liquid horizontally until the liquid drops via the collection pipe 114 due to gravity. In the illustrative embodiment, the collection pipe 114 branches into a first path and a second path. The first path terminates at a residual liquid reservoir 164 via a solenoid-operated valve 162 while the second path terminates at the second reservoir 115 via a solenoid-operated valve 163.

Figure 34:
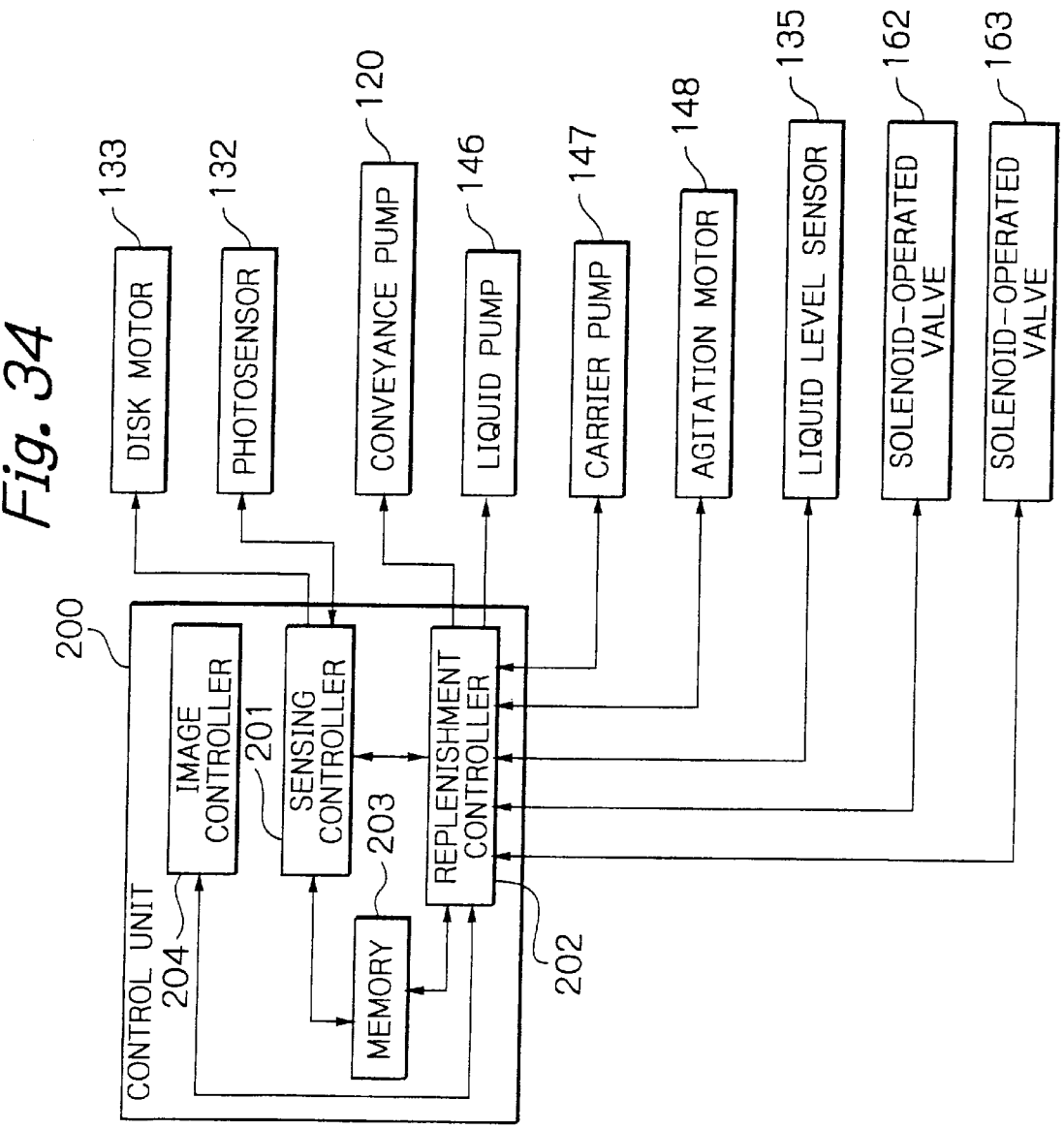
FIG. 34 is a block diagram schematically showing electric circuitry included in the fifth embodiment.

FIG. 34 shows part of electric circuitry included in the illustrative embodiment. As shown, the control unit 200 includes an image controller 204 in addition to the sensing controller 201, replenishment controller 202, and memory 203. The solenoid-operated valves 162 and 163 are connected to the replenishment controller 202 together with the conveyance pump 120, liquid pump 146, carrier pump 147, agitation motor 148, and liquid level sensor 135.

The image controller 204 causes the optical writing unit, not shown, to form a latent image on the drum 1 in accordance with an image signal fed from a personal computer not shown. More specifically, the image controller 204 calculates the image density of an image to be formed on the basis of the above image signal and delivers the calculated image density to the replenishment controller 202 as image density data. The image density refers to the ratio of an image area (total area of dots expected to form an image) to the entire area of the drum 1 to which the liquid 7 will be applied. The replenishment controller 202 drives the solenoid-operated valves 162 and 163 in accordance with the image density data.

As for the residual development liquid collected from the collecting roller 111, FIG. 33, the toner content is higher than, lower than or equal to one before development, depending on the image density of an image to be formed.

Specifically, when the image density reaches a certain value, the ratio of the amount of toner transferred from the developing roller 105 to the drum 1 at the developing position to the amount of carrier liquid becomes substantially equal to the ratio of the same in the liquid 7 before development. Consequently, the toner content of the residual development liquid becomes equal to the toner content of the liquid 7 before development. The image density in this particular condition will be referred to as equilibrium density hereinafter.

When the image density is higher than the equilibrium density, the ratio of the toner transferred from the developing roller 105 to the drum 1 at the developing position becomes greater than the ratio of the toner in the liquid 7 before development. Consequently, the toner content of the residual development liquid becomes lower than the toner content of the liquid 7 before development. Conversely, when the image density is lower than the equilibrium density, the ratio of the toner transferred to the developing roller 105 to the drum 1 decreases with the result that the toner content of the residual development liquid becomes higher than the toner content of the liquid 1 before development. The memory 203 stores data representative of the equilibrium density determined by experiments.

The replenishment controller 202 compares the image density data received from the image controller 204 with the equilibrium density data stored in the memory 203. If the image density data is greater than the equilibrium density data, then the controller 202 causes the solenoid-operated value 162 to open and causes the solenoid-operated valve 163 to close. If the image density data is not greater than the equilibrium density data, then the controller 202 causes the valve 162 to close and causes the valve 163 to open. Consequently, the residual development liquid lower in toner content than before development is collected in the residual liquid reservoir 164. Also, the residual development liquid higher in toner content than before development or equal thereto is not collected in the reservoir 164, but is returned to the second reservoir 115 to be reused. At this instant, the valves 162 and 163 and collection pipe 114 serve as bypass conveying means for returning the liquid to the reservoir 115.

The solenoid-operated valves 162 and 163 may be replaced with motor valves, if desired.

Figure 35:
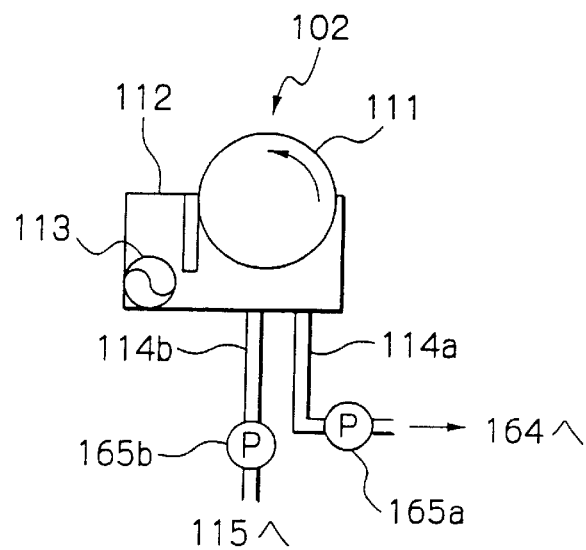
FIG. 35 is a view showing a modification of bypass conveying means included in the fifth embodiment.

Assume that the residual development liquid is difficult to drop from the collecting section 102 into the second reservoir 115 or the residual liquid reservoir 164 due to gravity. Then, as shown in FIG. 35, the bypass conveying means may be modified as shown in FIG. 35. As shown, a collection pipe 114a extends from the collecting section 102 to the residual liquid reservoir 164 via a conveyance pump 165a. Another collecting pipe 114b extends from the collecting section 102 to the second reservoir 115 via a conveyance pump 165b. In this case, the replenishment controller 202 drives either one of the pumps 165a and 165b by comparing the image density data and equilibrium density, thereby delivering the residual development liquid to either one of the reservoirs 164 and 115.

In the illustrative embodiment, assume that when the liquid level in the second reservoir 115 drops to allow the control agent to be replenished, it is necessary to dilute the liquid 7 in the reservoir 115. Then, the residual development liquid stored in the residual liquid reservoir 164 is replenished prior to the carrier liquid, as stated earlier. The residual liquid reservoir 164 is therefore prevented from being filled up with the residual development liquid. For safety purpose, the illustrative embodiment additionally includes the previously mentioned liquid level sensor disposed in the residual liquid reservoir 164, which is removable from the printer body.

Assume that a "reservoir full" error representative of the upper-limit liquid level sensed by the above sensor appears on the display, as stated previously. Then, the user removes the reservoir 164 from the printer body, pours part of the liquid into another vessel, and again mounts the reservoir 164 to the printer body to thereby cancel the "reservoir full" error. Subsequently, when the liquid level in the reservoir 164 drops to a sufficient level, the user returns the liquid from the vessel to the reservoir 164 for a recycling purpose.

The illustrative embodiment, like the fourth embodiment, uses a target toner content higher than the standard toner content (15 wt %), but lower than or equal to the upper limit (18 wt %) of the allowable range. It is therefore possible to obviate a sharp decrease in the toner content of the liquid 7 and therefore to obviate short image density ascribable to short toner content.

Figure 36:
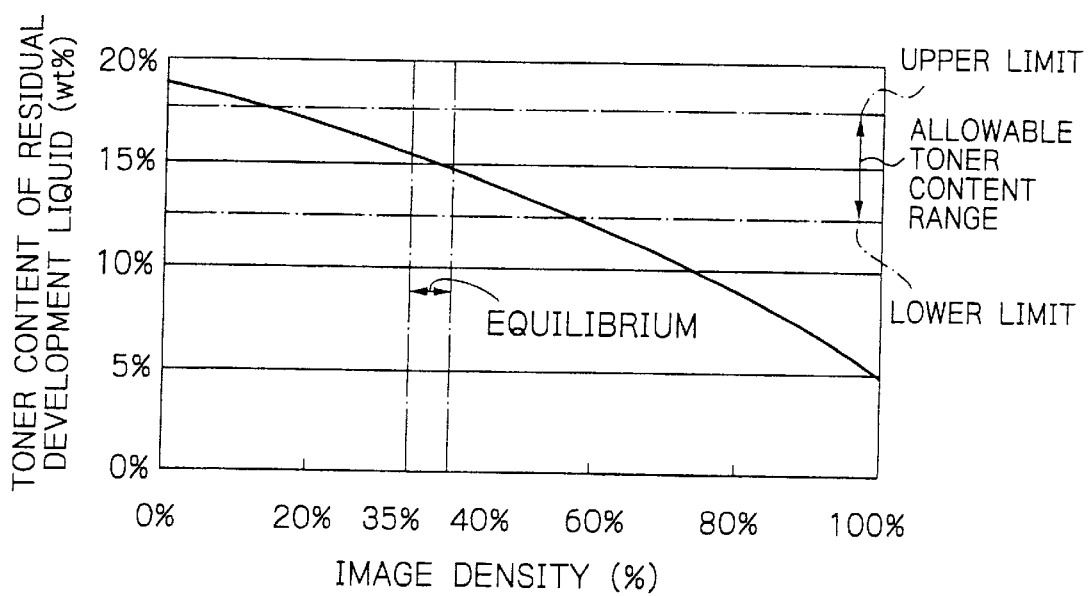
FIG. 36 is a graph showing a relation between a developing liquid before development and the equilibrium value of image density.

However, the equilibrium density is not image density that implements the standard toner content (15 wt %), but is image density than can make the toner content of the residual development liquid equal to that of the liquid 7 before development. Moreover, the equilibrium density varies along with the toner content of the liquid 7 before development, i.e., stored in the second reservoir 115. FIG. 36 shows a specific relation between the equilibrium density and the toner content of the liquid 7 before development. As shown, when the toner content of the liquid 7 is coincident with the upper-limit toner content, the equilibrium density is 35% while the toner content of the residual liquid is 18 wt %, which is the upper limit. Likewise, when the toner content of the liquid 7 is coincident with the lower-limit toner content, the equilibrium density is 40% while the toner content of the residual liquid is 12 wt %, which is the lower limit. Further, when the toner content of the liquid 7 is coincident with the standard toner content, the equilibrium density is 37.5% while the toner content of the residual liquid is 15 wt %, which is the standard toner content.

In the illustrative embodiment, the memory 203 stores a data table showing correspondence between various toner contents and equivalent densities mentioned above. The replenishment controller 202 selects a particular equilibrium density by comparing the toner content of the liquid 7 and data table.

The control scheme stated above, however, cannot solve the following problem alone. Assume that the toner content of the liquid 7 is coincident with the upper limit (18 wt %) of the allowable range, and that the image density data is greater than the equilibrium density. Then, the residual development liquid short of the upper limit is stored in the residual liquid reservoir 164. On the other hand, assume that the toner content of the liquid 7 is coincident with the lower limit (12 wt %) of the allowable range, and that the image density data is greater than the equilibrium density. Then, the residual development liquid short of the lower limit is stored in the reservoir 164. It is therefore likely that not only the residual development liquid whose toner density is lower than the standard density (15 wt %), but also the residual development liquid whose toner density is above the standard density and can be directly returned to the second reservoir 115 are stored in the residual liquid reservoir 164.

The above control scheme therefore causes the residual development liquid capable of being recycled to be simply wasted. Assume that the residual development liquid stored in the liquid tank 164 is used as a control agent for diluting the liquid 7 in the second reservoir 115, as in the fourth embodiment. Then, the control agent increases the toner content of the residual development liquid above the standard toner density and cannot adequately implement adjustment. It is therefore preferable to set for each toner content of the liquid 7 a particular equilibrium density that does not lower the toner content of the residual development liquid below the toner content of the liquid 7 in the reservoir 115, but lowers it below the standard toner content (15 wt %). This allows only the residual development liquid whose toner content is lower than the standard content to be stored in the residual liquid reservoir 164.

In the illustrative embodiment, the replenishment controller 202 writes in the memory 203 not only the image density data of a new image to be formed, but also the image density data of a plurality of images formed in the past. Specifically, the controller 202 writes the image density data of the last nineteen images in the memory 203 in addition to the image density data of a new image to be formed.

Furthermore, two different target toner densities are set in the range higher than the target toner density (15 wt %), but lower than or equal to the upper limit of the allowable range (18 wt % or below). The replenishment controller 202 produces a mean value of the twenty consecutive image density data in total and compares it with the equilibrium density. If the mean value is greater than the equilibrium value, then the controller 202 selects greater one of the target toner densities; if otherwise, it selects smaller one of the target toner densities.

The mean value of the past image density data read out of the memory 203 shows whether or not the user tends to continuously produce images with relatively high image density. If the answer of this decision is positive, then the replenishment controller 202 selects the higher target density than usual. Therefore, even when images with relatively high density are continuously produced for a moment, the controller 202 surely prevents the toner content of the liquid 7 in the second reservoir 115 from falling below the lower limit of the allowable range and lowering image density.

As stated above, in the illustrative embodiment, the residual development liquid whose toner content is equal to or higher than one before development is returned to the second reservoir 115 and reused. On the other hand, the residual development liquid whose toner content is lower than one before development is stored in the residual liquid reservoir 164. Consequently, the toner content of the liquid 7 in the second reservoir 155 remains stable more than conventional.

The illustrative embodiment, too, should preferably be provided with the implementation for efficiently agitating the liquid 7 in the second reservoir 115 and an implementation for efficiently collecting the liquid removed by the cleaning blades.

Figure 37:
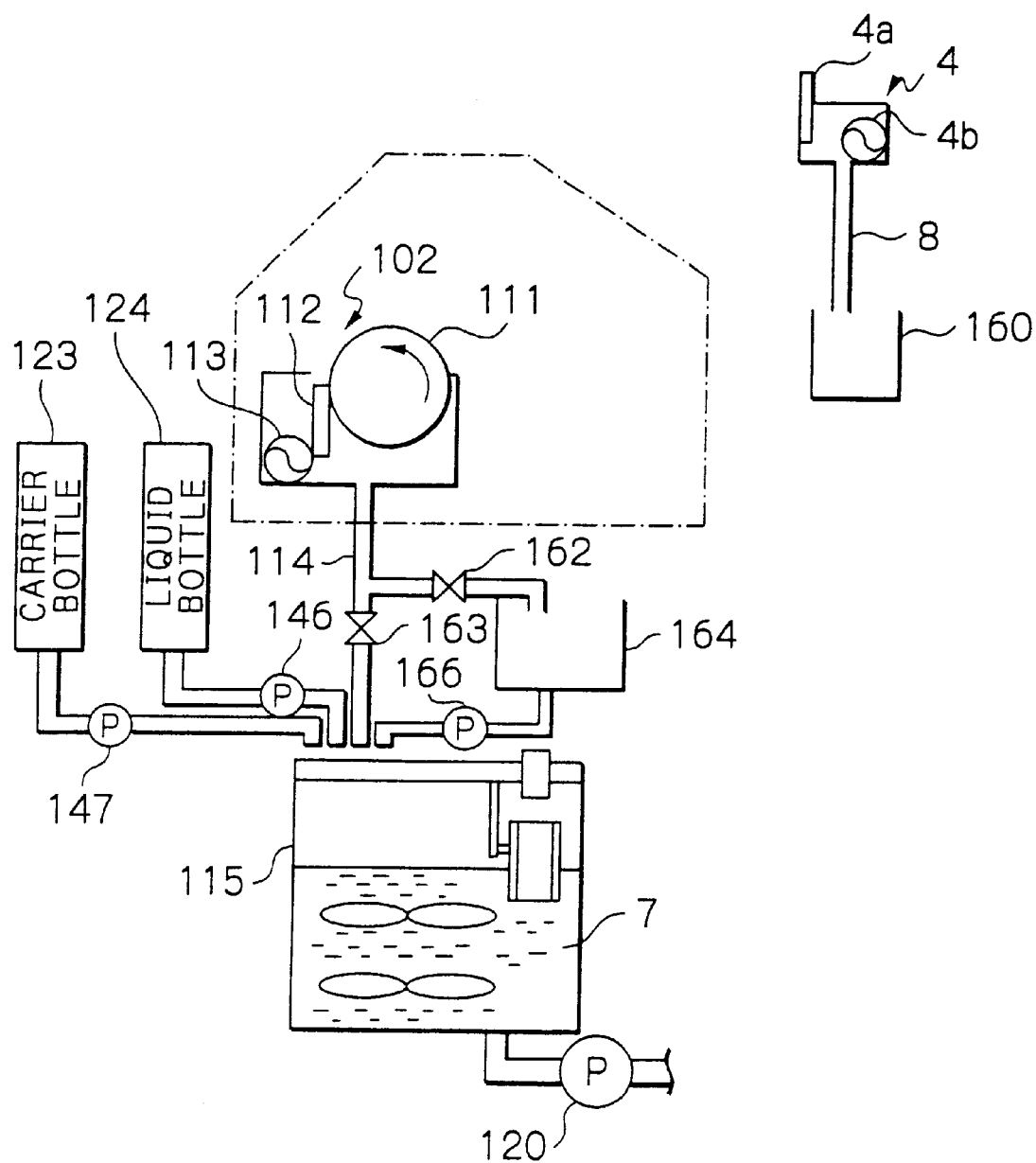
FIG. 37 is a view showing a modification of the fifth embodiment.

Modifications of the illustrative embodiment will be described hereinafter. FIG. 37 shows a modification additionally including a recycling pipe 167 extending from the residual liquid reservoir 164 to the second reservoir 115 via a residual liquid pump 166. In the modification, the memory 203 stores values, which lower the toner density of the liquid 7 in the reservoir 115 below the standard toner density (15 wt %), in correspondence to the toner densities of the liquid 7 as equilibrium values. Therefore, only the residual development liquid whose toner content is lower than the standard density is stored in the residual liquid reservoir 164.

In this modification, the replenishment controller 202 executes the following control when determining that the liquid 7 in the second reservoir 115 should be diluted. First, the controller 202 drives the residual liquid pump 166 for a preselected period of time in order to deliver the residual development liquid from the residual liquid reservoir 164 to the second reservoir 155. If the liquid level in the second reservoir 155 does not rise to the standard level, as described in relation to the fourth embodiment, in the above period of time, then the controller 202 stops driving the residual liquid pump 166 and starts driving the carrier pump 147.

With the above control, the controller 202 temporarily stores the residual development liquid whose toner content has decreased below the standard toner content (15 wt %) in the residual liquid reservoir 164. The controller 202 then returns the residual development liquid to the second reservoir 115 as a control agent for diluting the liquid 7, as needed. Therefore, the entire residual development liquid collected can be recycled without being discarded. Further, the residual development liquid stored in the reservoir 164 is used prior to the carrier liquid as a control agent. This causes a minimum of carrier liquid to be wastefully replenished and further promotes the efficient recycling of the residual development liquid.

Figure 38:
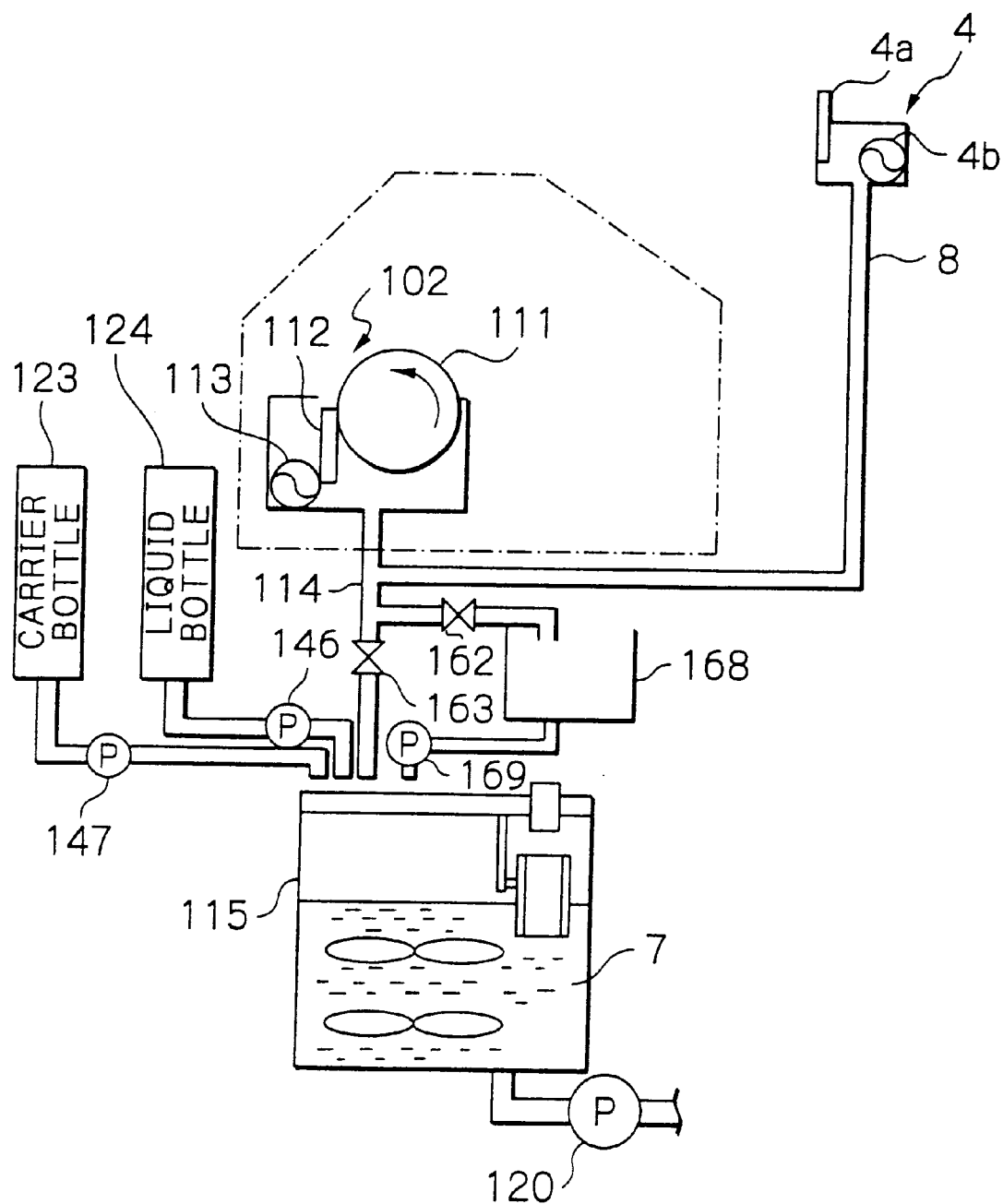
FIG. 38 is a view showing another modification of the fifth embodiment.

FIG. 38 shows another modification of the illustrative embodiment. As shown, the collection pipe 8 connected at one end to the residual liquid reservoir 160 is connected at the other end to the portion of the collection pipe 114 of the collecting portion 102 closer to the section 102 than to the solenoid-operated valves 162 and 163. In this configuration, a mixture of the residual development liquid and residual image transfer liquid is collected in the collection pipe 114 and then returned to the second reservoir 115 or collected in a mixture reservoir 168, which is a substitute for the residual liquid reservoir 164. A mixture pump 169 returns the mixture collected in the mixture reservoir 168 to the second reservoir 115.

Assume that a toner image formed on the drum 1 is directly transferred to the paper sheet P without the intermediately of the recording medium 3, FIG. 28. Then, the quantity of residual liquid to be collected from the drum 1 is dependent on the liquid absorbability of the recording medium P. For example, a greater amount of liquid is collected when the recording medium P is a porous paper sheet with high absorbability than when it is an OHP (OverHead Projector) sheet with low absorbability.

By contrast, when a toner image is transferred from the drum 1 to the recording medium P via the intermediate drum 3 or any other intermediate image transfer body, as in the modification, the intermediate drum 3 absorbs a constant amount of liquid and therefore stabilizes the amount of liquid to be collected. However, the amount of liquid to be collected is not constant. In this configuration, the toner content of the mixture of the residual liquids is correlated to image density. When image density has a certain constant value, the toner content of the above mixture is coincident with the standard toner content (15 wt %). Let such image density be referred to as a mixture equilibrium value.

In the modification, the memory 203 stores a data table showing correspondence between experimentally determined mixture equilibrium values and the toner contents of the liquid 7 in the second reservoir 115. The replenishment controller 202 scans the data table to select one mixture equilibrium value corresponding to the toner content of the liquid 7 in the reservoir 115 and compares it with image density data received from the image controller 204. If the image density data is greater than the mixture equilibrium value, then the replenishment controller 202 opens the valve 162 and closes the valve 163; if otherwise, it closes the valve 162 and opens the valve 163. Consequently, the mixture whose standard toner density is also lowered is stored in the mixture tank 168. On the other hand, the mixture whose toner content is equal to or higher than the standard toner density is returned to the reservoir 115 and recycled.

Assume that the replenishment controller 202 determines that the liquid 7 in the reservoir 115 should be diluted. Then, the controller 202 drives the collection pump 169 for a preselected period of time. If the liquid level in the reservoir 115 does not rise to the standard liquid level in the above period of time, then the controller 202 stops driving the collection pump 169 and starts driving the carrier pump 147.

The modifications shown and described each are capable of recycling not only the liquid left after development but also the liquid left after image transfer.

Sixth Embodiment

Figure 39:
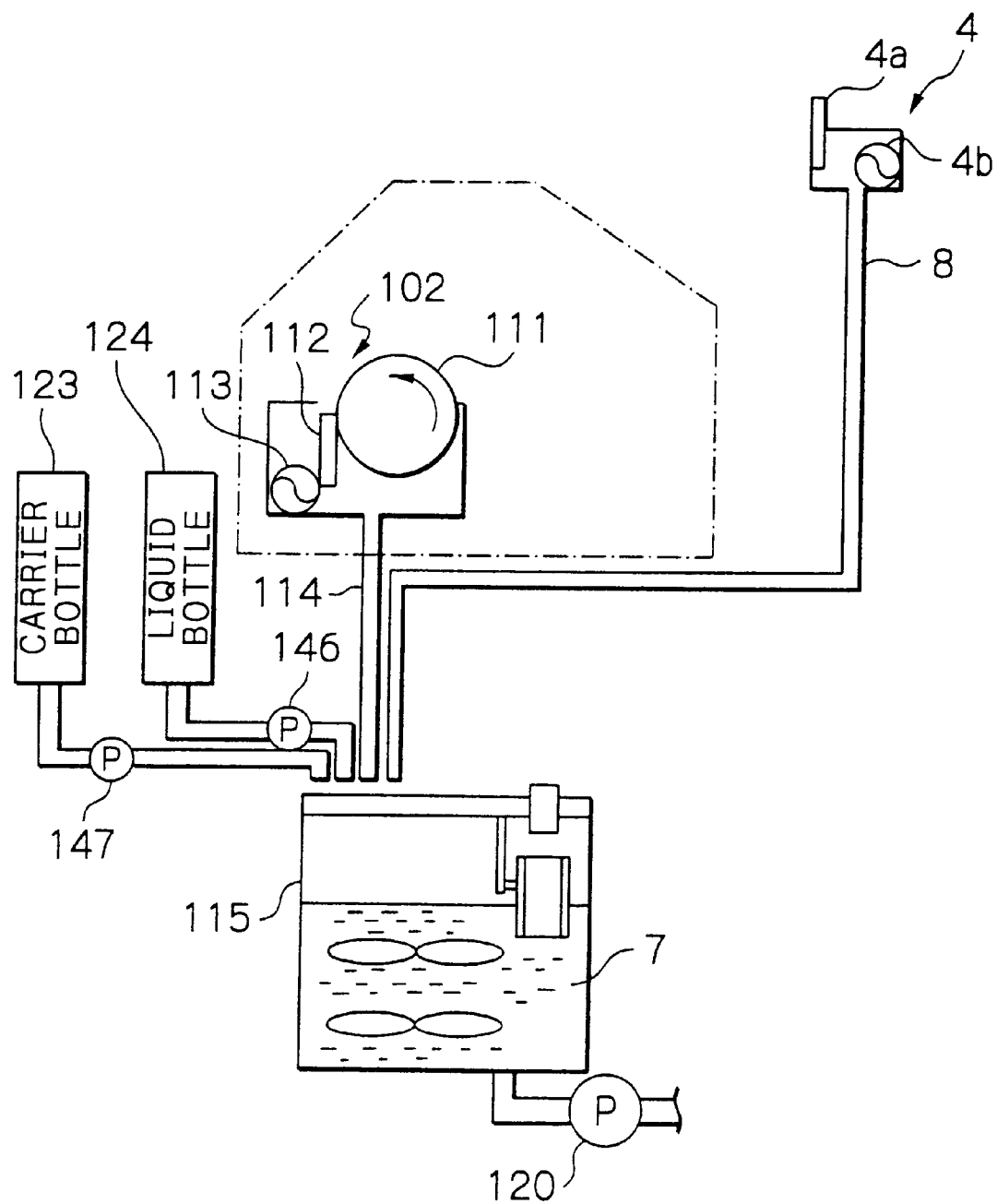
FIG. 39 is a view showing a sixth embodiment of the present invention.

A sixth embodiment to be described is directed mainly toward the fifth object stated earlier. The basic configuration of this embodiment is identical with the configuration of the fourth embodiment and will not be described specifically in order to avoid redundancy. As shown in FIG. 39, the residual image transfer liquid in the drum cleaner and the residual development liquid in the collecting section 102 are directly returned to the second reservoir 115 without the intermediary of any intermediate reservoir. The illustrative embodiment, like the fifth embodiment, includes the image controller 204, FIG. 34.

As for the mixture liquid referred to in the fifth embodiment, the toner content can be adjusted if the timing for forming a latent image on the drum 1 is varied and if the developing time is varied accordingly. Specifically, the liquid left on part of the developing roller 105 contacted the non-image area of the drum 1 has a higher toner content than before development. This is because the liquid left on the developing roller 105 after development causes toner to migrate to the drum 1 little, but causes some carrier liquid to deposit on the drum 1 due to its viscosity.

On the other hand, the developing roller 105 sequentially executes development with the drum 1 from a front non-image portion (upper margin of the recording medium P and zone preceding it) to a rear non-image portion (lower margin of the recording medium P and zone following it) via an image portion between the upper and lower margins in the circumferential direction. Hardly any toner deposits on the front and rear non-image portions because a latent image is absent there.

By varying the latent image forming timing such that the front non-image portion varies in length in the circumferential direction of the drum 1, it is possible to vary the amount of residual liquid whose toner content is higher than before development and therefore to vary the toner content of the mixture liquid. It follows that even when a solid image is formed over the entire recording medium P, the toner content of the mixture liquid can remain above the standard toner density if the latent image forming timing is delayed by a large margin in accordance with the image density of the solid image.

In light of the above, the image controller 204 calculates the image density of an image to be formed and varies the latent image forming timing in accordance with the calculated image density. Consequently, the mixture liquid has a toner content equal to or above the toner content (15 wt %) without regard to image density.

The illustrative embodiment does not return the mixture liquid whose toner content is lower than the standard toner content to the second reservoir 115 and thereby maintains the toner content of the liquid 7 in the reservoir 115 stable more than conventional.

The fourth to sixth embodiments shown and described have various unprecedented advantages, as enumerated below.

(1) The developing liquid in the liquid storing section has its toner content stabilized more than conventional.

(2) The residual image transfer liquid is returned to the liquid storing section only when needed, so that the liquid in the storing section has its toner content stabilized more than conventional.

(3) The residual development liquid that will dilute the developing liquid is stored in the residual liquid storing section. This also stabilizes the toner content of the liquid in the liquid storing section more than conventional.

(4) The liquid in the residual liquid storing section can be recycled as a control agent for diluting the developing liquid in the liquid storing section.

(5) Not only the residual development liquid but also the residual image transfer liquid can be used as a control agent.

(6) Even when the mixture liquid or control agent is short, the carrier liquid can be used as a control agent in order to adequately dilute the developing liquid.

(7) The residual image transfer liquid and residual development liquid can be efficiently recycled without being wastefully stored.

(8) The toner content of the liquid in the liquid storing section can be restored to the target content not only when the toner content is lowered below the target content but also when the former is raised above the latter.

(9) There can be obviated the fall of image density ascribable to the dilution of the liquid in the liquid storing section beyond the allowable range.

(10) Even when images with relatively high image density are continuously output for a moment, there can be obviated the fall of image density ascribable to the dilution of the liquid in the liquid storing section beyond the allowable range.

(11) A latent image forming timing is adjusted in accordance with the image density of an image to be formed. This is also successful to stabilize the substance content of the liquid in the liquid storing section more than conventional.

(12) Even when the developing liquid is thixotropic, a quantity of light representative of the substance content of the liquid is surely obtained from the liquid. This allows the substance content of the liquid to be surely sensed.

(13) A liquid level in the liquid storing section can be confined in an adequate range.

(14) A difference between the actual liquid level in the liquid storing section and the liquid level sensed by liquid level sensing means is reduced.

(15) Images with high density can be formed by a smaller amount of liquid than when the liquid has a substance content lower than 5%. Further, images with high density can be formed at lower cost than when use is made of an expensive developing liquid whose viscosity is above 10,000 mPa·s for easy agitation. Moreover, irregular image density ascribable to the irregular dispersion of toner can be reduced more than when use is made of a developing liquid whose viscosity is lower than 100 mPa·s and apt to bring about the above irregular dispersion.

Various modifications will become possible for those skilled in the art after receiving the teachings of the present disclosure without departing from the scope thereof.

What is claimed is:

1. A developing device for developing a latent image formed on an image carrier with a developing liquid, said developing device comprising:
   a liquid storing section for storing the developing liquid consisting of a developing substance and a carrier liquid;
   a developer carrier for depositing the developing liquid fed from said liquid storing section thereon; and a float type liquid level sensor for sensing a liquid level in said liquid storing section;
   said float type liquid level sensor comprising:
      a magnetic force generating member;
      magnetic force sensing means for sensing a magnetic force of said magnetic force generating member; and
      spherical floats movable in an up-and-down direction in accordance with the liquid level in said liquid storing section, wherein a distance between said magnetic force generating member and said magnetic force sensing means varies in accordance with a movement of said floats, allowing the liquid level to be determined on the basis of an output of said magnetic force sensing means.

2. The device as claimed in claim 1, wherein said magnetic force generating member is movable up and down relative to said magnetic force sensing means together with said floats.

3. The device as claimed in claim 2, wherein said magnetic force sensing means comprises a plurality of magnetic force sensing means arranged in parallel in the up-and-down direction.

4. The device as claimed in claim 3, wherein said floats are formed of foam resin.

5. The device as claimed in claim 4, further comprising agitating means disposed in said liquid storing section and rotatable about an axis offset from a center of a cross-section of said liquid storing section for agitating the developing liquid.

6. The device as claimed in claim 5, wherein said agitating means comprises:
   a flexible paddle rotatable in contact with an inner periphery of said liquid storing section while deforming itself and
   a non-flexible paddle rotatable about a same axis of rotation as said flexible paddle for causing the developing liquid to flow along said axis.

7. The device as claimed in claim 6, wherein said non-flexible paddle causes the developing liquid to flow downward toward a bottom of said liquid storing section along the axis of rotation.

8. The device as claimed in claim 7, wherein said liquid storing section is formed with a taper at a bottom corner such that said taper guides the developing liquid flown downward and rebounded from the bottom upward in a direction opposite to a direction in which the axis is offset from the center.

9. The device as claimed in claim 1, wherein said floats are formed of foam resin.

10. The device as claimed in claim 9, further comprising agitating means disposed in said liquid storing section and rotatable about an axis offset from a center of a cross-section of said liquid storing section for agitating the developing liquid.

11. The device as claimed in claim 10, wherein said agitating means comprises:
    a flexible paddle rotatable in contact with an inner periphery of said liquid storing section while deforming itself; and a non-flexible paddle rotatable about a same axis of rotation as said flexible paddle for causing the developing liquid to flow along said axis.

12. The device as claimed in claim 11, wherein said non-flexible paddle causes the developing liquid to flow downward toward a bottom of said liquid storing section along the axis of rotation.

13. The device as claimed in claim 12, wherein said liquid storing section is formed with a taper at a bottom corner such that said taper guides the developing liquid flown downward and rebounded from the bottom upward in a direction opposite to a direction in which the axis is offset from the center.

14. The device as claimed in claim 1, further comprising agitating means disposed in said liquid storing section and rotatable about an axis offset from a center of a cross-section of said liquid storing section for agitating the developing liquid.

15. The device as claimed in claim 14, wherein said agitating means comprises:
   a flexible paddle rotatable in contact with an inner periphery of said liquid storing section while deforming itself and
   a non-flexible paddle rotatable about a same axis of rotation as said flexible paddle for causing the developing liquid to flow along said axis.

16. The device as claimed in claim 15, wherein said non-flexible paddle causes the developing liquid to flow downward toward a bottom of said liquid storing section along the axis of rotation.

17. The device as claimed in claim 16, wherein said liquid storing section is formed with a taper at a bottom corner such that said taper guides the developing liquid flown downward and rebounded from the bottom upward in a direction opposite to a direction in which the axis is offset from the center.

18. An image forming apparatus comprising:
   an image carrier for forming a latent image thereon;
   image forming means for forming the latent image on said image carrier; and
   a developing device for depositing a developing substance contained in a developing liquid on the latent image to thereby develop said latent image;
   said developing device comprising:
      a liquid storing section for storing the developing liquid consisting of the developing substance and a carrier liquid;
      a developer carrier for depositing the developing liquid fed from said liquid storing section thereon; and
      a float type liquid level sensor for sensing a liquid level in said liquid storing section;
      said float type liquid level sensor comprising:
         a magnetic force generating member;
         magnetic force sensing means for sensing a magnetic force of said magnetic force generating member; and
         spherical floats movable in an up-and-down direction in accordance with the liquid level in said liquid storing section;
         wherein a distance between said magnetic force generating member and said magnetic force sensing means varies in accordance with a movement of said floats, allowing the liquid level to be determined on the basis of an output of said magnetic force sensing means.

19. The apparatus as claimed in claim 18, further comprising:
   content sensing means for sensing a content of the developing substance of the developing liquid stored in said liquid storing section;
   collecting means for collecting the developing liquid used for development and returning said developing liquid to said liquid storing section;
   replenishing means for replenishing a control agent for controlling the content of the developing substance of the developing liquid to said liquid storing section; and
   control means for controllably driving said replenishing means in accordance with an output of said content sensing means and an output of said liquid level sensor to thereby control the content of the developing substance.

20. The apparatus as claimed in claim 19, wherein whether or not the control agent is present in said replenishing means is determined on the basis of the output of said liquid level sensor and a duration of drive of said replenishing means.

21. The apparatus as claimed in claim 20, wherein the developing liquid contains the developing substance dispersed in a content of between 5% and 40% and has viscosity of between 100 mPa·s and 10,000 mPa·s.

22. A developing device for developing a latent image formed on an image carrier with a developing liquid, said developing device comprising:
   a liquid storing section for storing the developing liquid consisting of a developing substance and a carrier liquid;
   a developer carrier for depositing the developing liquid fed from said liquid storing section thereon; and
   a float type liquid level sensor for sensing a liquid level in said liquid storing section;
   said float type liquid level sensor comprising:
      a magnetic force generating member;
      magnetic force sensing means for sensing a magnetic force of said magnetic force generating member;
      floats movable in an up-and-down direction in accordance with the liquid level in said liquid storing section;
      an elongate, ring support member supporting said floats at opposite ends thereof, supporting either one of said magnetic force generating member and said magnetic force sensing means at a position intermediate between said opposite ends, and supporting rings between said position and said opposite ends; and
      a plurality of guide rods respectively inserted in said rings for guiding said floats in the up-and-down direction;
      wherein a distance between said magnetic force generating member and said magnetic force sensing means varies in accordance with a movement of said floats, allowing the liquid level to be determined on the basis of an output of said magnetic force sensing means.

23. The device as claimed in claim 22, wherein said magnetic force generating member is movable up and down relative to said magnetic force sensing means together with said floats.

24. The device as claimed in claim 23, wherein said magnetic force sensing means comprises a plurality of magnetic force sensing means arranged in parallel in the up-and-down direction.

25. The device as claimed in claim 24, wherein said floats are formed of foam resin.

26. The device as claimed in claim 25, further comprising agitating means disposed in said liquid storing section and rotatable about an axis offset from a center of a cross-section of said agent storing section for agitating the developing liquid.

27. The device as claimed in claim 26, wherein said agitating means comprises:
   a flexible paddle rotatable in contact with an inner periphery of said liquid storing section while deforming itself; and
   a non-flexible paddle rotatable about a same axis of rotation as said flexible paddle for causing the developing liquid to flow along said axis.

28. The device as claimed in claim 27, wherein said non-flexible paddle causes the developing liquid to flow downward toward a bottom of said liquid storing section along the axis of rotation.

29. The device as claimed in claim 28, wherein said liquid storing section is formed with a taper at a bottom corner such that said taper guides the developing liquid flown downward and rebounded from the bottom upward in a direction opposite to a direction in which the axis is offset from the center.

30. The device as claimed in claim 22, wherein said floats are formed of foam resin.

31. The device as claimed in claim 30, further comprising agitating means disposed in said liquid storing section and rotatable about an axis offset from a center of a cross-section of said liquid storing section for agitating the developing liquid.

32. The device as claimed in claim 31, wherein said agitating means comprises:
   a flexible paddle rotatable in contact with an inner periphery of said liquid storing section while deforming itself; and
   a non-flexible paddle rotatable about a same axis of rotation as said flexible paddle for causing the developing liquid to flow along said axis.

33. The device as claimed in claim 32, wherein said non-flexible paddle causes the developing liquid to flow downward toward a bottom of said liquid storing section along the axis of rotation.

34. The device as claimed in claim 33, wherein said liquid storing section is formed with a taper at a bottom corner such that said taper guides the developing liquid flown downward and rebounded from the bottom upward in a direction opposite to a direction in which the axis is offset from the center.

35. The device as claimed in claim 22, further comprising agitating means disposed in said liquid storing section and rotatable about an axis offset from a center of a cross-section of said liquid storing section for agitating the developing liquid.

36. The device as claimed in claim 35, wherein said agitating means comprises:
   a flexible paddle rotatable in contact with an inner periphery of said liquid storing section while deforming itself; and
   a non-flexible paddle rotatable about a same axis of rotation as said flexible paddle for causing the developing liquid to flow along said axis.

37. The device as claimed in claim 36, wherein said non-flexible paddle causes the developing liquid to flow downward toward a bottom of said liquid storing section along the axis of rotation.

38. The device as claimed in claim 37, wherein said liquid storing section is formed with a taper at a bottom corner such that said taper guides the developing liquid flown downward and rebounded from the bottom upward in a direction opposite to a direction in which the axis is offset from the center.

39. An image forming apparatus comprising:
   an image carrier for forming a latent image thereon;
   image forming means for forming the latent image on said image carrier; and
   a developing device for depositing a developing substance contained in a developing liquid on the latent image to thereby develop said latent image;
   said developing device comprising:
      a liquid storing section for storing the developing liquid consisting of the developing substance and a carrier liquid;
      a developer carrier for depositing the developing liquid fed from said liquid storing section thereon; and
      a float type liquid level sensor for sensing a liquid level in said liquid storing section;
      said float type liquid level sensor comprising:
         a magnetic force generating member;
         magnetic force sensing means for sensing a magnetic force of said magnetic force generating member;
         floats movable in an up-and-down direction in accordance with the liquid level in said liquid storing section; and
         an elongate, ring support member supporting said floats at opposite ends thereof, supporting either one of said magnetic force generating member and said magnetic force sensing means at a position intermediate between said opposite ends, and supporting rings between said position and said opposite ends; and
         a plurality of guide rods respectively inserted in said rings for guiding said floats in the up-and-down direction;
         wherein a distance between said magnetic force generating member and said magnetic force sensing means varies in accordance with a movement of said floats, allowing the liquid level to be determined on the basis of an output of said magnetic force sensing means.

40. The apparatus as claimed in claim 39, further comprising:
   content sensing means for sensing a content of the developing substance of the developing liquid stored in said liquid storing section;
   collecting means for collecting the developing liquid used for development and returning said developing liquid to said liquid storing section;
   replenishing means for replenishing a control agent for controlling the content of the developing substance of the developing liquid to said liquid storing section; and
   control means for controllably driving said replenishing means in accordance with an output of said content sensing means and an output of said liquid level sensor to thereby control the content of the developing substance.

41. The apparatus as claimed in claim 40, wherein whether or not the control agent is present in said replenishing means is determined on the basis of the output of said liquid level sensor and a duration of drive of said replenishing means.

42. The apparatus as claimed in claim 41, wherein the developing liquid contains the developing substance dispersed in a content of between 5% and 40% and has viscosity of between 100 mPa·s and 10,000 mPa·s.

43. A developing device for developing a latent image formed on an image carrier with a developing liquid, said developing device comprising:
a liquid storing section for storing the developing liquid consisting of a developing substance and a carrier liquid;
a developer carrier for depositing the developing liquid fed from said liquid storing section thereon; and
agitating means rotatable in said liquid storing section for causing the developing liquid to swirl in a horizontal direction to thereby agitate said developing liquid, said agitating means comprising a flexible agitating member,
wherein said liquid storing section comprises:
a first liquid storing section for storing the developing liquid to be fed to said developer carrier; and
a second liquid storing section for storing a developing liquid to be fed to said first liquid storing section;
said developing device further comprising:
collecting means for collecting the developing liquid used for development from said developer carrier and feeding said developing liquid collected to said second liquid storing section;
content sensing means for sensing a content of the developing substance of the developing liquid stored in said second liquid storing section; and
content controlling means for controlling the content of the developing substance in accordance with an output of said content sensing means;
wherein said flexible agitating member is disposed at least in said second liquid storing section.

44. An image forming apparatus comprising:
an image carrier for forming a latent image thereon;
image forming means for forming a latent image on said image carrier; and
a developing device for developing the latent image by depositing a developing substance contained in the developing liquid on said latent image;
said developing device comprising:
a liquid storing section for storing the developing liquid consisting of the developing substance and a carrier liquid;
a developer carrier for depositing the developing liquid fed from said liquid storing section thereon; and
agitating means rotatable in said liquid storing section for causing the developing liquid to swirl in a horizontal direction to thereby agitate said developing liquid, said agitating means comprising a flexible agitating member,
wherein said liquid storing section comprises:
a first liquid storing section for storing the developing liquid to be fed to said developer carrier; and
a second liquid storing section for storing a developing liquid to be fed to said first liquid storing section;
said developing device further comprising:
collecting means for collecting the developing liquid used for development from said developer carrier and feeding said developing liquid collected to said second liquid storing section;
content sensing means for sensing a content of the developing substance of the developing liquid stored in said second liquid storing section; and
content controlling means for controlling the content of the developing substance in accordance with an output of said content sensing means;
wherein said flexible agitating member is disposed at least in said second liquid storing section.

45. A developing device for developing a latent image formed on an image carrier with a developing liquid, said developing device comprising:
a liquid storing section for storing the developing liquid consisting of a developing substance and a carrier liquid;
a developer carrier for depositing the developing liquid fed from said liquid storing section thereon; and
agitating means rotatable in said liquid storing section for causing the developing liquid to swirl along an inner periphery of said liquid storing section to thereby agitate said developing liquid, said agitating means generating a flow of said developing liquid along an axis of rotation of said agitating means,
wherein the flow of the developing liquid extends toward a bottom of said liquid storing section, and
wherein said agitating means comprises a plurality of blades radially extending from a shaft and positioned one above the other in an axial direction of said shaft, said plurality of blades facing each other at a preselected distance while being inclined relative to said axial direction each.

46. The device as claimed in claim 45, wherein upper blades included in said blades each have a rear portion in a direction of rotation that is inclined more sharply than a front portion in such a manner as to approach a lower blade more than said front portion.

47. The device as claimed in claim 46, wherein said upper blade and said lower blade facing each other are shifted from each other such that the front portion and the rear portion of said upper blade are positioned ahead of the front portion and the rear portion of said lower blade.

48. An image forming apparatus comprising:
an image carrier for forming a latent image thereon;
image forming means for forming a latent image on said image carrier; and
a developing device for developing the latent image by depositing a developing substance contained in a developing liquid on said latent image;
said developing device comprising:
a liquid storing section for storing the developing liquid consisting of the developing substance and a carrier liquid;
a developer carrier for depositing the developing liquid fed from said liquid storing section thereon; and
agitating means having a vertical axis and rotatable in said liquid storing section for causing the developing liquid to swirl along an inner periphery of said liquid storing section to thereby agitate said developing liquid, said agitating means generating a flow of said developing liquid along an axis of rotation of said agitating means,
wherein the flow of the developing liquid extends toward a bottom of said liquid storing section, and
wherein said agitating means comprises a plurality of blades radially extending from a shaft and positioned one above the other in an axial direction of said shaft, said plurality of blades facing each other at a preselected distance while being inclined relative to said axial direction each.

49. The apparatus as claimed in claim 48, wherein upper blades included in said blades each have a rear portion in a direction of rotation that is inclined more sharply than a front portion in such a manner as to approach a lower blade more than said front portion.

50. The apparatus as claimed in claim 49, wherein said upper blade and said lower blade facing each other are shifted from each other such that the front portion and the rear portion of said upper blade are positioned ahead of the front portion and the rear portion of said lower blade.

51. An image forming apparatus comprising:
an image carrier for forming a latent image thereon;
a liquid storing section for storing a developing liquid consisting of a developing substance and a carrier liquid;
a developer carrier for depositing the developing liquid fed from said liquid storing section thereon and causing said developing liquid to deposit on the latent image to thereby develop said latent image;
transferring means for transferring a developed image from said image carrier to a recording medium;
cleaning means for removing the developing liquid left on said image carrier after image transfer;
content sensing means for sensing a content of the developing substance of the developing liquid stored in said liquid storing section;
content controlling means for comparing an output of said content sensing means and a preselected target content and feeding a control agent to said liquid storing section in accordance with a result of comparison to thereby control a content of the developing substance; and
a residual liquid storing section for storing the developing liquid removed by said cleaning means;
wherein the developing liquid stored in said residual liquid storing section is used as the control agent.

52. The apparatus as claimed in claim 51, wherein the developing liquid has the developing substance dispersed in a content of between 5% and 40% and has viscosity of between 100 mPa·s and 10,000 mPa·s.

53. The apparatus as claimed in claim 51, wherein said content sensing means comprises content signal outputting means and content calculating means;
said content signal outputting means comprising:
film forming means for causing the developing liquid in said liquid storing section to form a film having a thickness slope;
light emitting means for emitting light toward the film such that said light is transmitted through said film in a direction of thickness;
signal outputting means for outputting a signal representative of a quantity of light incident thereto via the film; and
shifting means for shifting a position of the film to which the light is incident in a direction of the thickness slope;
wherein said content calculating means integrates a continuous output of said signal outputting means received over a preselected period of time and calculates, based on a result of integration, a content of the developing substance of the developing liquid stored in said liquid storing section.

54. The apparatus as claimed in claim 53, further comprising liquid level sensing means for sensing a liquid level in said liquid storing section, wherein the control agent is fed to said liquid storing section in accordance with an output of said liquid level sensing means.

55. The apparatus as claimed in claim 54, wherein said liquid level sensing means comprising:
a magnetic force generating member;
magnetic force sensing means for sensing a magnetic force of said magnetic force generating member;
floats movable in an up-and-down direction in accordance with the liquid level in said liquid storing section; and
an elongate, ring support member supporting said floats at opposite ends thereof, supporting either one of said magnetic force generating member and said magnetic force sensing means at a position intermediate between said opposite ends, and supporting rings between said position and said opposite ends; and
a plurality of guide rods respectively inserted in said rings for guiding said floats in the up-and-down direction;
wherein a distance between said magnetic force generating member and said magnetic force sensing means varies in accordance with a movement of said floats, allowing the liquid level to be determined on the basis of an output of said magnetic force sensing means.

56. The apparatus as claimed in claim 55, wherein the developing liquid has the developing substance dispersed in a content of between 5% and 40% and has viscosity of between 100 mPa·s and 10,000 mPa·s.

57. The apparatus as claimed in claim 51, further comprising liquid level sensing means for sensing a liquid level in said liquid storing section, wherein the control agent is fed to said liquid storing section in accordance with an output of said liquid level sensing means.

58. The apparatus as claimed in claim 57, wherein said liquid level sensing means comprising:
a magnetic force generating member;
magnetic force sensing means for sensing a magnetic force of said magnetic force generating member;
floats movable in an up-and-down direction in accordance with the liquid level in said liquid storing section; and
an elongate, ring support member supporting said floats at opposite ends thereof, supporting either one of said magnetic force generating member and said magnetic force sensing means at a position intermediate between said opposite ends, and supporting rings between said position and said opposite ends; and
a plurality of guide rods respectively inserted in said rings for guiding said floats in the up-and-down direction;
wherein a distance between said magnetic force generating member and said magnetic force sensing means varies in accordance with a movement of said floats, allowing the liquid level to be determined on the basis of an output of said magnetic force sensing means.

59. The apparatus as claimed in claim 58, wherein the developing liquid has the developing substance dispersed in a content of between 5% and 40% and has viscosity of between 100 mPa·s and 10,000 mPa·s.

60. An image forming apparatus comprising:
an image carrier for forming a latent image thereon;
a liquid storing section for storing a developing liquid consisting of a developing substance and a carrier liquid;
a developer carrier for depositing the developing liquid fed from said liquid storing section thereon and causing said developing liquid to deposit on the latent image to thereby develop said latent image;

first cleaning means for removing the developing liquid left on said image carrier after development;

content sensing means for sensing a content of the developing substance of the developing liquid stored in said liquid storing section;

content controlling means for comparing an output of said content sensing means and a preselected target content and feeding a control agent to said liquid storing section in accordance with a result of comparison to thereby control a content of the developing substance;

image density calculating means for calculating image density of a developed image;

a first residual liquid storing section for storing the developing liquid removed by said first cleaning means;

bypass conveying means for conveying the developing liquid from said cleaning means to said liquid storing section by bypassing said first residual liquid storing section; and bypass controlling means for controlling said bypass conveying means in accordance with image density calculated by said image density calculating means.

61. The apparatus as claimed in claim 60, wherein the developing liquid has the developing substance dispersed in a content of between 5% and 40% and has viscosity of between 100 mPa·s and 10,000 mPa·s.

62. The apparatus as claimed in claim 60, wherein the developing liquid stored in said first residual liquid storing section is used as a control agent for controlling the content of the developing substance of the developing liquid stored in said liquid storing section.

63. The apparatus as claimed in claim 62, further comprising:

transferring means for transferring a developed image from said image carrier to an intermediate image transfer body and then from said intermediate image transfer body to a recording medium;

second cleaning means for removing the developing liquid left on said image carrier after image transfer;

a second residual liquid storing section for storing the developing liquid removed by said second cleaning means;

wherein a mixture of the developing liquid stored in said first residual liquid storing section and the developing liquid stored in said second residual liquid storing section is used as the control agent.

64. The apparatus as claimed in claim 63, wherein a carrier liquid is used as the control agent.

65. The apparatus as claimed in claim 64, wherein the developing liquid stored in said second residual liquid storing section is used prior to the carrier liquid.

66. The apparatus as claimed in claim 65, wherein a developing liquid whose developing substance has a content higher than a target content is used as the control agent.

67. The apparatus as claimed in claim 66, wherein the target content is higher than a standard content, which is a content desirable for development, within a range that maintains a difference between development density derived from the developing density having the target content and development density derived from a developing liquid having said target content unobservable by eye.

68. The apparatus as claimed in claim 67, further comprising storing means for storing a result of calculation output from said image density calculating means and the target density, wherein said target density stored in said storing means is updated in accordance with a plurality of results of calculation written in said storing means.

69. The apparatus as claimed in claim 60, wherein said content sensing means comprises content signal outputting means and content calculating means;

said content signal outputting means comprising:
film forming means for causing the developing liquid in said liquid storing section to form a film having a thickness slope;

light emitting means for emitting light toward the film such that said light is transmitted through said film in a-direction of thickness;

signal outputting means for outputting a signal representative of a quantity of light incident thereto via the film; and shifting means for shifting a position of the film to which the light is incident in a direction of the thickness slope;

wherein said content calculating means integrates a continuous output of said signal outputting means received over a preselected period of time and calculates, based on a result of integration, a content of the developing substance of the developing liquid stored in said liquid storing section.

70. The apparatus as claimed in claim 69, further comprising liquid level sensing means for sensing a liquid level in said liquid storing section, wherein the control agent is fed to said liquid storing section in accordance with an output of said liquid level sensing means.

71. The apparatus as claimed in claim 70, wherein said liquid level sensing means comprising:

a magnetic force generating member;

magnetic force sensing means for sensing a magnetic force of said magnetic force generating member;

floats movable in an up-and-down direction in accordance with the liquid level in said liquid storing section; and an elongate, ring support member supporting said floats at opposite ends thereof, supporting either one of said magnetic force generating member and said magnetic force sensing means at a position intermediate between said opposite ends, and supporting rings between said position and said opposite ends; and a plurality of guide rods respectively inserted in said rings for guiding said floats in the up-and-down direction;

wherein a distance between said magnetic force generating member and said magnetic force sensing means varies in accordance with a movement of said floats, allowing the liquid level to be determined on the basis of an output of said magnetic force sensing means.

72. The apparatus as claimed in claim 71, wherein the developing liquid has the developing substance dispersed in a content of between 5% and 40% and has viscosity of between 100 mPa·s and 10,000 mPa·s.

73. The apparatus as claimed in claim 60, further comprising liquid level sensing means for sensing a liquid level in said liquid storing section, wherein the control agent is fed to said liquid storing section in accordance with an output of said liquid level sensing means.

74. The apparatus as claimed in claim 73, wherein said liquid level sensing means comprising:

a magnetic force generating member;

magnetic force sensing means for sensing a magnetic force of said magnetic force generating member;

floats movable in an up-and-down direction in accordance with the liquid level in said liquid storing section; and an elongate, ring support member supporting said floats at opposite ends thereof, supporting either one of said magnetic force generating member and said magnetic force sensing means at a position intermediate between said opposite ends, and supporting rings between said position and said opposite ends; and a plurality of guide rods respectively inserted in said rings for guiding said floats in the up-and-down direction;

wherein a distance between said magnetic force generating member and said magnetic force sensing means varies in accordance with a movement of said floats, allowing the liquid level to be determined on the basis of an output of said magnetic force sensing means.

75. The apparatus as claimed in claim 74, wherein the developing liquid has the developing substance dispersed in a content of between 5% and 40% and has viscosity of between 100 mPa·s and 10,000 mPa·s.

76. An image forming apparatus comprising:
an image carrier for forming a latent image thereon;
image forming means for forming a latent image on said image carrier;
a liquid storing section for storing a developing liquid consisting of a developing substance and a carrier liquid;
a developer carrier for depositing the developing liquid fed from said liquid storing section thereon and causing said developing liquid to deposit on the latent image to thereby develop said latent image;
first cleaning means for removing the developing liquid left on said image carrier after development;
first conveying means for conveying the developing liquid from said first cleaning means to said liquid storing section;
content sensing means for sensing a content of the developing substance of the developing liquid stored in said liquid storing section;
content controlling means for comparing an output of said content sensing means and a preselected target content and feeding a control agent to said liquid storing section in accordance with a result of comparison to thereby control a content of the developing substance; and
image density calculating means for calculating density of a developed image;
wherein a timing for starting forming the latent image on said image carrier is determined in accordance with image density output from said image density calculating means.

77. The apparatus as claimed in claim 76, wherein the developing liquid has the developing substance dispersed in a content of between 5% and 40% and has viscosity of between 100 mPa·s and 10,000 mPa·s.

78. The apparatus as claimed in claim 76, further comprising:
transferring means for transferring the developed image from said image carrier to an intermediate image transfer body and then from said intermediate image transfer body to a recording medium;
second cleaning means for removing the developing liquid from said image carrier after image transfer; and
second conveying means for conveying the developing liquid from said second cleaning means to said liquid storing section.

79. The apparatus as claimed in claim 78, wherein said content sensing means comprises content signal outputting means and content calculating means;

said content signal outputting means comprising:
film forming means for causing the developing liquid in said liquid storing section to form a film having a thickness slope;
light emitting means for emitting light toward the film such that said light is transmitted through said film in a direction of thickness;
signal outputting means for outputting a signal representative of a quantity of light incident thereto via the film; and
shifting means for shifting a position of the film to which the light is incident in a direction of the thickness slope;
wherein said content calculating means integrates outputs of said signal outputting means received over a preselected period of time and calculates, based on a result of integration, a content of the developing substance of the developing liquid stored in said liquid storing section.

80. The apparatus as claimed in claim 79, further comprising liquid level sensing means for sensing a liquid level in said liquid storing section, wherein the control agent is fed to said liquid storing section in accordance with an output of said liquid level sensing means.

81. The apparatus as claimed in claim 80, wherein said liquid level sensing means comprises:
a magnetic force generating member;
magnetic force sensing means for sensing a magnetic force of said magnetic force generating member;
floats movable in an up-and-down direction in accordance with the liquid level in said liquid storing section; and
an elongate, ring support member supporting said floats at opposite ends thereof, supporting either one of said magnetic force generating member and said magnetic force sensing means at a position intermediate between said opposite ends, and supporting rings between said position and said opposite ends; and
a plurality of guide rods respectively inserted in said rings for guiding said floats in the up-and-down direction;
wherein a distance between said magnetic force generating member and said magnetic force sensing means varies in accordance with a movement of said floats, allowing the liquid level to be determined on the basis of an output of said magnetic force sensing means.

82. The apparatus as claimed in claim 81, wherein the developing liquid has the developing substance dispersed in a content of between 5% and 40% and has viscosity of between 100 mPa·s and 10,000 mPa·s.

83. The apparatus as claimed in claim 76, wherein said content sensing means comprises content signal outputting means and content calculating means;
said content signal outputting means comprising:
film forming means for causing the developing liquid in said liquid storing section to form a film having a thickness slope;
light emitting means for emitting light toward the film such that said light is transmitted through said film in a direction of thickness;
signal outputting means for outputting a signal representative of a quantity of light incident thereto via the film; and
shifting means for shifting a position of the film to which the light is incident in a direction of the thickness slope;
wherein said content calculating means integrates outputs of said signal outputting means received over a preselected period of time and calculates, based on a result of integration, a content of the developing substance of the developing liquid stored in said liquid storing section.

84. The apparatus as claimed in claim 83, further comprising liquid level sensing means for sensing a liquid level in said liquid storing section, wherein the control agent is fed to said liquid storing section in accordance with an output of said liquid level sensing means.

85. The apparatus as claimed in claim 84, wherein said liquid level sensing means comprises:
   a magnetic force generating member;
   magnetic force sensing means for sensing a magnetic force of said magnetic force generating member;
   floats movable in an up-and-down direction in accordance with the liquid level in said liquid storing section; and
   an elongate, ring support member supporting said floats at opposite ends thereof, supporting either one of said magnetic force generating member and said magnetic force sensing means at a position intermediate between said opposite ends, and supporting rings between said position and said opposite ends; and
   a plurality of guide rods respectively inserted in said rings for guiding said floats in the up-and-down direction;
   wherein a distance between said magnetic force generating member and said magnetic force sensing means varies in accordance with a movement of said floats, allowing the liquid level to be determined on the basis of an output of said magnetic force sensing means.

86. The apparatus as claimed in claim 85, wherein the developing liquid has the developing substance dispersed in a content of between 5% and 40% and has viscosity of between 100 mPa·s and 10,000 mPa·s.

87. The apparatus as claimed in claim 76, further comprising liquid level sensing means for sensing a liquid level in said liquid storing section, wherein the control agent is fed to said liquid storing section in accordance with an output of said liquid level sensing means.

88. The apparatus as claimed in claim 87, wherein said liquid level sensing means comprises:
   a magnetic force generating member;
   magnetic force sensing means for sensing a magnetic force of said magnetic force generating member;
   floats movable in an up-and-down direction in accordance with the liquid level in said liquid storing section; and
   an elongate, ring support member supporting said floats at opposite ends thereof, supporting either one of said magnetic force generating member and said magnetic force sensing means at a position intermediate between said opposite ends, and supporting rings between said position and said opposite ends; and
   a plurality of guide rods respectively inserted in said rings for guiding said floats in the up-and-down direction;
   wherein a distance between said magnetic force generating member and said magnetic force sensing means varies in accordance with a movement of said floats, allowing the liquid level to be determined on the basis of an output of said magnetic force sensing means.

89. The apparatus as claimed in claim 88, wherein the developing liquid has the developing substance dispersed in a content of between 5% and 40% and has viscosity of between 100 mPa·s and 10,000 mPa·s.

90. A developing device for developing a latent image formed on an image carrier with a developing liquid, said developing device comprising:
   a liquid storing section for storing the developing liquid consisting of a developing substance and a carrier liquid;
   a developer carrier for depositing the developing liquid fed from said liquid storing section thereon; and
   agitating means rotatable in said liquid storing section for causing the developing liquid to swirl in a horizontal direction to thereby agitate said developing liquid;
   wherein said agitating means rotates about an axis offset from a center of a cross-section of said liquid storing section,
   wherein said agitating means comprises:
      a flexible paddle rotatable in contact with an inner periphery of said liquid storing section while deforming itself; and
      a non-flexible paddle rotatable about a same axis of rotation as said flexible paddle for causing the developing liquid to flow along said axis.

91. The device as claimed in claim 90, wherein said non-flexible paddle causes the developing liquid to flow downward toward a bottom of said liquid storing section along the axis of rotation.

92. The device as claimed in claim 91, wherein said liquid storing section is formed with a taper at a bottom corner such that said taper guides the developing liquid flow downward and rebounded from the bottom upward in a direction opposite to a direction in which the axis is offset from the center.

93. The device as claimed in claim 92, further comprising:
   collecting means for collecting the developing liquid used for development from said developer carrier and causing said developing liquid collected to drop to a liquid surface in said liquid storing section at a position closer to the axis than to the center;
   content sensing means for sensing a content of the developing substance of the developing liquid guided upward by said taper; and
   content controlling means for causing a content agent to drop to the liquid surface in accordance with an output of said content sensing means to thereby control a content of the developing substance of the developing liquid stored in said liquid storing section.

94. An image forming apparatus comprising:
   an image carrier for forming a latent image thereon;
   image forming means for forming the latent image on said image carrier; and
   a developing device for depositing a developing substance contained in a developing liquid on the latent image to thereby develop said latent image;
   said developing device comprising:
      a liquid storing section for storing the developing liquid consisting of the developing substance and a carrier liquid;
      a developer carrier for depositing the developing liquid fed from said liquid storing section thereon; and
      agitating means rotatable in said liquid storing section for causing the developing liquid to swirl in a horizontal direction to thereby agitate said developing liquid;
      wherein said agitating means rotates about an axis offset from a center of a cross-section of said liquid storing section,
      wherein said agitating means comprises:
         a flexible paddle rotatable in contact with an inner periphery of said liquid storing section while deforming itself; and a non-flexible paddle rotatable about a same axis of rotation as said flexible paddle for causing the developing liquid to flow along said axis.

95. The apparatus as claimed in claim 94, wherein said non-flexible paddle causes the developing liquid to flow downward toward a bottom of said liquid storing section along the axis of rotation.

96. The apparatus as claimed in claim 95, wherein said liquid storing section is formed with a taper at a bottom corner such that said taper guides the developing liquid flown downward and rebounded from the bottom upward in a direction opposite to a direction in which the axis is offset from the center.

97. The apparatus as claimed in claim 96, further comprising:

collecting means for collecting the developing liquid used for development from said developer carrier and causing said developing liquid collected to drop to a liquid surface in said liquid storing section at a position closer to the axis than to the center;

content sensing means for sensing a content of the developing substance of the developing liquid guided upward by said taper; and content controlling means for causing a content agent to drop to the liquid surface in accordance with an output of said content sensing means to thereby control a content of the developing substance of the developing liquid stored in said liquid storing section.

* * * * *